United States Patent [19]

Miyasaka

[11] Patent Number: 5,196,929
[45] Date of Patent: Mar. 23, 1993

[54] DISPLAY SYSTEM OF CAMERA HAVING TRACKING APPARATUS

[75] Inventor: Tetsuo Miyasaka, Tsukui, Japan

[73] Assignee: Olympus Optical Co., Ltd., Tokyo, Japan

[21] Appl. No.: 547,059

[22] Filed: Jun. 29, 1990

[30] Foreign Application Priority Data

| Jul. 5, 1989 | [JP] | Japan | 1-173552 |
| Jul. 5, 1989 | [JP] | Japan | 1-173553 |
| Jul. 5, 1989 | [JP] | Japan | 1-173554 |
| Apr. 20, 1990 | [JP] | Japan | 2-104636 |
| Apr. 20, 1990 | [JP] | Japan | 2-104637 |
| Apr. 25, 1990 | [JP] | Japan | 2-107548 |
| Apr. 25, 1990 | [JP] | Japan | 2-107549 |

[51] Int. Cl.⁵ .......................... H04N 5/225; H04N 7/18
[52] U.S. Cl. ..................... 358/125; 358/227; 358/909; 358/906; 354/402; 354/430
[58] Field of Search ............. 358/126, 125, 105, 108, 358/93, 227, 906, 909, 209; 354/400–409, 430

[56] References Cited

U.S. PATENT DOCUMENTS

| 3,828,122 | 8/1974 | McPhee et al. | 358/126 |
| 3,955,046 | 5/1976 | Ingham et al. | 358/126 |
| 4,176,955 | 12/1979 | Yamada et al. | |
| 4,272,783 | 6/1981 | Warnstam et al. | 358/126 |
| 4,812,912 | 3/1989 | Iida et al. | 358/227 |
| 4,847,680 | 7/1989 | Okino | 358/296 |
| 5,031,049 | 7/1991 | Toyama et al. | 358/227 |

FOREIGN PATENT DOCUMENTS

| 53-19027 | 2/1978 | Japan . |
| 53-109420 | 9/1978 | Japan . |
| 57-57095 | 4/1982 | Japan . |
| 57-72487 | 5/1982 | Japan . |
| 59-25508 | 6/1984 | Japan . |
| 59-32742 | 8/1984 | Japan . |
| 60-28475 | 7/1985 | Japan . |
| 60-249477 | 12/1985 | Japan . |
| 60-253887 | 12/1985 | Japan . |
| 60-263584 | 12/1985 | Japan . |
| 61-12177 | 1/1986 | Japan . |
| 61-37566 | 8/1986 | Japan . |
| 64-1921 | 1/1989 | Japan . |

Primary Examiner—Victor R. Kostak
Assistant Examiner—Michael H. Lee
Attorney, Agent, or Firm—Frishauf, Holtz, Goodman & Woodward

[57] ABSTRACT

In a display apparatus of a camera according to this invention, an imaging device repeatedly images an object to be photographed and generates a two-dimensional luminance signal. A one-dimensional pattern signal is repeatedly generated from the two-dimensional luminance signal for at least one of inside or outside the imaging device. Each time a new pattern signal is generated, the immediately preceding pattern signal is stored in a frame memory. After the immediately preceding pattern signal is stored in the frame memory, a CPU performs a correlation arithmetic operation between a new pattern signal and the immediately preceding pattern signal stored in the frame memory. The CPU detects a moving amount of the object to be photographed according to the movement of the camera during the repetition time period, and performs the correlation arithmetic operation each time the frame memory stores an immediately preceding pattern signal. In accordance with the moving amount arithmetically operated by the CPU, the moving amount of the object to be photographed is displayed on a display unit in a finder using the width of a photographing picture as a basic unit.

63 Claims, 47 Drawing Sheets

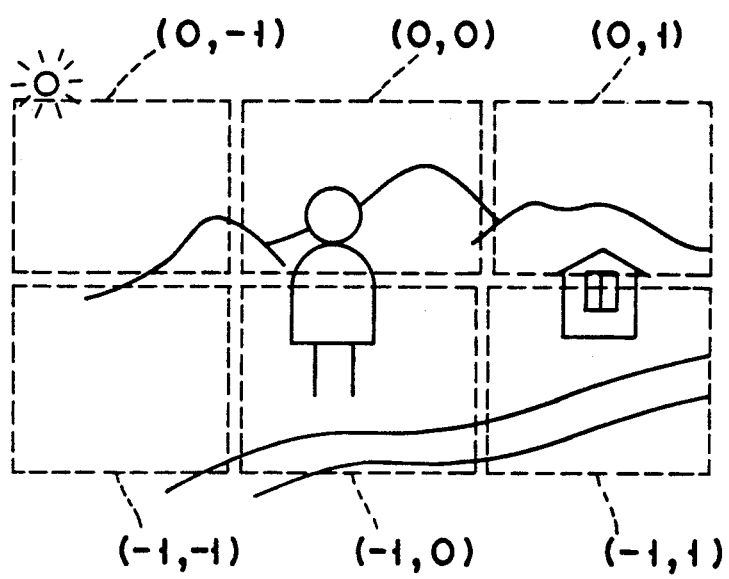
F I G. 14

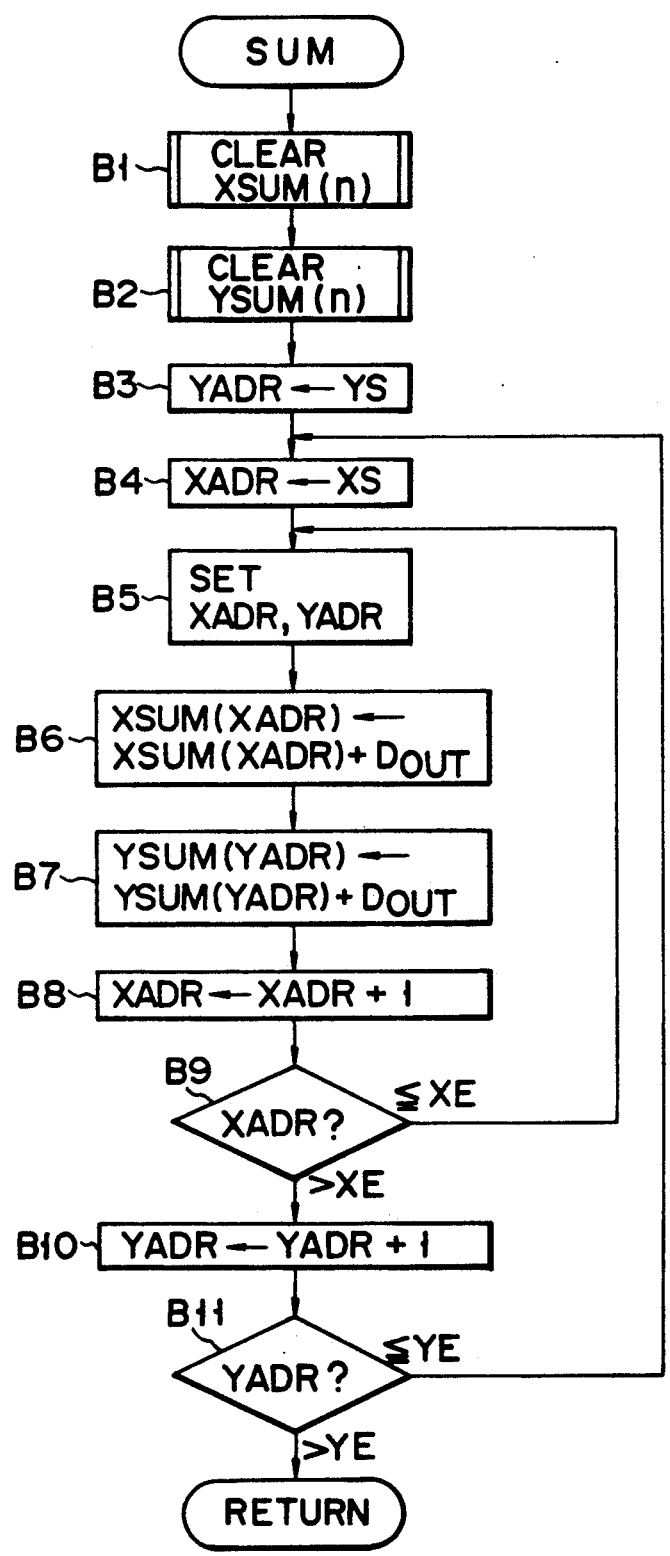
F I G. 16

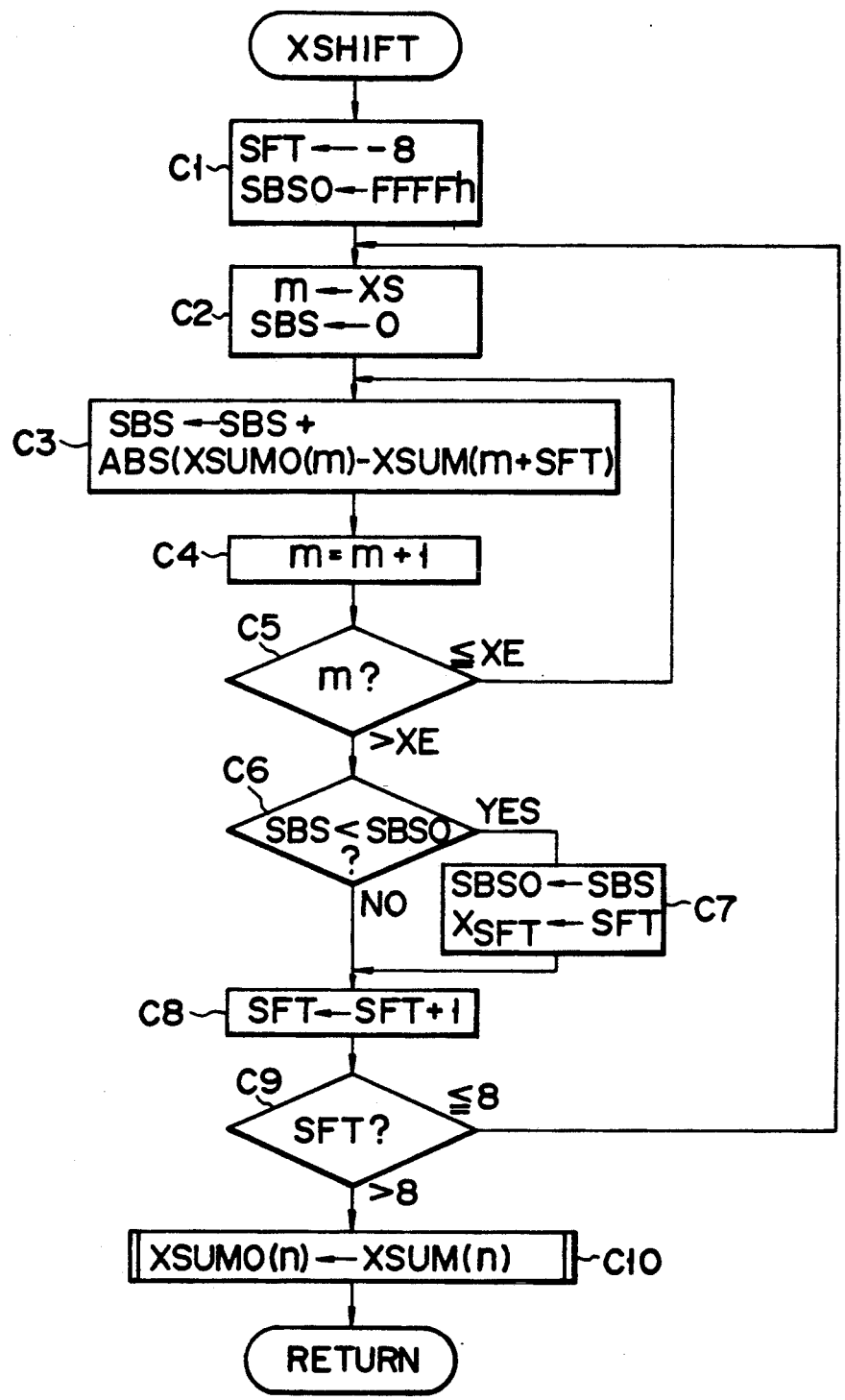
F I G. 17

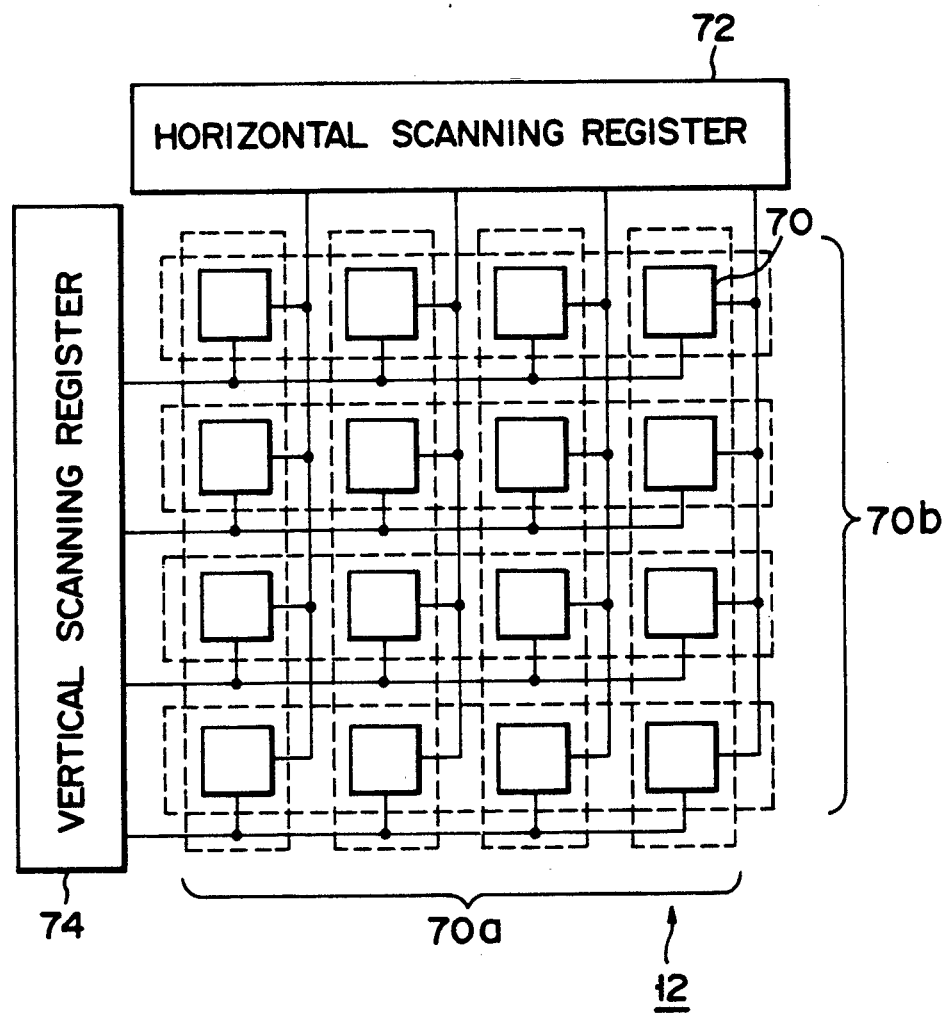
F I G. 21

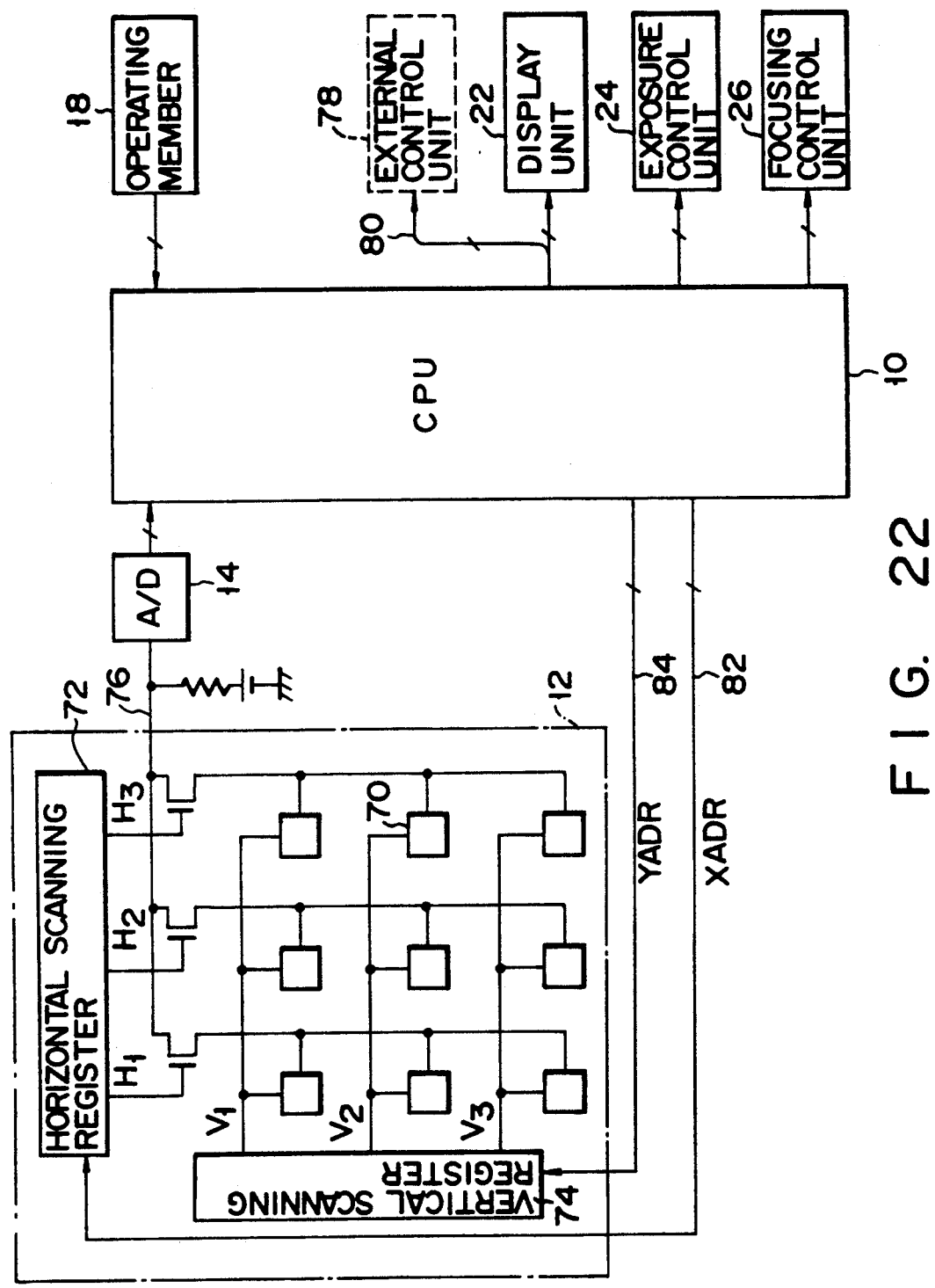
F I G. 22

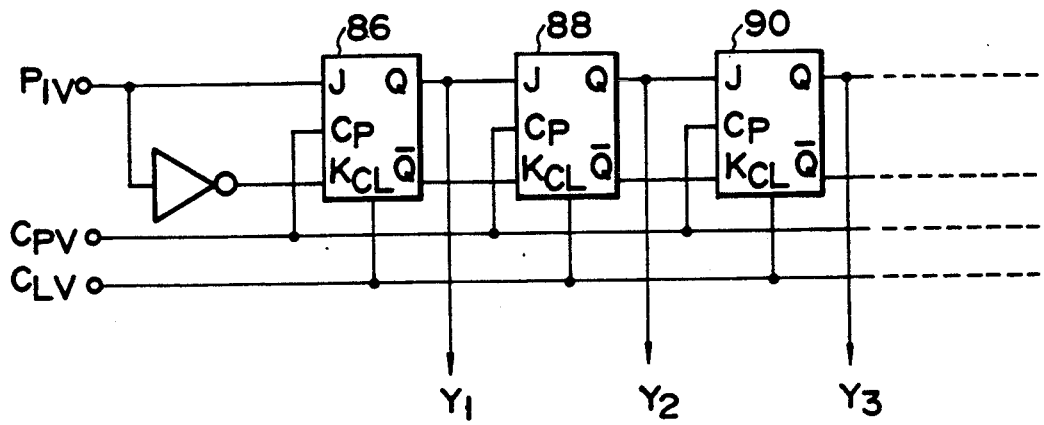
F I G. 26
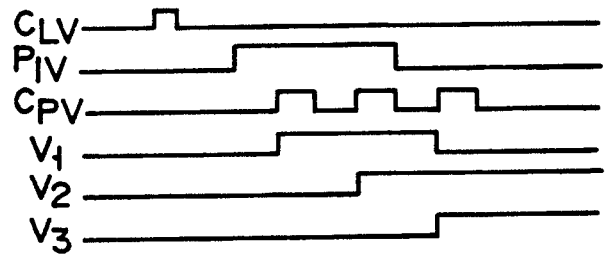
F I G. 27
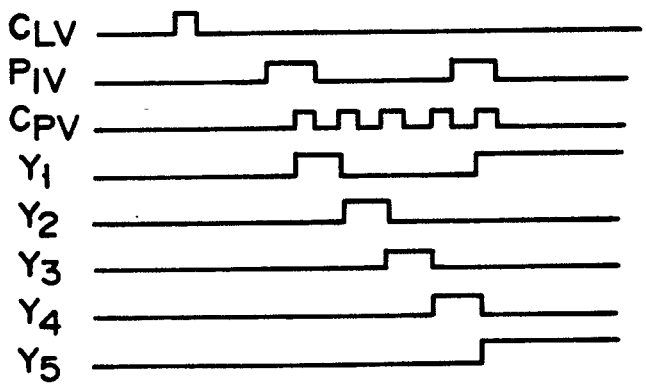
F I G. 29

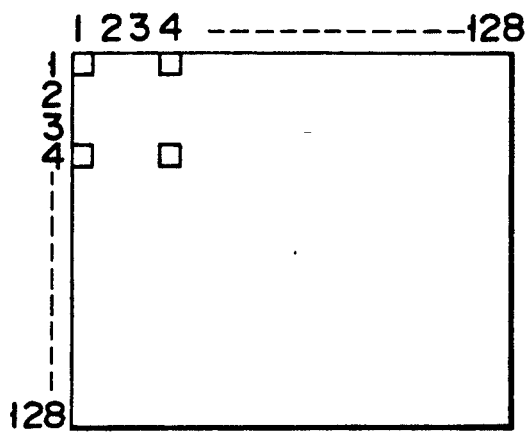
F I G. 30
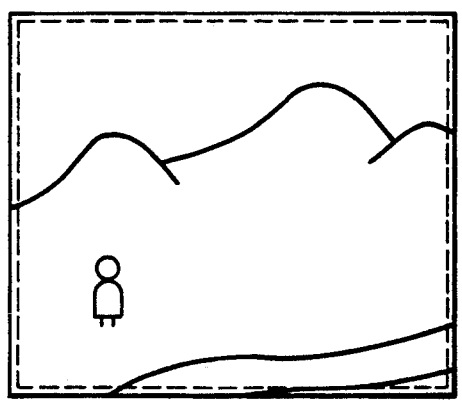
F I G. 31A
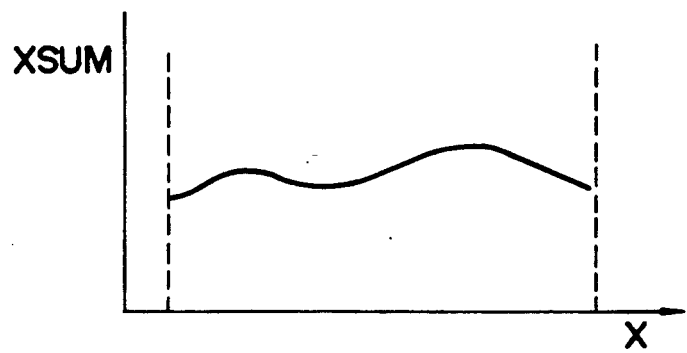
F I G. 31B

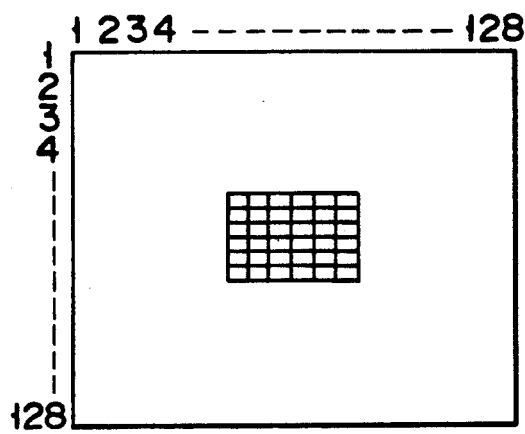
F I G. 32
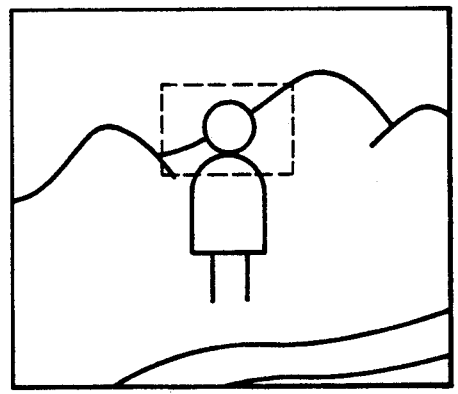
F I G. 33A
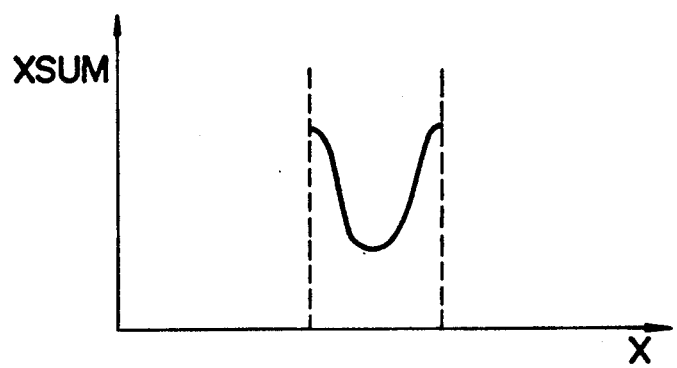
F I G. 33B

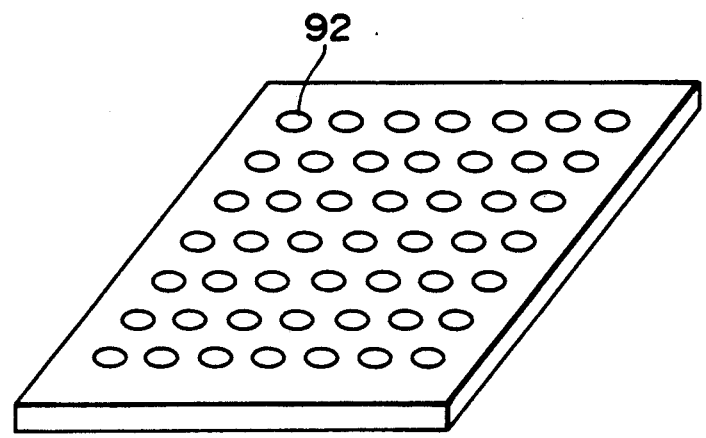
F I G. 34A
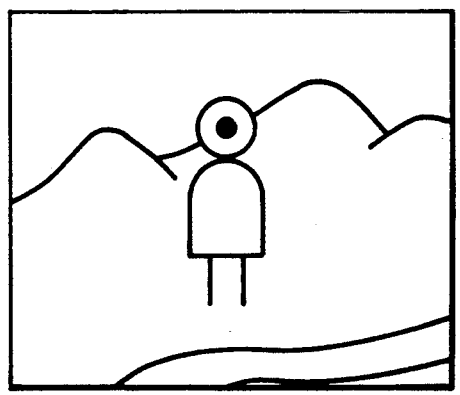
F I G. 34B

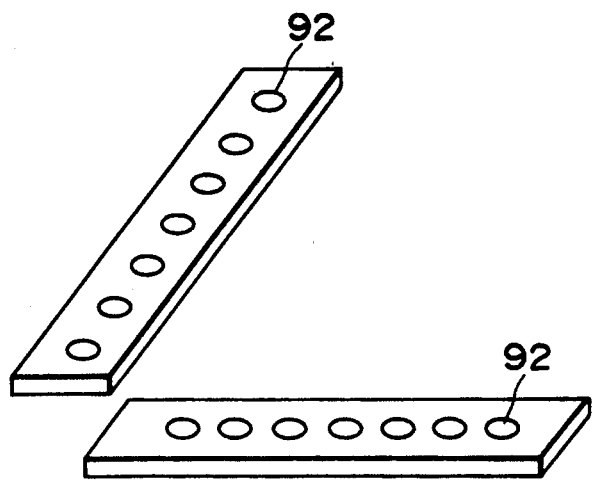
F I G. 35A
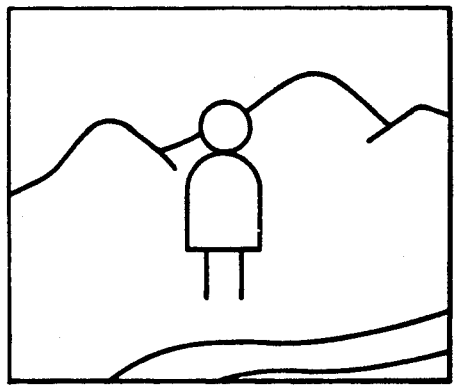
F I G. 35B

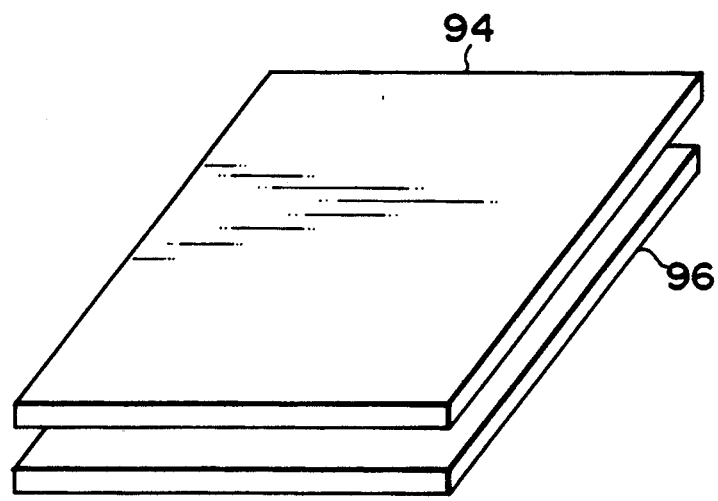
F I G. 36A
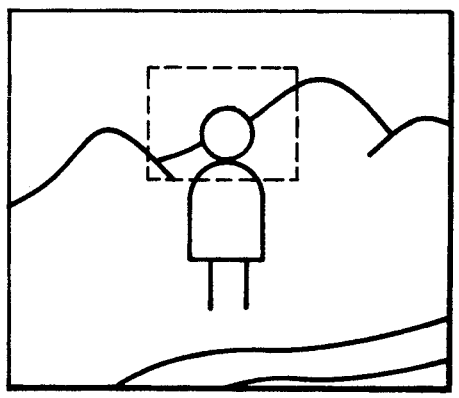
F I G. 36B

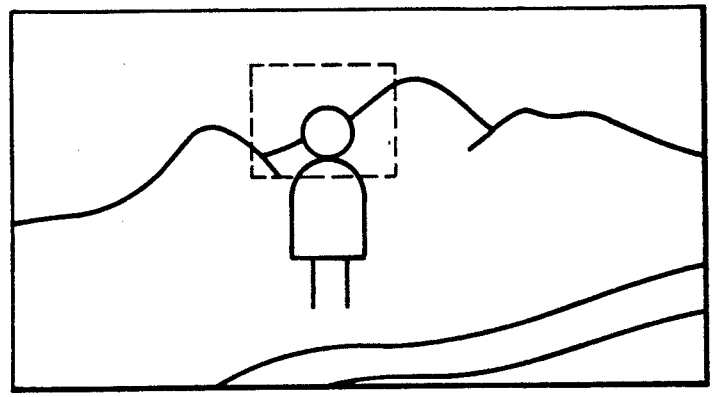
F I G. 39A
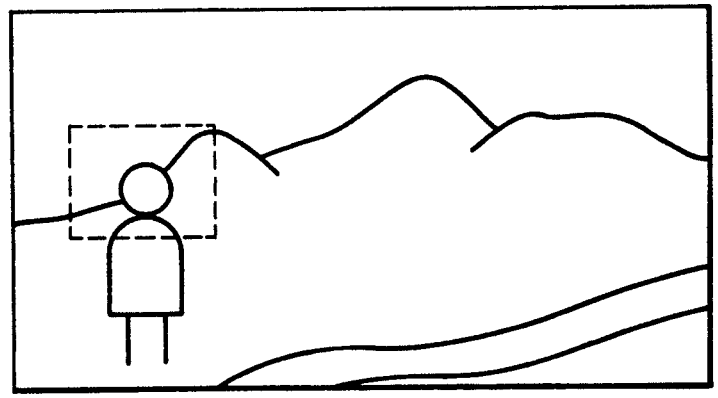
F I G. 39B

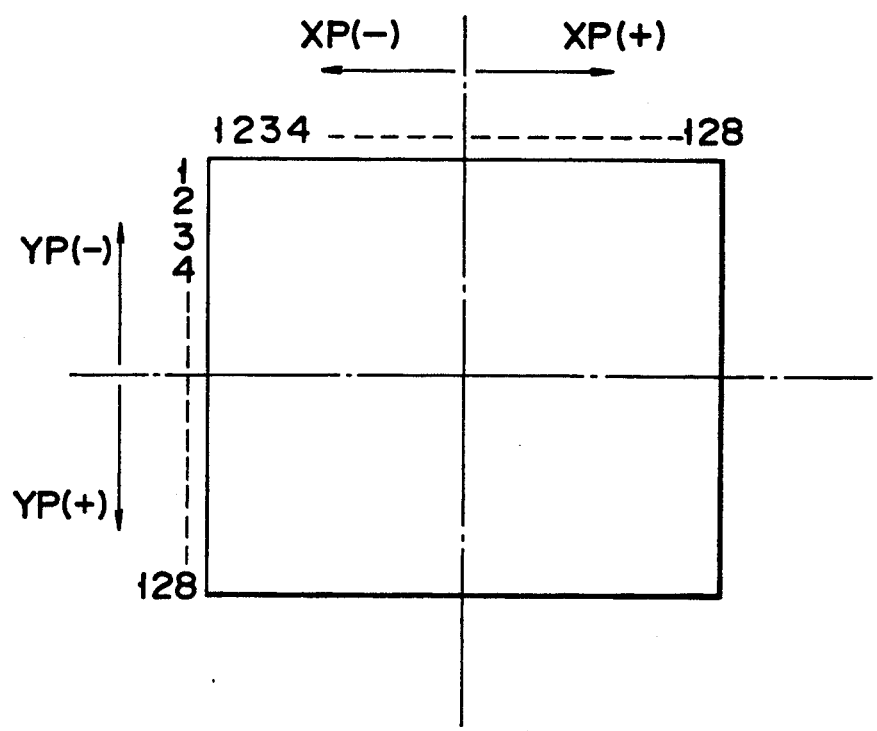
F I G. 40

| | |
|---|---|
| $XSUM_E(n)$ | CURRENT SUM IN X-DIRECTION ( n = 1 TO 32 ) |
| $XSUM_O(n)$ | IMMEDIATELY PRECEDING SUM IN X-DIRECTION ( n = 1 TO 32 ) |
| $YSUM_E(n)$ | CURRENT SUM IN Y-DIRECTION ( n = 1 TO 32 ) |
| $YSUM_O(n)$ | IMMEDIATELY PRECEDING SUM IN Y-DIRECTION ( n = 1 TO 32 ) |
| XSFT | MOVING AMOUNT IN X-DIRECTION |
| YSFT | MOVING AMOUNT IN Y-DIRECTION |
| BSUM | LUMINANCE VALUE |
| $FSUM_E$ | CURRENT FOCUSING STATE VALUE |
| $FSUM_O$ | IMMEDIATELY PRECEDING FOCUSING STATE VALUE |
| XS | X-COORDINATE POSITION OF TRACKING FIELD |
| YS | Y-COORDINATE POSITION OF TRACKING FIELD |
| XP | POSITION IN X-DIRECTION |
| YP | POSITION IN Y-DIRECTION |
| PIT | PITCH OF SELECTION SCANNING LINE |
| $XSFT_O$ | IMMEDIATELY PRECEDING SHIFT AMOUNT IN X-DIRECTION |
| $YSFT_O$ | IMMEDIATELY PRECEDING SHIFT AMOUNT IN Y-DIRECTION |
| $XSFT_N$ | CURRENT SHIFT AMOUNT IN X-DIRECTION |
| $YSFT_N$ | CURRENT SHIFT AMOUNT IN Y-DIRECTION |

F I G. 41

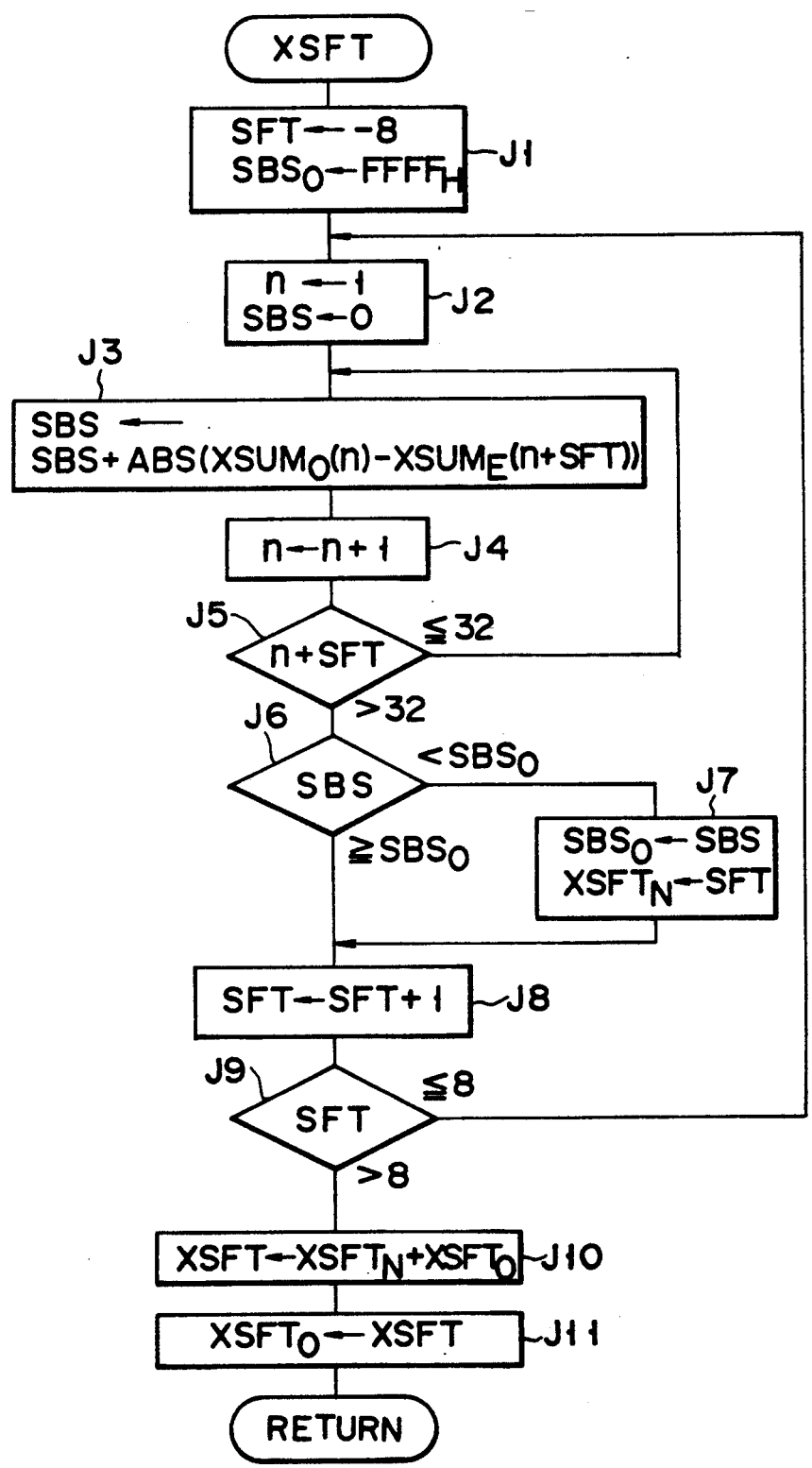
F I G. 50

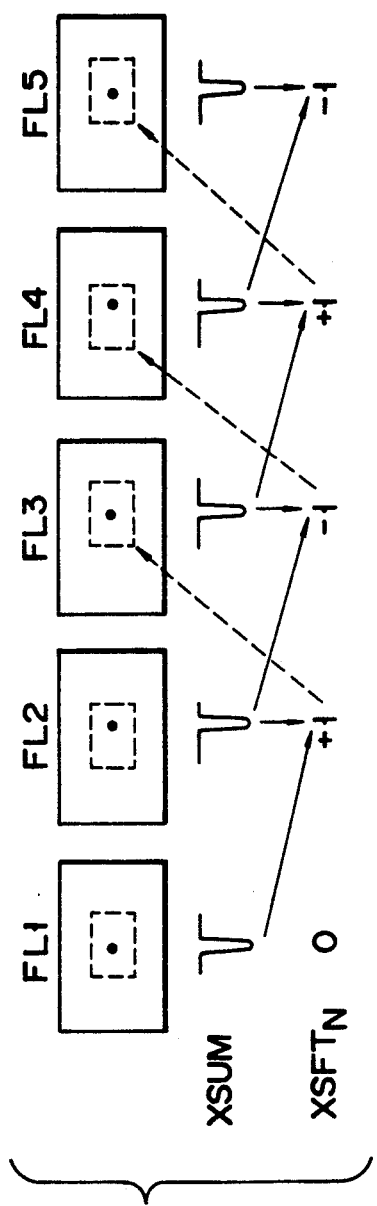
F I G. 51
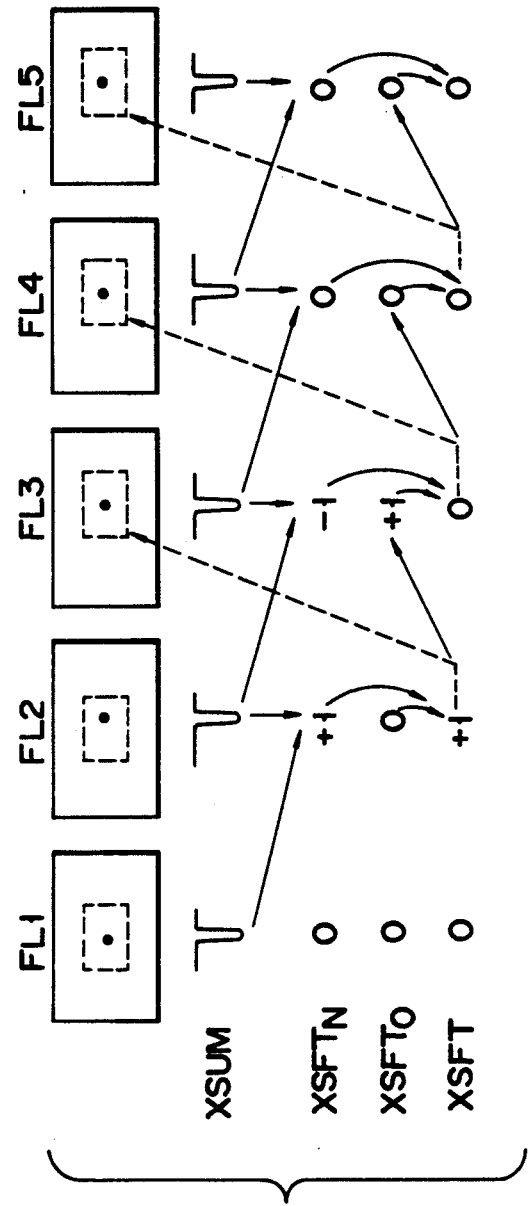
F I G. 52

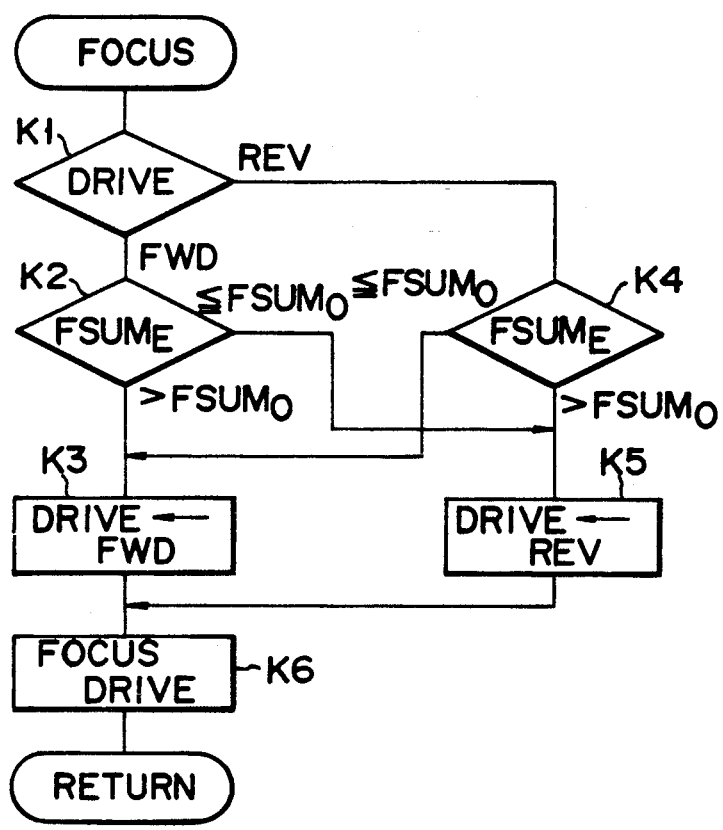
F I G. 53

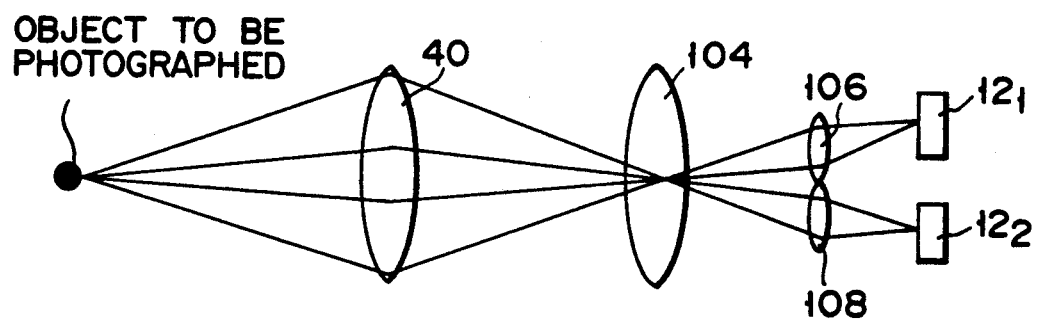
F I G. 54

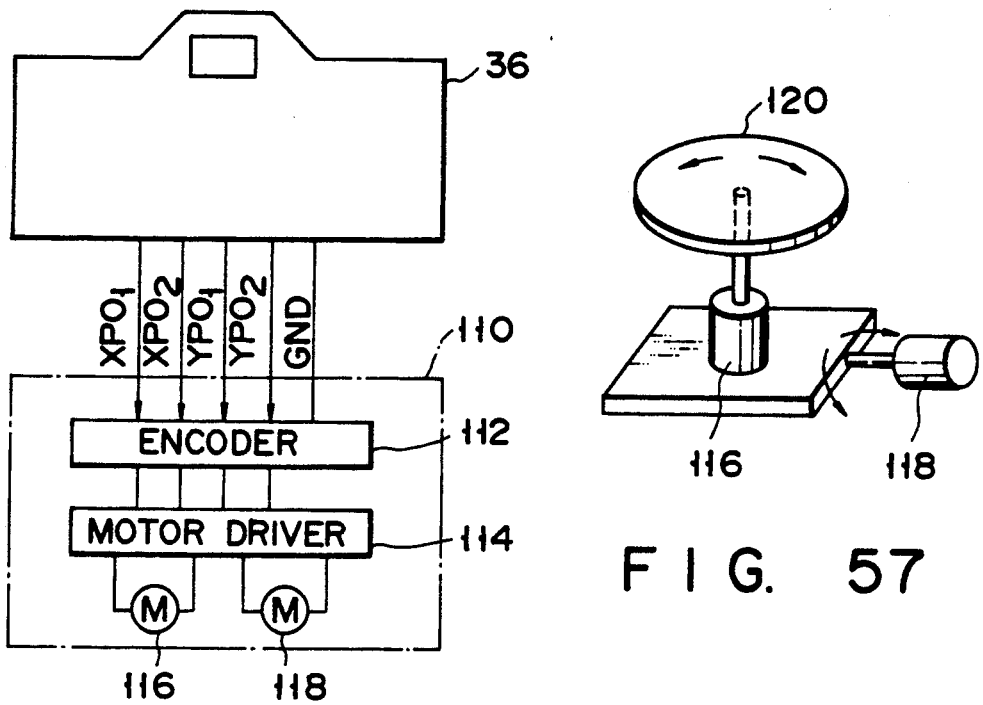

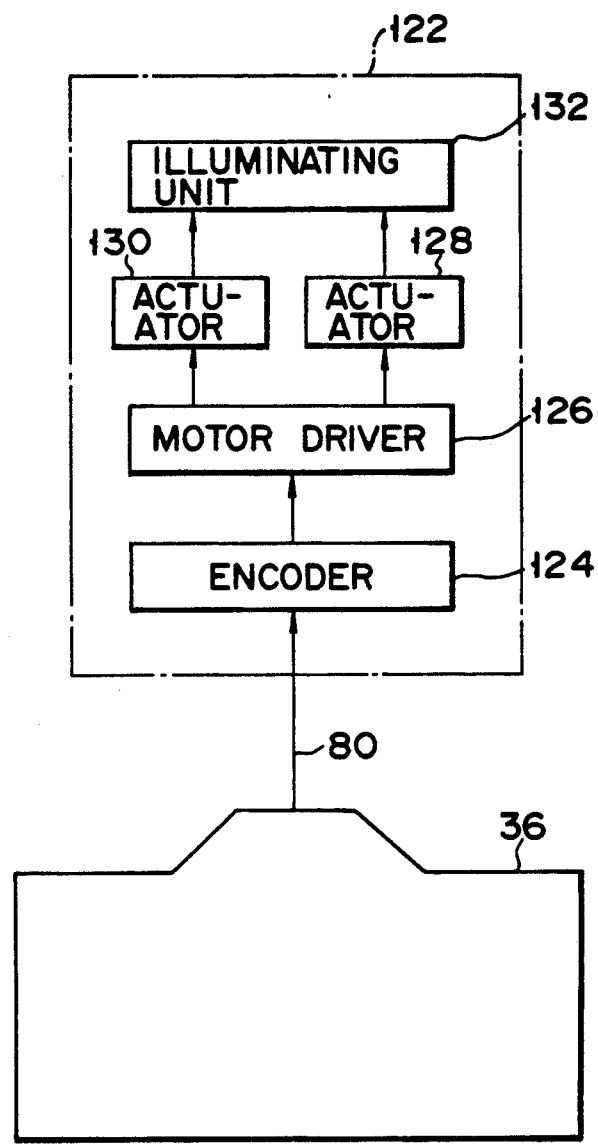
F I G. 59

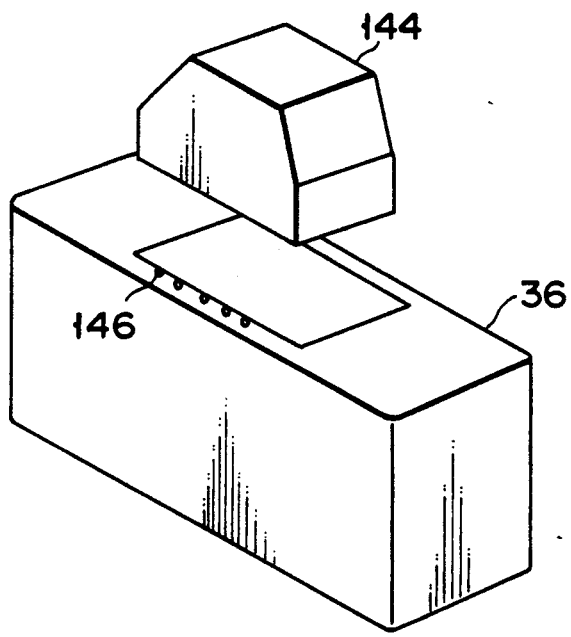
F I G. 64

DISPLAY SYSTEM OF CAMERA HAVING TRACKING APPARATUS

BACKGROUND OF THE INVENTION

1. Field of the Invention

The present invention relates to a display system of an imaging camera for use in an imaging apparatus such as a video camera or a still camera and, more particularly, to a display system of a camera having a tracking apparatus for detecting a moving amount of an object to be photographed in accordance with an output from an imaging device to automatically track the object to be photographed.

2. Description of the Related Art

In recent years, as a photometer for measuring the luminance of (performing photometry for) an object to be photographed for exposure control of a photographic instrument such as a still camera (to be abbreviated to a camera hereinafter) as an imaging apparatus, a photometer arranged to perform photometry for a region of an object to be photographed desired by a photographer is known. For example, a photometer as disclosed in Published Unexamined Japanese Patent Application No. 53-19027 can perform photometric operations for a central portion of a picture to be taken a plurality of times while changing framing of a camera, thereby performing photometry of a plurality of portions of an object to be photographed and simultaneously displaying the photometered values.

As a photometer of this type, an apparatus using so-called spot photometry as disclosed in Published Examined Japanese Patent Application No. 61-37566 is known. The spot photometry is a method of measuring the luminance of an object to be photographed by performing photometry for a considerably narrow central region of a picture of an imaging instrument such as a camera. When a photometer using spot photometry is mounted on, e.g., a still camera, however, framing of the camera is determined such that an object to be photographed is located at the center of a picture, and photometry and exposure control are performed for the object to be photographed. Thereafter, framing is changed for photographing, and then photographing is performed. Therefore, if an object to be photographed moves from the center of the picture and its luminance is changed after photometry and before photographing, exposure cannot be correctly performed.

In contrast to this, an automatic tracking apparatus does not store a photometric value before photographing but automatically tracks an object to be photographed so that a region to be subjected to spot photometry constantly tracks the object to be photographed, thereby performing photometry and exposure control immediately before photographing.

For example, an automatic tracking apparatus as disclosed in Published Examined Japanese Patent Application No. 59-32742 detects a moving amount of an object to be photographed in accordance with an output from an imaging device so as to allow a sensing mechanism such as an AF (automatic focusing mechanism) or an AE (automatic exposure mechanism) to track the object to be photographed.

In addition, an automatic tracking apparatus disclosed in Published Examined Japanese Patent Application No. 60-28475 calculates a correlation coefficient between a picture obtained by performing analog/digital conversion for an image signal supplied from an imaging means and a reference picture stored in advance and detects a maximum correlation point, and detects a curvature near the peak value of the correlation coefficient while tracking a predetermined target or scene present in the field of the imaging means, and calculates the size of a tracking window which maximizes the detected curvature.

An automatic tracking apparatus as disclosed in Published Unexamined Japanese Patent Application No. 64-1921 is also known. This apparatus initially determines framing of a camera so that an object to be photographed is located at the center of a picture, and measures a luminance distribution of the object to be photographed. If the object to be photographed moves, the apparatus determines a moving amount and a moving direction of the object to be photographed in accordance with a change in luminance distribution to automatically move a photometric region, thereby allowing a central portion of the photometric region to track the object to be photographed.

An automatic tracking apparatus for use in a video camera disclosed in Published Unexamined Japanese Patent Application No. 60-253887 detects a moving amount of an object to be photographed by using a phenomenon in which a color signal extracted from a video signal corresponding to the object to be photographed is shifted in accordance with the movement of the object to be photographed, and performs automatic tracking by using data of the detected moving amount.

An automatic tracking apparatus disclosed in Published Unexamined Japanese Patent Application No. 61-12177 registers color information of an object to be tracked concerning the size of a tracking field which is manually set, and detects a relative moving amount on the basis of the feature of the registered object to be tracked.

Of these conventional techniques, according to the apparatus disclosed in Published Unexamined Japanese Patent Disclosure No. 53-19027, a photographer can simultaneously check photometric values of a plurality of portions but cannot check the exact positions of these portions. Therefore, a photographer must remember positions of an object to be photographed which are subjected to photometry.

In the automatic tracking apparatus disclosed in Published Examined Japanese Patent Application No. 59-32742, after a luminance signal of each pixel is subjected to analog/digital conversion, the converted digital luminance signals are added to obtain a one-dimensional sum signal, and this sum signal is detected. Therefore, the automatic tracking apparatus must comprise a frame memory for temporarily storing the digital luminance signals, resulting in a large circuit arrangement. In addition, since luminance signals must be read out in units of pixels in order to obtain a sum signal, an arithmetic operation for addition is time-consuming.

In the techniques disclosed in Published Examined Japanese Patent Application No. 60-28475 and Published Unexamined Japanese Patent Application No. 61-12177, although tracking can be performed when an object to be tracked is present in a picture to be imaged, tracking cannot be performed when an object to be tracked moves outside a picture to be imaged. Especially when a telephoto lens is mounted to narrow a field, if a camera is moved from a first target to a second target present outside a picture and then moved toward the first target again, the first target may be lost.

When a camera is moved to photograph a scene by several frames and the photographed frames are combined later, i.e., when a so-called panorama photograph is to be taken, a photographer remembers specific objects in a scene and moves a camera with reference to the objects. Therefore, since taken photographs have an unnecessary overlapped portion or do not have a necessary portion, they sometimes cannot be combined well.

When an automatic tracking apparatus is arranged to change the size of a tracking field in accordance with the size of an object to be photographed, the number of photoelectric conversion elements to be used in projection is changed in accordance with the set size of the tracking field. Therefore, the level of a projection luminance signal is undesirably changed in accordance with setting of the size of the tracking field. That is, the signal level of the projection luminance signal is decreased when the tracking field is small and it is increased when the tracking field is large. Therefore, in a conventional system, when a correlation arithmetic operation is to be performed by using the obtained projection luminance signal, a method of performing the correlation arithmetic operation must be switched in accordance with the size of a tracking field to maintain the precision in a moving amount to be calculated of an object to be photographed constant.

In order to calculate the luminance of an object to be photographed by further multiplying or adding horizontal or vertical projection luminance signals, a certain correction arithmetic operations must be performed since the luminance of the object to be photographed changes in accordance with the size of the tracking field. When the size of the tracking field is large and the luminance of an object to be photographed is high, the obtained projection luminance signal may be too high.

When an automatic tracking apparatus is to be mounted on a video camera as disclosed in Published Unexamined Patent Application No. 60-253887, a video signal originally required by the video camera for image signal processing can be used in automatic tracking. In an instrument not generating a video signal such as a still camera, however, it is difficult to apply this technique to automatically track a moving object to be photographed. In addition, if a circuit for obtaining a video signal is additionally provided, the size of a circuit arrangement is increased.

When an automatic tracking apparatus is to be mounted on a still camera such as a single-lens reflex camera as disclosed in Published Unexamined Japanese Patent Application No. 64-1921, an optical system different from an optical system for film photographing must be provided to arrange an automatic tracking imaging device therein. In this single-lens reflex camera, a finder optical system is provided independently of the film photographing optical system. By moving the position of a reflecting mirror arranged behind a photographic lens, light from an object to be photographed transmitted through the photographic lens is controlled to be guided to the film photographing optical system or the finder optical system. Therefore, the automatic tracking imaging device can be most easily arranged in the finder optical system.

When the automatic tracking imaging device is arranged in the finder optical system, however, automatic tracking cannot be performed during photographing since light from an object to be photographed does not reach the finder optical system. Therefore, if an object to be photographed moves during photographing, the automatic tracking apparatus cannot recognize the position of the object to be photographed after photographing. Especially in an automatic tracking apparatus of a type which sets a specific region in a picture to be taken as a tracking field and tracks an object to be photographed in this tracking field, if an object to be photographed present in the tracking field immediately before photographing moves outside the tracking field immediately after photographing, an entirely different object to be photographed may be tracked thereafter.

SUMMARY OF THE INVENTION

Accordingly, an object of the present invention to provide a display system of a camera, having a tracking apparatus which can easily determine a moving amount of an imaging region, has high operability, and is effective especially when a plurality of targets present inside and outside a picture are to be tracked or when taken photographs are to be combined.

It is another object of the present invention to provide an automatic tracking apparatus which can constantly, correctly track an object to be photographed with a small and simple circuit arrangement while the luminance signal level of an object to be photographed is not adversely affected by the size of a tracking field.

It is still another object of the present invention to provide a display system of a camera, having a tracking apparatus which can correctly track and perform photometry for an object to be photographed even if the object to be photographed moves during photographing.

It is still another object of the present invention to provide a display apparatus for photographing in which a portion of an image to be photographed and subjected to photometry can be easily checked to prevent the same portion from being subjected to photometry a plurality of times, thereby constantly obtaining desired exposure.

It is still another object of the present invention to provide an image moving amount arithmetic operating apparatus which can operate at a high speed with a small circuit arrangement.

According to an aspect of the present invention, there is provided a display apparatus of a camera, comprising a two-dimensional sensor means for repetitively imaging an object to be photographed and generating a two-dimensional luminance signal, a pattern signal generating means for repetitively generating a one-dimensional pattern signal from the two-dimensional luminance signal, a memory means for storing an immediately preceding pattern signal each time the pattern signal generating means generates a new pattern signal, a moving amount detecting means for performing, after the memory means stores an immediately preceding pattern signal, a correlation arithmetic operation between a new pattern signal and the immediately preceding pattern signal stored in the memory means to detect a moving amount of an object to be photographed in the repetition time period, and for performing the correlation arithmetic operation each time the memory means stores an immediately preceding pattern signal, and a display means for displaying a moving amount of an object to be photographed in accordance with the detected moving amount by using the width of a picture to be photographed as a basic unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 14 is a view for explaining a range which can be photographed by a camera with respect to the entire field;

FIG. 16 is a flow chart for explaining detection of a one-dimensional sum signal;

FIG. 17 is a flow chart for explaining an arithmetic operation of a horizontal moving amount of an object to be photographed;

FIG. 21 is a block diagram schematically showing an arrangement of a MOS imaging device according to another embodiment of the present invention;

FIG. 22 is a block diagram schematically showing an automatic tracking apparatus using the MOS imaging device shown in FIG. 21;

FIG. 26 is a circuit diagram showing an internal arrangement of a vertical scanning register;

FIG. 27 is a timing chart for explaining an operation of the vertical scanning register;

FIG. 29 is a timing chart for explaining an operation of the vertical scanning register performed when scanning lines are to be selected with an arbitrary pitch;

FIG. 30 is a view for explaining a first photometric region;

FIGS. 31A and 31B are a view showing an object to be photographed and a photometric region obtained when the first photometric region is selected, and a graph showing a vertical projection waveform obtained when the first photometric region is selected, respectively;

FIG. 32 is a view for explaining a second photometric region;

FIGS. 33A and 33B are a view showing an object to be photographed and a photometric region obtained when the second photometric region is selected, and a graph showing a vertical projection wavelength obtained when the second photometric region is selected;

FIGS. 34A and 34B are a schematic perspective view showing an arrangement of the display apparatus shown in FIG. 9 in which light-emitting members are arranged on a flat plate, and a view showing a finder field of this display apparatus, respectively;

FIGS. 35A and 35B are a schematic view showing another arrangement of the display apparatus shown in FIG. 9 in which light-emitting members are arranged in a line or array in each of the horizontal and vertical directions, and a view showing a finder field of this display apparatus;

FIGS. 36A and 36B are a schematic perspective view showing still another arrangement of the display apparatus shown in FIG. 9 in which light is radiated from behind a liquid crystal display device to display a frame-like tracking field, and a view showing a finder field of this display apparatus;

FIGS. 39A and 39B are schematic views showing a state in which a tracking field moves in accordance with the movement of an object to be photographed;

FIG. 40 is a view showing a relationship between a pixel arrangement of an XY address imaging device and coordinates concerning the position of an object to be photographed;

FIG. 41 is a view showing a list indicating the contents of a RAM for data storage provided in a CPU for controlling an operation of the automatic tracking apparatus shown in FIG. 22;

FIG. 50 is a flow chart showing an algorithm of an XSFT subroutine shown in FIG. 42;

FIGS. 51 and 52 are views for explaining the XSFT subroutine shown in FIG. 50;

FIG. 53 is a flow chart showing an algorithm of a FOCUS subroutine shown in FIG. 42;

FIG. 54 is a schematic sectional view showing another focus adjustment control method;

FIG. 56 is a block diagram showing an arrangement for outputting moving amount information outside a camera, in which an electric pivot table is driven by the moving amount information;

FIG. 57 is a schematic perspective view showing a mechanism of the electric pivot table shown in FIG. 56;

FIGS. 58A and 58B are views concerning a case wherein figure information is output and showing decoded states of signals supplied from a pair of signal lines $XPO_1$ and $XPO_2$ and a pair of signal lines $YPO_1$ and $YPO_2$, respectively;

FIG. 59 is a block diagram showing another arrangement for outputting moving amount information outside a camera, in which the direction of radiated light is changed by the moving amount information so that the radiated light is constantly directed to an object to be photographed;

FIG. 64 is a schematic perspective view showing an arrangement in which a finder unit can be detachably mounted on a camera main body.

DETAILED DESCRIPTION OF THE PREFERRED EMBODIMENTS

Embodiments of the present invention will be described below with reference to the accompanying drawings.

Figure 1:
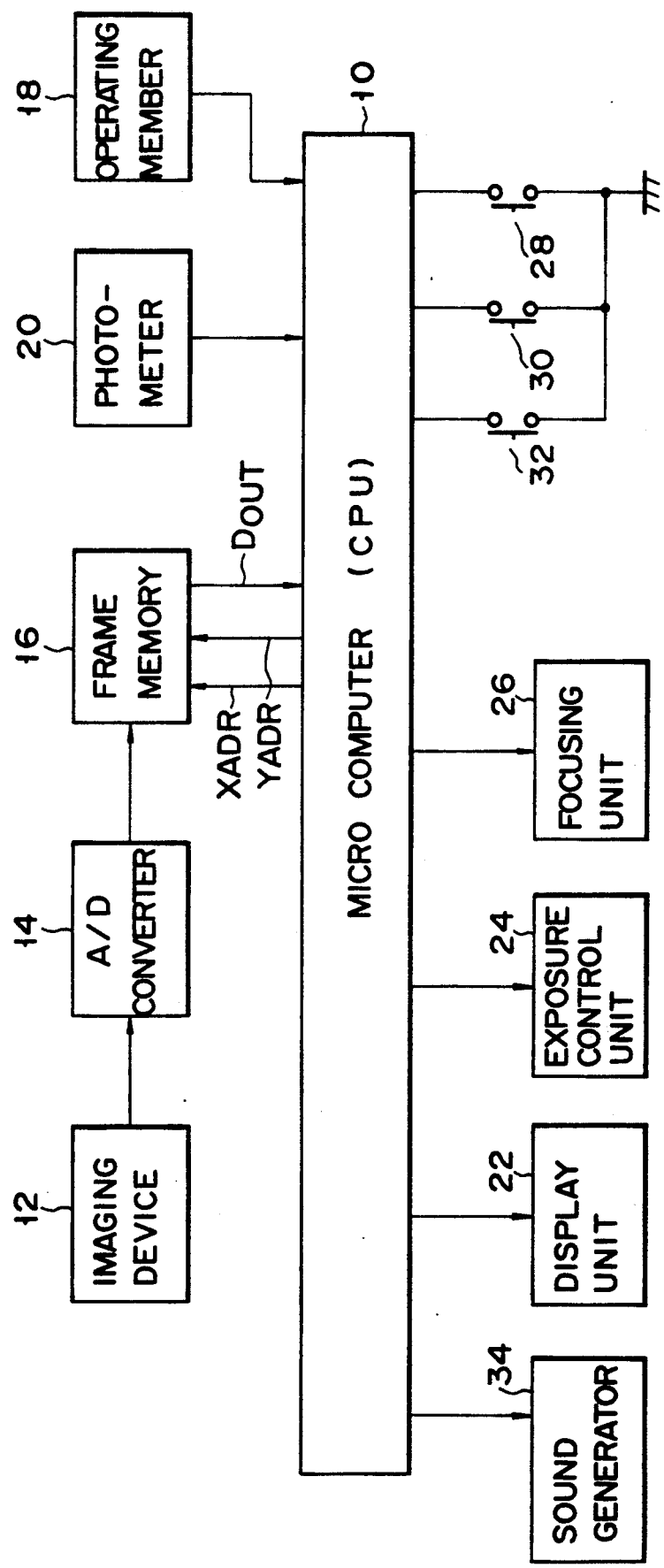
FIG. 1 is a block diagram schematically showing an arrangement of a controller of a display system of a camera having a tracking apparatus of the present invention.

FIG. 1 schematically shows an arrangement of a controller of an imaging display apparatus according to the present invention.

Referring to FIG. 1, reference numeral 10 denotes a microcomputer (to be abbreviated as a CPU hereinafter) for controlling the overall apparatus. The CPU 10 is connected to a frame memory 16 for storing an output from an analog-to-digital (A/D) converter 14 for converting an analog image signal corresponding to an object to be photographed as an image to be photographed imaged by an imaging device 12 as an imaging means into digital image data, an operating member 18 for a photographer to operate the apparatus, a photometer 20 for measuring a luminance of an object to be photographed, a display unit 22 for displaying a moving amount or a photometric point (photometric portion) of an object to be photographed, an exposure control unit 24, a focusing unit 26 for focusing a lens on an object to be photographed, a focusing start button 28 for activating the focusing unit 26, a spot button 30 for setting a spot photometry mode to obtain a spot photometric value, a clear button 32 for setting an average photometry mode from the spot photometry mode to obtain an average photometric value, and a sound generator 34 for generating a sound when the focusing start button 28, the spot button 30, or the clear button 32 is operated or in accordance with the moving amount of the object to be photographed.

The imaging device 12 is constituted by an imaging device such as a CCD (charge coupled device) or a MOS (metal oxide semiconductor).

The CPU 10 calculates the moving amount of an object to be photographed in accordance with the digital image data stored in the frame memory 16. In this case, the CPU 10 can read out arbitrary image data ($D_{OUT}$) from the memory 16 by setting a horizontal address (XADR) and a vertical address (YADR). The CPU 10 also performs, e.g., an exposure arithmetic operation in accordance with a photometric value supplied from the photometer 20 and a focusing arithmetic operation for calculating a focal length to an object to be photographed in accordance with the image data.

A method of arithmetically operating the moving amount of an object to be photographed performed by the CPU 10 will be described below.

Figure 2:
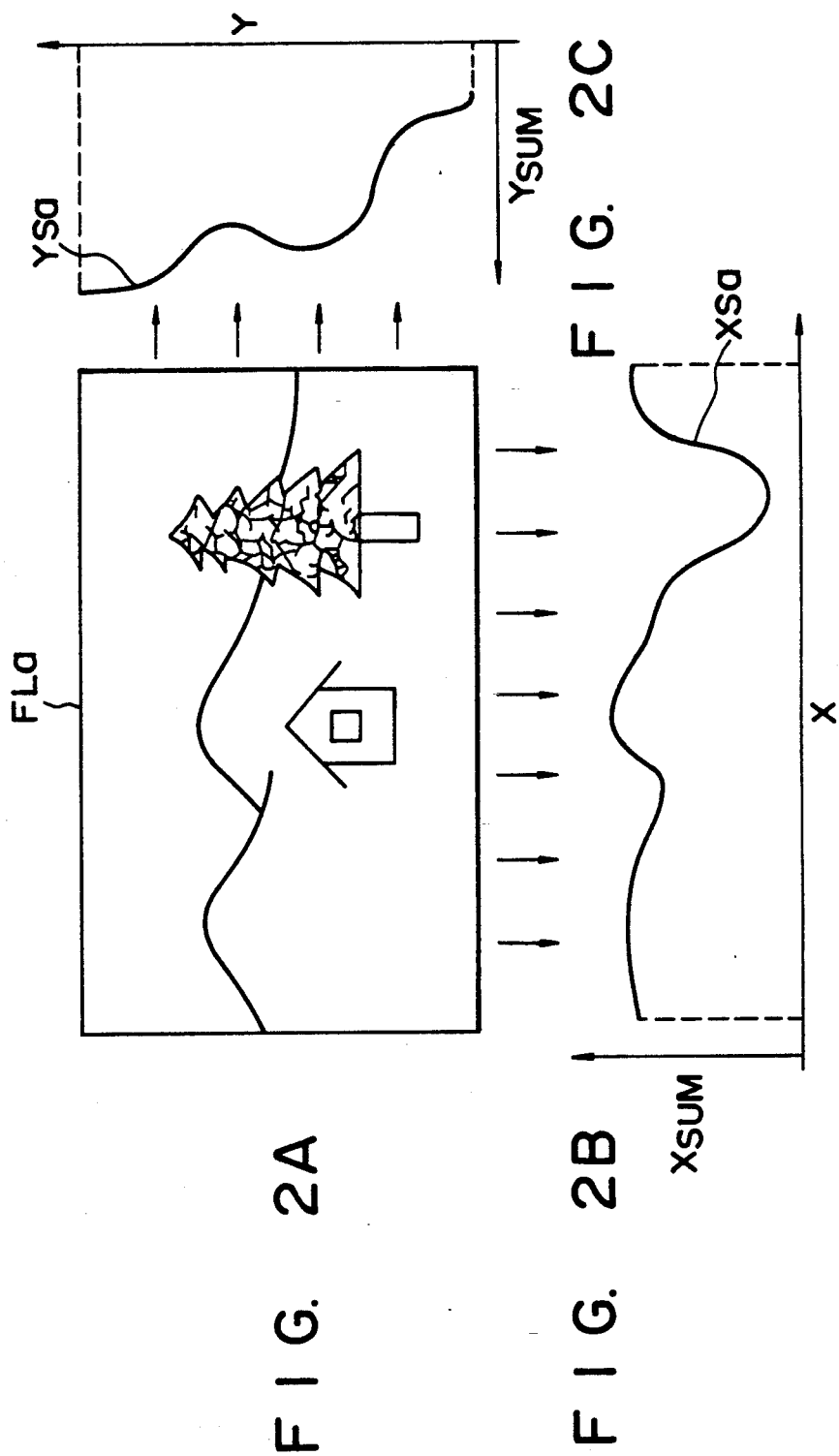
FIGS. 2A, 2B and 2C are views for explaining a method of arithmetically operating a moving amount of an object to be photographed, in which detection of horizontal and vertical one-dimensional sum signals is explained by taking a monochromatic reference object to be photographed as an example.

For example, assume that an image FLa of an object to be photographed as shown in FIG. 2A is stored in the frame memory 16. In order to read out image data, the CPU 10 obtains a sum signal ($X_{SUM}$) of luminance signals pixels in the vertical direction to detect a one-dimensional sum signal XSa in the horizontal direction (X-direction). In this sum signal XSa, as shown in FIG. 2B, since a dark object portion such as a tree is present in the vertical direction of the image FLa, a sum value of this portion has a smaller waveform than those of the other portions.

Subsequently, the CPU 10 obtains a sum signal ($Y_{SUM}$) of luminance signals of pixels in the horizontal direction to detect a one-dimensional sum signal YSa in the vertical direction (Y-direction). In this sum signal YSa, as shown in FIG. 2C, since a bright object portion such as the sky is present in the horizontal direction of the image FLa, a sum value of this portion has a larger waveform than those of the other portions.

The horizontal (X-direction) sum signal XSa and the vertical (Y-direction) sum signal YSa detected in this manner are temporarily stored in a RAM (random access memory) or the like (not shown) in the CPU 10.

Figure 3:
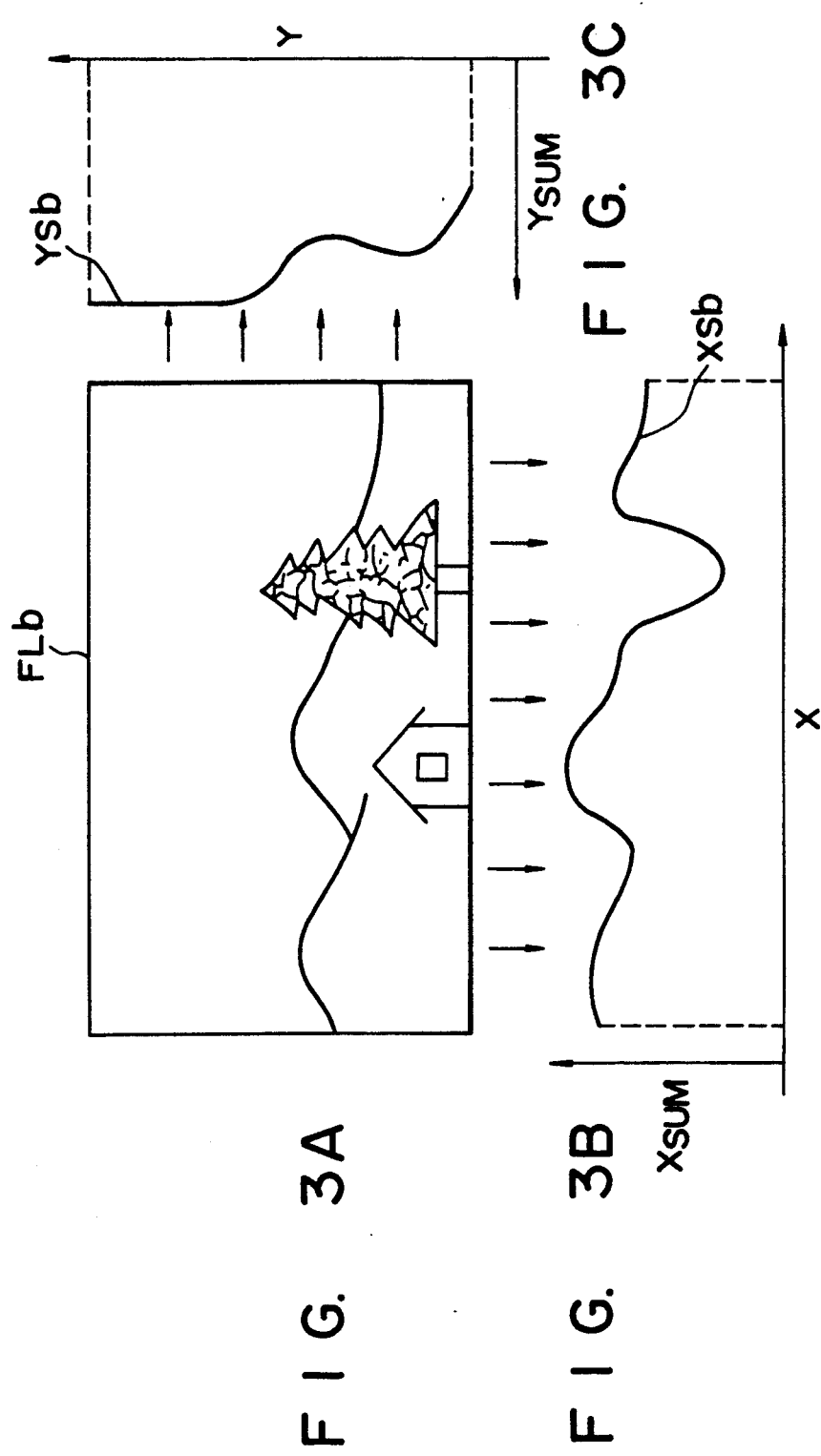
FIGS. 3A, 3B and 3C are views for explaining detection of horizontal and vertical one-dimensional sum signals by taking an object to be photographed obtained when a camera is moved as an example.

In this state, assume that the camera is moved in the upper right direction and an image FLb of an object to be photographed as shown in FIG. 3A is obtained. Similar to the image FLa of the object to be photographed, the CPU 10 detects a sum signal XSb in the X-direction and a sum signal YSb in the Y-direction. The signals XSb and YSb in the X- and Y-directions have waveforms as shown in FIGS. 3B and 3C, respectively.

Figure 4:
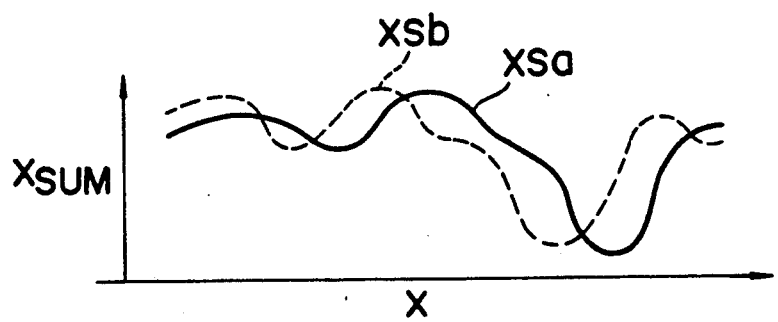
FIG. 4 is a graph for explaining an arithmetic operation of a horizontal moving amount of an object to be photographed.

When the sum signals XSa and YSa in the X- and Y-directions, respectively, for the image FLa and the sum signals XSb and YSb in the X- and Y-directions, respectively, for the image FLb are detected as described above, the CPU 10 arithmetically operates, e.g., the horizontal moving amount of the image of the object to be photographed. That is, the CPU 10 calculates the horizontal moving amount of the image in accordance with a correlation arithmetic operation between the two X-direction sum signals XSa and XSb. Actually, as shown in FIG. 4, the sum signal XSb in the X-direction for the image FLb is slightly shifted with respect to the sum signal XSa in the X-direction for the image FLa, and an absolute difference between the two signals is calculated while the signal XSb is shifted with respect to the signal XSb. A shift amount corresponding to a minimum absolute difference is obtained as the horizontal moving amount of the image.

Figure 5:
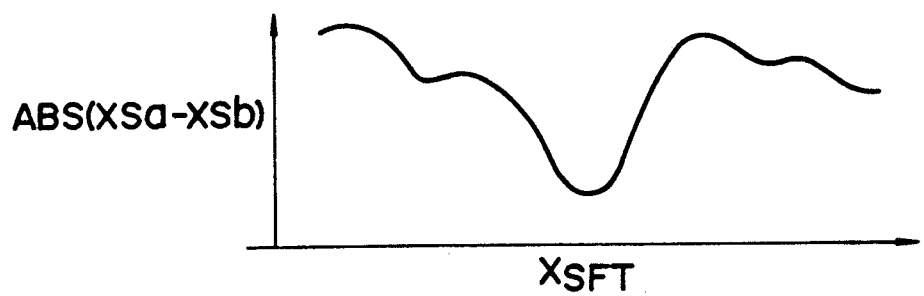
FIG. 5 is a graph for explaining a relationship between a horizontal shift amount of an object to be photographed and an absolute difference.

FIG. 5 shows an absolute difference ABS (XSa−XSb) with respect to a shift amount $X_{SFT}$ calculated as described above. FIG. 5 shows that when the sum signal XSb in the X-direction for the image FLb is shifted by a shift amount $X_{SFT}$ with which the absolute difference ABS (XSa−XSb) is minimized, a coincidence in the horizontal direction is high between the images FLa and FLb.

Figure 6:
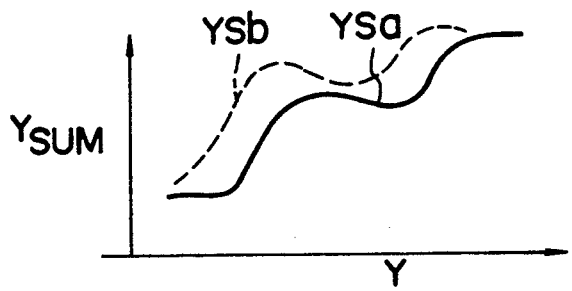
FIG. 6 is a graph showing an arithmetic operation of a vertical moving amount of an object to be photographed.

Similarly, the CPU 10 calculates the vertical moving amount of the image in accordance with a correlation arithmetic operation of the two Y-direction sum signals YSa and YSb. Also in this case, as shown in FIG. 6, the CPU 10 slightly shifts the sum signal YSb in the Y-direction for the image FLb with respect to the sum signal YSa in the Y-direction for the image FLa. The CPU 10 calculates an absolute difference between the two signals while shifting the signal YSb with respect to the signal YSa, and obtains a shift amount with which the absolute difference is minimized as the vertical moving amount of the image.

Figure 7:
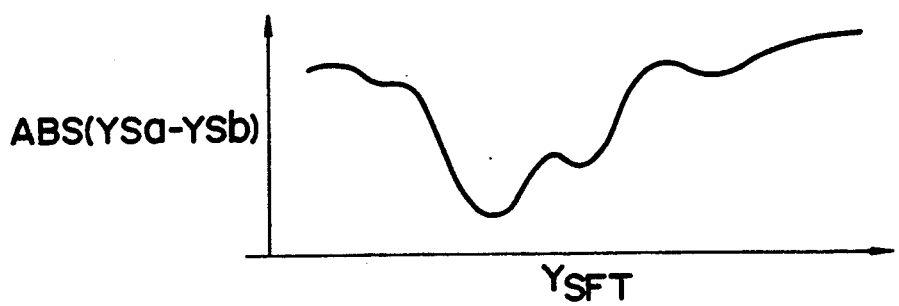
FIG. 7 is a graph for explaining a relationship between a vertical shift amount of an object to be photographed and an absolute difference.

FIG. 7 shows a relationship between the calculated absolute difference ABS (YSa−YSb) and a shift amount $Y_{SFT}$.

Figure 8:
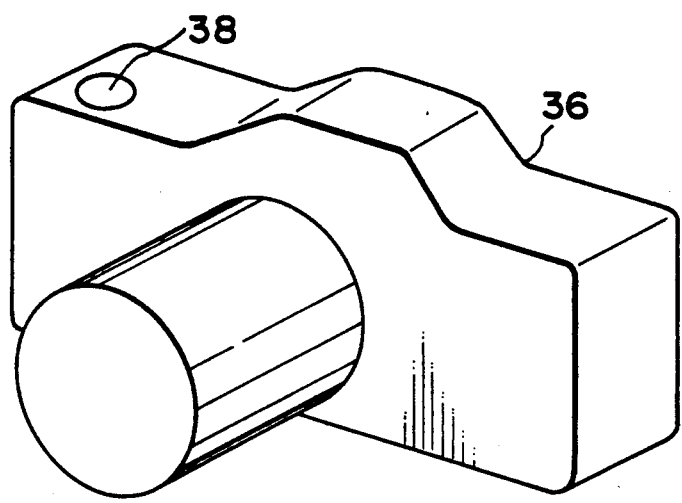
FIG. 8 is a perspective view showing an outer appearance of a single-lens reflex camera using a display system of a camera having the tracking apparatus shown in FIG. 1.
Figure 9:
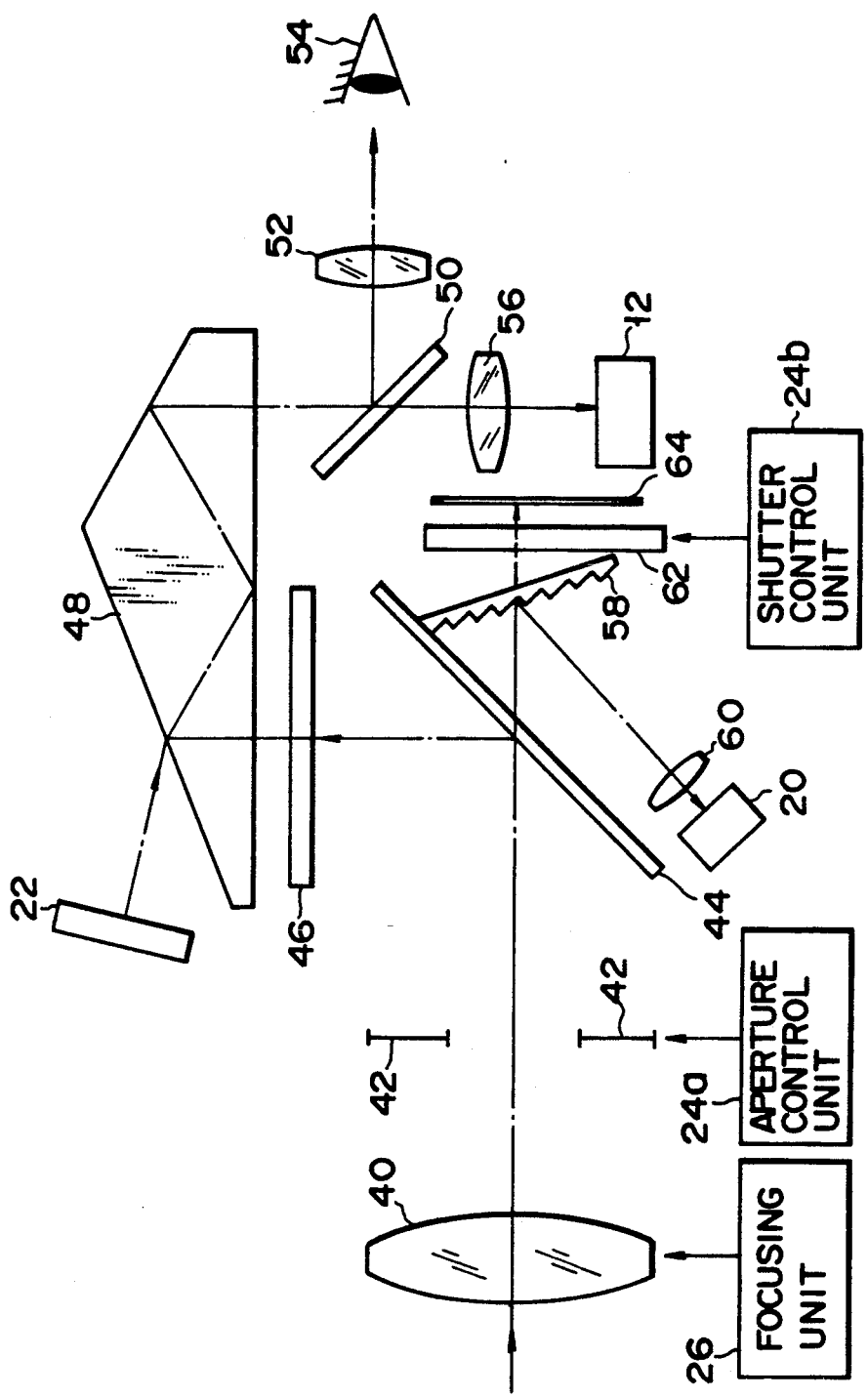
FIG. 9 is a schematic view showing an arrangement of the single-lens reflex camera shown in FIG. 8.

FIGS. 8 and 9 are a perspective view showing an outer appearance of a single-lens reflex camera using the present invention and a sectional view showing a schematic arrangement of the camera. A release button 38 is arranged at a predetermined position of an upper portion of a camera main body 36. The release button 38 constitutes part of the operating member 18.

Referring to FIG. 9, the optical axis center of an image of an object to be photographed (light from an object to be photographed) indicated by an alternate long and short dashed line is guided as an image of an object to be photographed for observation to an eye 54 at a finder portion through a photographic lens 40 to be operated by the focusing unit 26, an aperture 42 to be controlled by an aperture control unit 24a constituting the exposure control unit 24, a main half mirror 44, a screen 46, a prism 48, an eyepiece half mirror 50, and an eyepiece 52.

The light from an object to be photographed split by the half mirror 50 is guided to the imaging device 12 through an imaging lens 56.

The prism 48 has a half mirror structure on its first reflecting surface, and a display image from the display unit 22 is incident on the first reflecting surface. Therefore, the display image from the display unit 22 is synthesized with the image of an object to be photographed, and the synthesized image is guided to the eye 54 and the imaging device 12. When an $N_{SEL}$ mode is selected as a mode for measuring the luminance of an object to be photographed, the display unit 22 displays the position of the object by overlapping the object to be photographed. The arrangement and display method of the display unit 22 may be freely selected as long as the above object is achieved.

The light from an object to be photographed split by the main half mirror 44 is reflected by a photometric Fresnel mirror 58 and incident on the photometer 20 through a photometric lens 60.

Since the main half mirror 44 and the photometric Fresnel mirror 58 are moved up toward the screen 46, the light from an object to be photographed is guided onto the surface of a film 64 as an image to be photographed via a shutter 62 to be controlled by a shutter control unit 24b constituting the exposure control unit 24.

Note that in the above camera, an arrangement of the imaging device 12, the photometer 20, and the optical system is considerably small. However, the arrangement is not limited to this one. For example, independent optical systems may be used for the imaging device 12 and the photometer 20 to guide light from an object to be photographed.

Figure 10:
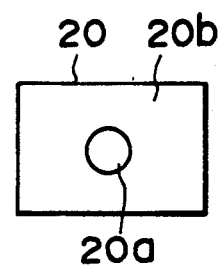
FIG. 10 is a plan view showing a practical arrangement of a photometer shown in FIG. 8.

FIG. 10 shows an arrangement of a photometric surface of the photometer 20. The photometer 20 has a spot photometric pattern 20a for partially performing photometry for an image of an object to be photographed to obtain a spot photometric value, and an average photometric pattern 20b for performing average photometry to obtain an average photometric value.

Figure 11:
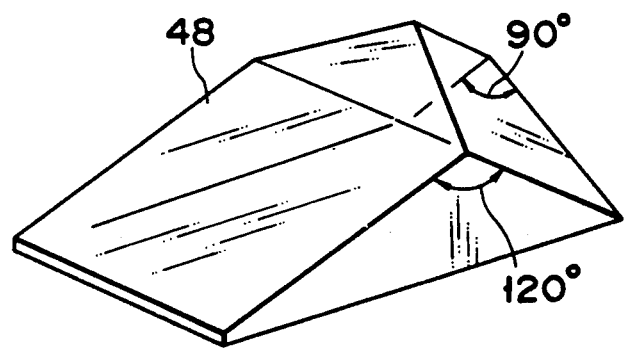
FIG. 11 is a perspective view showing an outer appearance of a practical arrangement of a prism shown in FIG. 8.

FIG. 11 schematically shows a structure of the prism 48 used in this embodiment.

Figure 12:
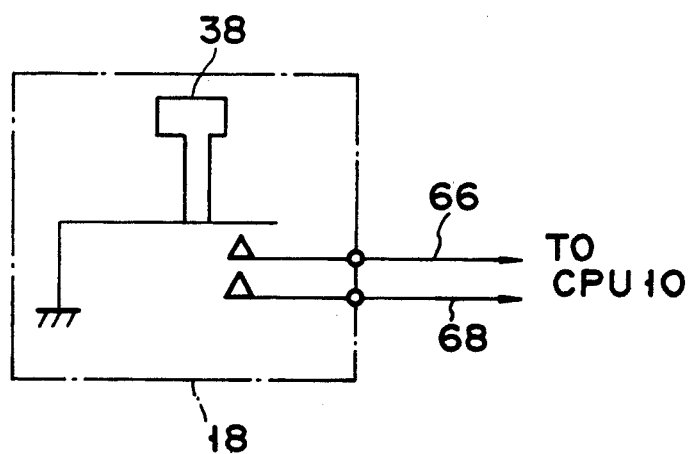
FIG. 12 is a sectional view schematically showing an arrangement of an operating member shown in FIG. 8.

FIG. 12 is a sectional view schematically showing an arrangement of the operating member 18. As shown in FIG. 12, the operating member 18 is constituted by the release button 38, a DSW 66 to be turned on by a first stroke of the release button 38 when the button is depressed, and an RSW 68 to be turned on by its second stroke.

An operation of the first embodiment having the above arrangement will be described below.

Figure 13:
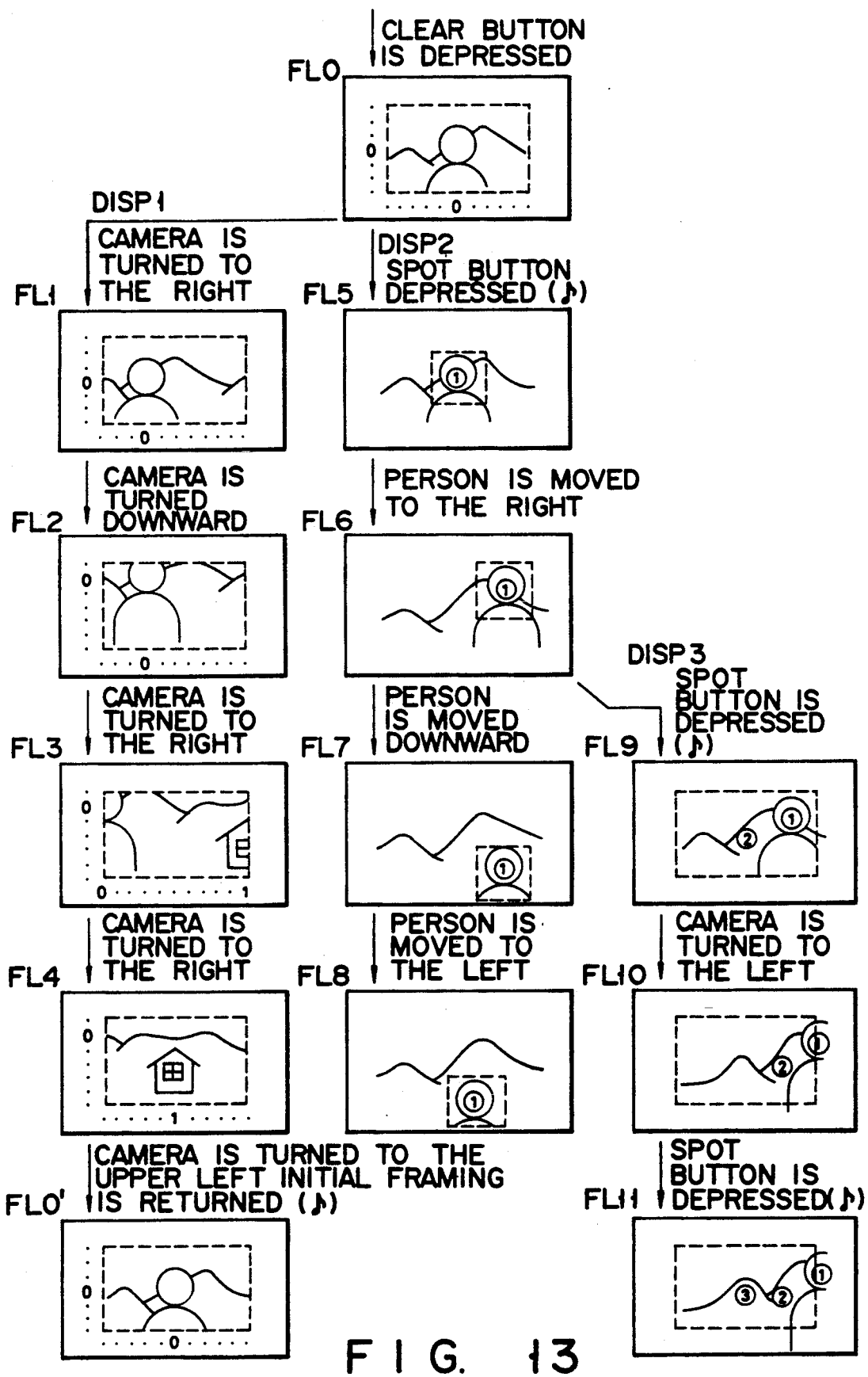
FIG. 13 is a view showing changes in display of a finder of the camera using the display system of a camera having the tracking apparatus shown in FIG. 1.

FIG. 13 shows changes in display in the display picture of the finder of the camera, i.e., changes in image of an object to be photographed which is observed by the eye 54 and in image displayed by the display unit 22 in the order of operation procedures.

Referring to FIG. 13, a portion surrounded by a solid line indicates the field of the finder, and a portion except for a broken line indicates an image observed by a photographer. A portion surrounded by a broken line indicates a region corresponding to an area in the frame memory 16 from which the CPU 10 reads out image data.

In this embodiment, the display state changes like DISP1, DISP2, and DISP3 in accordance with the motion of the camera and the operation state of the spot button 30 or the clear button 32.

If a range which can be photographed by the camera with respect to the entire field is ranges as indicated by broken lines in FIG. 14, each range is called a "framing (imaging region)". Each framing is given a number called a framing No. as enclosed in parentheses in FIG. 14 in accordance with its position in the horizontal and vertical directions. In this embodiment, an upper middle framing is registered as an initial position, i.e., a reference image to be photographed. Therefore, a framing No. (0,0) is given to this framing. Note that registration of this initial framing is performed by operating the clear button 32. The framing No. is an image displayed by the display unit 22.

A display operation on the display picture of the finder will be described below.

Referring to FIG. 13, when the clear button 32 is operated, the range of an image of an object to be photographed currently displayed on the display picture is registered as an initial framing FL0. On this display picture, a horizontal framing No. is indicated by "0" displayed below the image by the display unit 22, and a vertical framing No. is indicated by "0" displayed at the left side of the image by the display unit 22. In this case, the photometer 20 is set to perform average photometry.

Processing of DISP1 will be described first.

That is, when the camera is turned to the right from the state of the initial framing FL0, the image is moved to the left to form a display picture indicated by a framing FL1. At this time, "0" as the horizontal framing No. displayed below the image by the display unit 22 is moved to the left in accordance with the movement of the image.

When the camera is turned downward from the state of the framing FL1, the image is moved upward to form a display picture indicated by a framing FL2. At this time, "0" as the vertical framing No. displayed at the left side of the image by the display unit 22 is moved upward accordingly.

When the camera is turned to the right from the state of the framing FL2, the image is moved to the left to form a display picture indicated by a framing FL3. At this time, "0" as the horizontal framing No. displayed below the image is moved to the left in accordance with the movement of the image, and "1" is displayed at the right side. This displayed number "1" indicates a horizontal No. of a framing given with a number (0,1) in FIG. 14.

When the camera is turned to the right from the state of the framing FL3, the image is moved to the left to form a display picture indicated by a framing FL4. At this time, "1" as the horizontal framing No. displayed below the image is moved to the left accordingly. This displayed number "1" is located at the center of a portion below the image and therefore indicates that the camera is turned to the right by exactly one frame (picture) from the previous framing FL0.

When the camera is turned in the upper left direction from the state of the framing FL4, the image is moved in the lower right direction to return to the display picture indicated by a framing FL0' which is the same as the framing FL0. As a result, a horizontal framing No. "0" is displayed at the center of a portion below the image, and a vertical framing No. "0" is displayed at the center of a portion at the right side of the image.

When a return to the initial framing FL0 is detected, the sound generator 34 generates a sound ($\sharp$). In this case, a photographer can easily understand in accordance with the sound from the generator 34 and the displayed framing No. (0,0) that the framing is returned to the initial framing FL0, i.e., the initial position is restored.

As described above, if a framing is changed from a person (first target) to a building (second target), a moving amount of framing can be detected. Therefore, when a scene is to be photographed by several frames and the photographed frames are connected like a panorama photograph, this camera is highly operable and very convenient.

In order to return the framing from the second to first target, a photographer can determine the moving amount by the framing No. or the sound. Therefore, this camera is very effective upon frequent change of the framing when a field is narrowed by a telephoto lens.

In the above embodiment, the sound is generated only when the framing is returned to its initial position. However, the sound may be generated each time a framing No. is changed to acknowledge the change to a photographer.

Processing of DISP2 will be described below.

That is, assume that the spot button 30 is operated in the state indicated by the framing FL0. In this case, as indicated by a framing FL5, image data corresponding to a portion indicated by a broken line at the center of the display picture is initially registered, and this portion is subjected to spot photometry by the photometer 20. Note that in this embodiment, a person is initially registered.

In correspondence with the photometric point, "①" is displayed in the finder by the display unit 22. As a result, "①" is overlapped or superposed on the image of an object to be photographed and displayed at the center of the display picture. In addition, a sound ($\sharp$) is generated once by the sound generator 34.

In this state, when the person moves to the right, "①" is moved to the right and a region (indicated by a broken line in FIG. 13) from which image data is to be fetched is moved to the right accordingly, as indicated by a framing FL6.

When the person moves downward, "①" is moved downward and the region from which image data is to be fetched is moved downward accordingly, as indicated by a framing FL7.

When the person moves to the left in the state of framing FL7, "①" is moved to the left accordingly as indicated by a framing FL8. At the same time, the region from which image data is to be fetched is moved to the left. A technique of calculating a shift amount of a focal point from image data is known. Therefore, an arbitrary object to be photographed present except for the center of the display picture can be automatically tracked and the lens can be focused on the object in combination with the above technique.

Processing of DISP3 will be described below.

That is, assume that the spot button 30 is operated again, i.e., the spot button 30 is depressed when the display picture is set in the state indicated by the framing FL6 upon depression of the spot button 30. In this case, as indicated by a framing FL9, the entire image data (portion surrounded by a broken line in FIG. 13) on the display picture is initially registered, and its central portion is subjected to spot photometry by the photometer 20.

In correspondence with the photometric point, "②" indicating the second spot photometric operation is displayed on the finder. As a result, "②" is overlapped on the image of an object to be photographed and displayed at the center of the display picture. In this case, therefore, "①" and "②" are overlapped on the image and displayed on the display picture. In addition, a sound (♪) is generated once by the sound generator 34.

When the camera is moved to the left from the state of the framing FL9, the scene and the person are moved to the right and "①" and "②" are moved to the right accordingly, as indicated by a framing FL10.

When the spot button 30 is depressed in the state of the framing FL10, the photometer 20 performs spot photometry for the central portion of the display picture, and the sound generator 34 generates a sound (♪) once.

"③" indicating the third spot photometry is similarly displayed by the display unit 22 in correspondence with the photometric point. As a result, "③" is overlapped on the image of an object to be photographed and displayed at the center of the display picture. In this case, "①", "②", and "③" are overlapped on the image and displayed on the display picture.

As described above, in so-called "multispot photometry", portions subjected to photometry are overlapped on an image of an object to be photographed and displayed on a picture, and the display picture is automatically moved to track a scene or a person subjected to photometry even if a camera is moved. Therefore, the same portion can be prevented from being erroneously subjected to photometry a plurality of times, and desired exposure can be effectively obtained.

In order to arithmetically operate the movement of portions subjected to multispot photometry, the overall movement on the display picture may be detected as described above. However, as in the DISP2 processing, a small detection region maybe provided for each spot photometry to independently calculate and display a moving amount of an object to be photographed in each region. Especially when a plurality of moving objects are present, the above method is effective.

Figure 15:
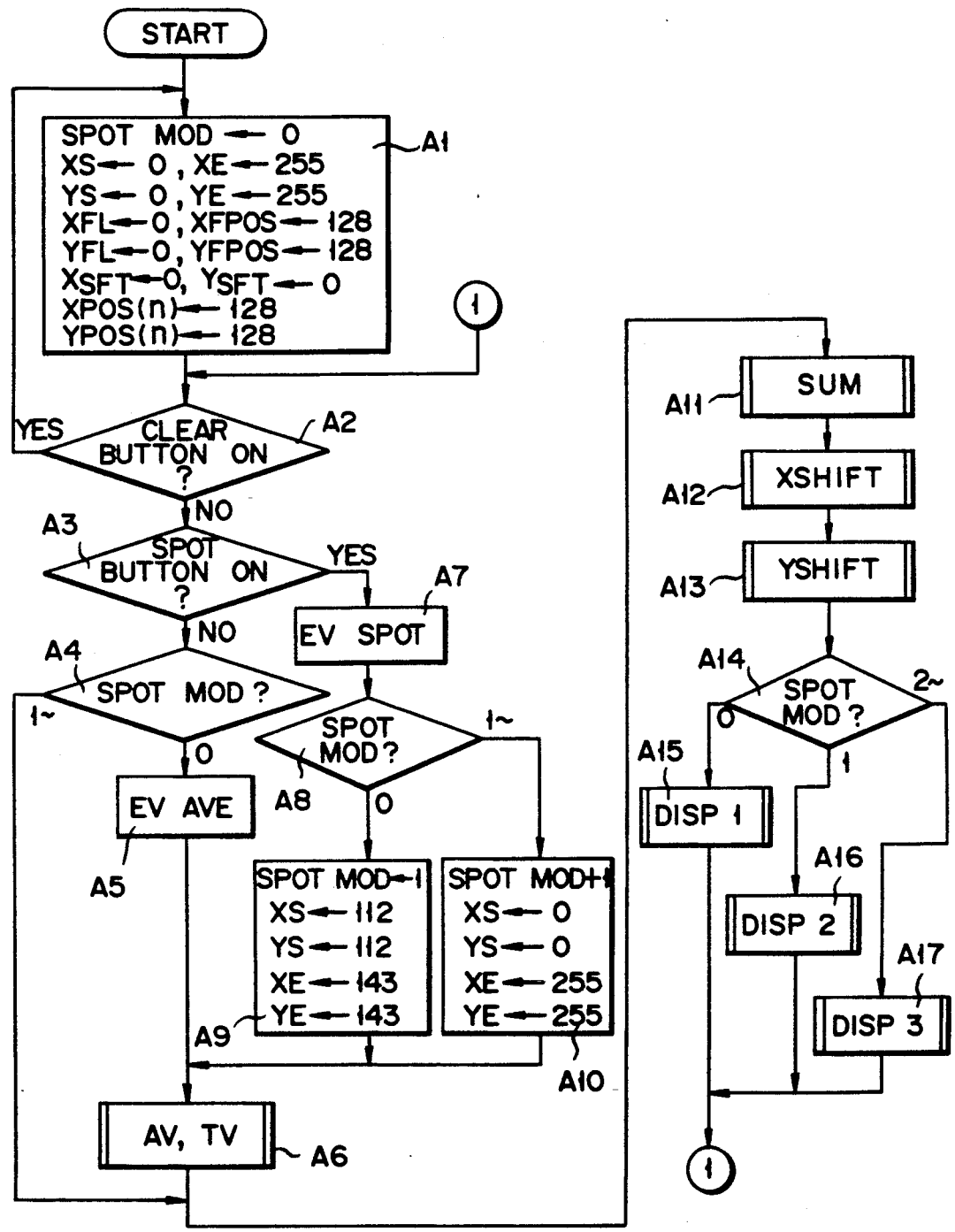
FIG. 15 is a flow chart for explaining a display operation.

FIG. 15 is a flow chart showing processing performed by the CPU 10 to realize the display operation shown in FIG. 13. Note that the frame memory 16 is a matrix memory in which the entire memory area has a resolution of 256 bits in the column direction and 256 bits in the row direction and arbitrary pixel data can be read out by setting an address. In the following description, the horizontal direction is represented by the "X-direction," and the vertical direction is represented by the "Y-direction".

In step A1, each variable is initialized. For example, if an average photometry mode is set, the overall picture is set as a region for arithmetically operating a moving amount, and "0" is set as a framing No. and displayed at the center of a portion below and at the center of the left side of the display picture. More specifically, a spot photometry number SPOT MOD is set to be "0 (=average photometry)", a read start horizontal address XS is set to be "0", a read start vertical address YS is set to be "0", a read end horizontal address XE is set to be "255", a read end vertical address YE is set to be "255", a horizontal framing No. XFL is set to be "0", a vertical framing No. YFL is set to be "0", a display position XFPOS of the horizontal framing No. XFL is set to be "128", a display position YFPOS of the vertical framing No. YFL is set to be "128", a horizontal image moving amount $X_{SFT}$ is set to be "0", a horizontal display position XPOS(n) of an nth spot photometric portion is set to be "0", and a vertical display position YPOS(n) of the nth spot photometric portion is set to be "0".

In step A2, the CPU 10 checks whether the clear button 32 is depressed. If the CPU 10 determines in step A2 that the clear button 32 is depressed, the processing in step A1 is repeated.

If the CPU 10 determines in step A2 that the clear button 32 is not depressed, the CPU 10 checks in step A3 whether the spot button 30 is depressed. If the CPU 10 determines in step A3 that the spot button 30 is depressed, the flow advances to step A7 to be described later.

If the CPU 10 determines in step A3 that the spot button 30 is not depressed, the flow advances to step A4 to check whether an average photometry mode is set. If the CPU 10 determines in step A4 that the average photometry mode is set (the spot photometry number SPOT MOD is "0"), the flow advances to step A5. If the CPU 10 determines in step A4 that the spot photometry mode is set (the spot photometry number SPOT MOD is "1 ... "), the flow advances to step A11 to be described later.

In step A5, an output from the photometer 20 is A/D-converted to obtain an average photometric value EV AVE. When the average photometric value EV AVE is obtained, the flow advances to step A6.

In step A6, an exposure arithmetic operation is performed by a known program arithmetic operation or the like to calculate various control values such as an aperture value AV and a shutter speed TV. When this exposure arithmetic operation is finished, the flow advances to step A11.

If the CPU 10 determines in step A3 that the spot photometry mode is set, the flow advances to step A7, and the output from the photometer 20 is A/D-converted to obtain a spot photometric value EV SPOT.

In step A8, the number of spot photometric operations in step A7 is checked in accordance with the spot photometry number SPOT MOD. If the CPU 10 determines in step A8 that the number of spot photometric operations is one (SPOT MOD=0), the flow advances to step A9. If the CPU 10 determines in step A8 that the number of photometric operations is two or more (SPOT MOD=1 ... ), the flow advances to step A10.

In step A9, a read address of image data is set at the center of the display picture. That is, "1" is set in the spot photometry number SPOT MOD, "112" is set in the read start horizontal address XS and the read start vertical address YS, and "143" is set in the read end horizontal address XE and the read end vertical address YE. When setting in step A9 is finished, the flow advances to step A6.

In step A10, the spot photometry number SPOT MOD is incremented by "1", and the overall picture is set as a region for arithmetically operating a moving amount. That is, "0" is set in the read start horizontal address XS and the read start vertical address YS, and "255" is set in the read end horizontal address XE and the read end vertical address YE. When setting in step A10 is finished, the flow advances to A6.

In step A11, one-dimensional sum signals in the X-and Y-directions are detected by image data in a region designated by the addresses XS, YS, XE, and YE. That is, image data in a region designated by the read start horizontal address XS, the read start vertical address YS, the read end horizontal address XE, and the read end vertical address YE set in step A1, A9, or A10 is read out from the frame memory 16 in units of pixels. The readout image data are added in the vertical and horizontal directions. As a result, the sum signal XSa in the X-direction and the sum signal YSa in the Y-direction with respect to the image FLa of an object to be photographed as shown in FIGS. 2B and 2C or the one-dimensional sum signals XSb in the Y-direction and the one-dimensional sum signal YSb in the Y-direction with respect to the image FLb of an object to be photographed as shown in FIGS. 3B and 3C are detected.

In step A12, a horizontal image moving amount $X_{SFT}$ is arithmetically operated by using the X-direction sum signals XSa and XSb detected in step S11. That is, as shown in FIGS. 4 and 5, the X-direction moving amount $X_{SFT}$ of the image of an object to be photographed is calculated in accordance with a correlation arithmetic operation between the X-direction sum signal XSb with respect to the image FLb and the X-direction sum signal XSa with respect to the image FLa which is stored in advance as a reference.

The flow advances to step A13 to arithmetically operate a vertical image moving amount $Y_{SFT}$ of the image of an object to be photographed by using the Y-direction sum signals YSa and YSb detected in step A11. That is, as shown FIGS. 6 and 7, the Y-direction moving amount $Y_{SFT}$ of the image of an object to be photographed is calculated in accordance with a correlation arithmetic operation between the Y-direction sum signal YSb with respect to the image FLb and the Y-direction sum signal YSa with respect to the image FLa which is stored in advance as a reference.

In step A14, the spot photometry number SPOT MOD is checked. In accordance with the number of spot photometric operations, the processing of DISP1, DISP2, or DISP3 is performed. That is, if the CPU 10 determines that the number of spot photometric operations is "0", the flow advances to step A15, and display processing corresponding to DISP1 shown in FIG. 13 is performed in accordance with the horizontal and vertical image moving amounts $X_{SFT}$ and $Y_{SFT}$ obtained in steps A12 and A13. If the CPU 10 determines in step A14 that the number of spot photometric operations is "1", the flow advances to step A16, and display processing corresponding to DISP2 shown in FIG. 13 is performed in accordance with the horizontal and vertical image moving amounts $X_{SFT}$ and $Y_{SFT}$ obtained in steps A12 and A13. If the CPU 10 determines in step A14 that the number of spot photometric operations is "2 . . . (2 or more)", the flow advances to step A17, and display processing corresponding to DISP3 shown in FIG. 13 is performed in accordance with the horizontal and vertical image moving amounts $X_{SFT}$ and $Y_{SFT}$ obtained in steps A12 and A13.

When the display processing in any of steps A15, A16, and A17 is finished in this manner, the flow returns to step A2 to repeat the above processing.

FIG. 16 is a flow chart showing the processing SUM in step A11 shown in FIG. 15.

In step B1, a register XSUM(n) for a one-dimensional sum value in the X-direction is cleared. Note that n indicates an address in the X-direction. In step B2, a register YSUM(n) for a one-dimensional sum value in the Y-direction is cleared. Note that n indicates an address in the Y-direction.

In step B3, a start address (read start vertical address) YS in the Y-direction in a read area is set as an address YADR in the Y-direction. In step B4, a start address (read start horizontal address) XS in the X-direction in the read area is set as an address XADR in the X-direction.

In step B5, the addresses XADR and YADR are output to the frame memory 16. The flow advances to step B6, and pixel data $D_{OUT}$ of one pixel is output from the frame memory 16 in accordance with the address XADR and added to the one-dimensional sum value in the X-direction. A new one-dimensional sum value in the X-direction obtained by this addition is stored in the register XSUM (XADR). Similarly, in step B7, pixel data $D_{OUT}$ of one pixel is output from the frame memory 16 in accordance with the address YADR and added to the one-dimensional sum value in the Y-direction. A new one-dimensional sum value in the Y-direction obtained by this addition is stored in the register YSUM (YADR). When the one-dimensional sum values in the X and Y directions are stored in the registers in this manner, the flow advances to step B8, and the X-direction address XADR is incremented by one.

In step B9, the X-direction address XADR is compared with an end address (read end horizontal address) XE in the X-direction in the read area. If the X-direction address XADR does not reach the X-direction end address XE in the read area (XADR≦XE), the flow advances to step B5, and steps B5 to B9 are repeated. As a result, a o1.e-dimensional X-direction sum signal XSa (or XSb) obtained by sequentially adding image data of the X-direction start to end addresses XS to XE in units of pixels is stored in the register XSUM.

If the X-direction address XADR reaches the X-direction end address XE in the read area in step B9 (XADR>XE), the flow advances to step B10, and the Y-direction address YADR is incremented by one.

In step B11, the Y-direction address YADR is compared with the Y-direction end address (read end vertical address) YE in the read area. If the Y-direction address YADR does not reach the Y-direction end address YE in the read area (YADR≦YE), the flow advances to step B4, and steps B4 to B11 are repeated. As a result, a one-dimensional Y-direction sum signal YSa (or YSb) obtained by sequentially adding image data from the Y-direction start to end addresses YS to YE in units of pixels is stored in the register YSUM.

If the Y-direction address YADR reaches the Y-direction end address YE in the read area in step B11 (YADR>YE), the processing SUM is ended.

As described above, the one-dimensional sum signals XSa and YSa in the X- and Y-directions as shown in FIGS. 2B and 2C or the one-dimensional sum signals XSb and YSb in the X- and Y-directions as shown in FIGS. 3B and 3C are detected by reading out and sequentially adding, in units of pixels, the image data in the area designated by the addresses XS, YS, XE, and YE from the frame memory 16.

FIG. 17 is a flow chart showing the processing XSHIFT in step A12 shown in FIG. 15. This processing flow is an arithmetic operation generally called a "correlation arithmetic operation" for arithmetically operating a shift amount between two waveforms. The arithmetic operation of an absolute difference using the X-direction sum signals XSa and XSb shown in FIG. 4 corresponds to this arithmetic operation.

In step C1, a register SFT for a moving amount is temporarily set to be "−8", and a register SBSO for storing the total of the absolute values of the differences each obtained by setting an immediately preceding moving amount is temporarily set to be "FFFFh (h indicates a hexadecimal number)".

In step C2, a start address XS in the X-direction is set in a register m, and "0" is set in a register SBS for storing the total of the absolute values of the differences. The flow advances to step C3 to arithmetically operate a difference between the value of an immediately preceding X-direction one-dimensional sum signal XSa (XSUMO(m)) to be addressed by the register m and the value of a current X-direction one-dimensional sum signal XSb (XSUM(m+SFT)) to be addressed by the registers m and SFT. The calculated absolute value of the difference is added to the value of the register SBS. When this arithmetic operation is finished, the flow advances to step C4, and the value of the register m is incremented by one.

In step C5, the value of the register m is compared with the end address XE in the X-direction. If the value of the register m is equal to or smaller than the end address XE (m≦XE), the flow returns to step C3, and steps C3 to C5 are repeated. In this manner, the total of the absolute values of the differences is obtained assuming that the moving amount is "−8".

If the value of the register m is larger than the end address XE (m>XE), the flow advances to step C6.

In step C6, the value (the total of the absolute values of the differences) of the register SBS obtained as described above is compared with the value (the total of the absolute values of the differences each obtained by setting the immediately preceding moving amount) of the register SBSO. If the value of the register SBS is smaller than the value of the register SBSO in step C6 (SBS<SBSO), the flow advances to step C7. In step C7, the value of the register SBSO is reset by the value of the register SBS, and the value of the register SFT is input as a horizontal image moving amount $X_{SFT}$ of the image of an object to be photographed. If the value of the register SBS is equal to or larger than the value of the SBSO (SBS≧SBSO), the flow advances to step C8, and the value of the register SFT is incremented by one.

In step S9, the value of the register SFT is compared with "8". If the value of the register SFT is equal to or smaller than "8" (SFT≦8), the flow returns to step C2, and steps C2 to C9 are repeated. If the value of the register SFT is larger than "8" (SFT>8), the flow advances to step C10.

In step C10, a currently obtained X-direction one-dimensional sum signal in the register XSUM(n) is stored in the register XSUMO(n) for an immediately preceding X-direction one-dimensional sum signal.

The so-called "correlation arithmetic operation" is performed in this manner to obtain the moving amount $X_{SFT}$ in the X-direction of the image of an object to be photographed shown in FIG. 5.

Note that the moving amount $Y_{SFT}$ in the Y-direction of the image of an object to be photographed obtained by the processing YSHIFT in step A13 shown in FIG. 15 can be obtained as in the flow chart shown in FIG. 17 and a detailed description thereof will be omitted.

Figure 18:
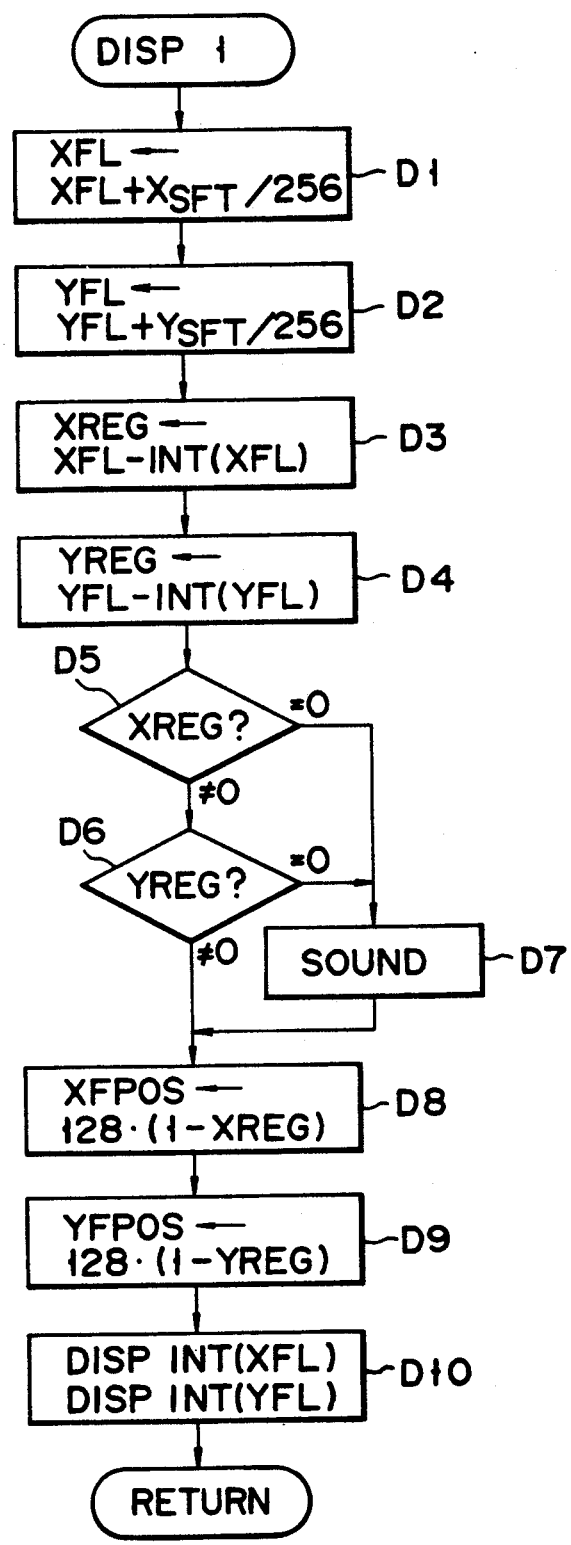
FIG. 18 is a flow chart for explaining processing of DISP1.

FIG. 18 is a flow chart for performing the processing DISP1 in step A15 shown in FIG. 15.

In step D1, the number of pictures by which a framing is moved in the X-direction (a moving amount XFL of a framing in the X-direction) is arithmetically operated in accordance with the X-direction moving amount $X_{SFT}$ of the image of an object to be photographed. In this case, the X-direction moving amount $X_{SFT}$ of the image of an object to be photographed is divided by 256 since the length in the X-direction of one picture is 256 bits in the frame memory 16. In step D2, a moving amount YFL of the framing in the Y direction is arithmetically operated as in step D1. In step D3, a decimal part of the X-direction framing moving amount XFL is calculated and stored in a register XREG. Note that an integral part of this moving amount is a framing No. (XFL) in the X-direction. Similarly, in step D4, a decimal part of the Y-direction framing moving amount YFL is calculated and stored in a register YREG. Note that an integral part of this moving amount is a framing No. (YFL) in the Y-direction.

In step D5, the CPU 10 checks whether the value of the register XREG is "0", i.e., whether the image of an object to be photographed moves in the X-direction by one picture. If the CPU 10 determines that the image moves in the X-direction by one picture (XREG=0), the flow advances to step D7, and a sound ( ) is generated. If the value of the register XREG is not "0" in step D5, the advances to step D6, and the CPU 10 checks as in step D5 whether the value of the register YREG is "0", i.e., whether the image of an object to be photographed moves in the Y-direction by one picture. If the CPU 10 determines in step D6 that the image moves (YREG=0), the flow advances to step D7, and a sound ( ♪ ) is generated.

In step D8, a coordinate (a display position of the horizontal framing No. XFL) for displaying the No. XFL in the X-direction of the framing is obtained. In step D9, a coordinate (a display position of the vertical framing No. YFL) for displaying the No. YFL in the Y-direction of the framing is obtained. In step D10, the framing Nos. XFL and YFL in the X- and Y-directions are displayed at a position designated by the coordinates XFPOS and YFPOS obtained in steps D8 and D9, respectively.

In this manner, the contents of the displayed image on the display unit 22 are controlled. Therefore, as indicated by DISP1 shown in FIG. 13, if the image of an object to be photographed is moved in correspondence with the movement of the camera, the horizontal framing No. displayed below the display picture and the vertical framing No. displayed at the left side of the display picture are moved accordingly.

In steps D5 and D6, a sound is generated when the image of an object to be photographed moves by one picture. However, the sound may be generated only when the initial display picture is restored.

In addition, by changing "256" in step D1 or D2, a basic unit for displaying the framing Nos. XFL and YFL can be changed.

Figure 19:
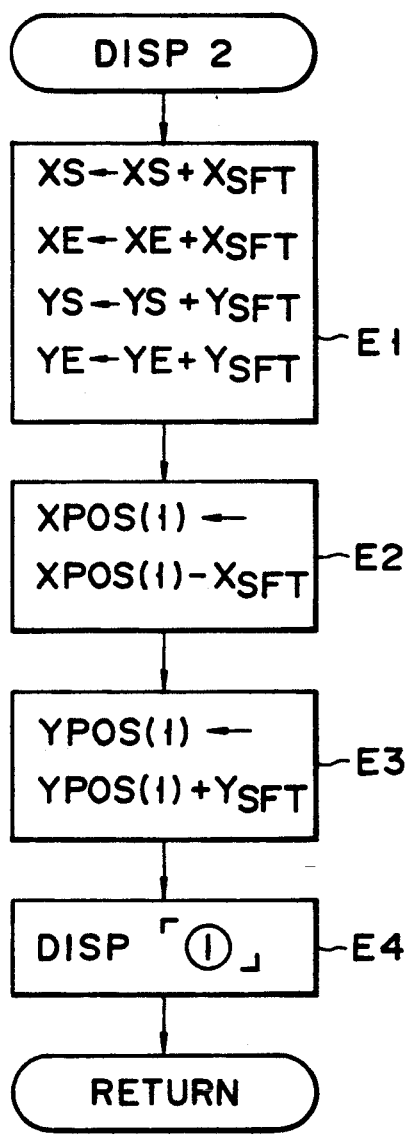
FIG. 19 is a flow chart for explaining processing of DISP2.

FIG. 19 is a flow chart for performing the processing DISP2 in step A16 shown in FIG. 15.

In step E1, an area for fetching new image data corresponding to a moving amount of an image of an object to be photographed is set. That is, the start address XS in the X-direction, the end address XE in the X-direction, the start address YS in the Y-direction, and the end address YE in the Y-direction are reset in accordance with the addresses XS, XE, YS, and YE and the moving amount $X_{SFT}$ in the X-direction and the moving amount $Y_{SFT}$ in the Y-direction.

In step E2, an X coordinate XPOS(1) for displaying a first spot photometry portion is set in accordance with the X-direction moving amount $X_{SFT}$. In step E3, a Y coordinate YPOS(1) for displaying the first spot photometry portion is set in accordance with the Y-direction moving amount $Y_{SFT}$. The flow advances to step E4, and "①" representing the first spot photometric operation is displayed at a position designated by the X and Y coordinates XPOS(1) and YPOS(1) set in steps E2 and E3.

In this manner, the contents of the displayed image on the display unit 22 are controlled. Therefore, as shown in DISP2 in FIG. 13, "①" is overlapped on the image of an object to be photographed and displayed in correspondence with the photometric point, and is moved as the photometric point is moved in accordance with the movement of the image of an object to be photographed.

Figure 20:
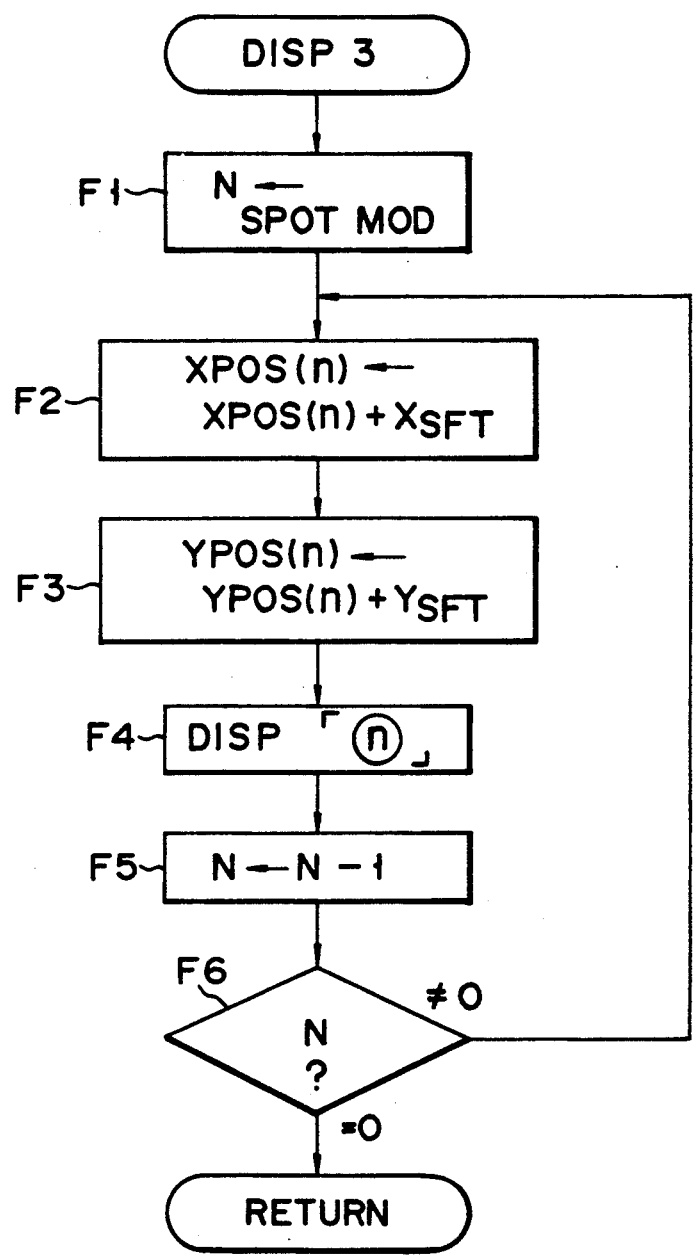
FIG. 20 is a flow chart for explaining processing of DISP3.

FIG. 20 is a flow chart for performing the processing DISP3 in step A17 shown in FIG. 15.

In step F1, the spot photometry number SPOT MOD is set in a register N. In steps F2, F3, and F4, as in steps E2, E3, and E4, coordinates XPOS(n) and YPOS(n) for displaying an n-th photometry portion subjected to multispot photometry are set in accordance with the moving amounts $X_{SFT}$ and $Y_{SFT}$ of the image of an object to be photographed, and "n" corresponding to the value of the register N is displayed at a position designated by the coordinates XPOS(n) and YPOS(n). The flow advances to step F5, and the value of the register N is decremented by one.

In step F6, the value of the register N is compared with "0". If the value of the register N is not "0" (N≠0), the flow returns to step F2, and steps F2 to F6 are repeated. If the value of the register N is "0" (N=0), the processing is ended.

That is, in this processing flow, in order to simplify the processing, the spot photometry number SPOT MOD is set in the register N, and steps F2 to F6 are looped in accordance with the spot photometry number SPOT MOD, i.e., the processing for displaying the photometry number at the photometry point in the multispot photometry is repeated in accordance with the photometry number.

In this manner, the contents of the displayed image on the display unit 22 are controlled. Therefore, as shown in DISP3 in FIG. 13, in correspondence with a plurality of photometry points, "①" representing the first photometric operation to "n" representing the nth photometric operation are overlapped on the image of an object to be photographed and displayed, and are moved when each photometry point is moved in accordance with the movement of the image of an object to be photographed.

In this embodiment, the frame memory 16 is used to temporarily store an analog image signal as digital image data, and the image data is read out in units of pixels. In this case, however, an actual circuit arrangement is enlarged and complicated. Therefore, as a method of eliminating this problem, a method of obtaining a one-dimensional sum signal directly from the imaging device 12 will be described below.

FIG. 21 schematically shows an arrangement of an imaging device generally called a MOS type. In this embodiment, a sum of outputs from photoelectric conversion elements corresponding to photometric regions is used not only as a luminance distribution data for use in tracking but also as data for use in exposure control and in-focus point detection.

Referring to FIG. 21, an XY address imaging device 12 comprises a plurality of two-dimensional array of photoelectric conversion elements 70 for converting light from an object to be photographed into a voltage signal and outputting the signal, a horizontal scanning register (HREG) 72 for designating a photoelectric conversion element from which an output is to be fetched, i.e., for selecting one of a plurality of first photoelectric conversion element arrays 70a, arranged in a first direction, along a second direction perpendicular to the first direction, and a vertical scanning register (VREG) 74 for selecting one of a plurality of second photoelectric conversion element arrays 70b, arranged in the second direction, along the first direction.

FIG. 22 is a block diagram schematically showing an automatic tracking apparatus using the MOS type imaging device. Referring to FIG. 22, the imaging device 12 is constituted by the plurality of photoelectric conversion elements 70, the horizontal scanning register 72, and the vertical scanning register 74, as described above. A photoelectric conversion element 70 from which an output is to be fetched is designated by horizontal scanning lines $H_1$ to $H_3$ of the horizontal scanning register 72 and vertical scanning lines $V_1$ to $V_3$ of the vertical scanning register 74. Referring to FIG. 22, in order to simplify the description, only three photoelectric conversion elements 70 are arranged in each of the horizontal and vertical directions. In this embodiment, however, the number of photoelectric conversion elements 70 is 128 in each of the horizontal and vertical directions.

Reference numeral 76 denotes a luminance signal output for outputting the sum of outputs from photoelectric conversion elements 70 designated by the horizontal and vertical scanning registers 72 and 74. The luminance signal output 76 is output to the CPU 10 via the A/D converter 14 for converting the output into a digital signal. The CPU 10 is connected to the operating member 18, the display unit 22, the exposure control unit 24, and the focusing unit 26 as described above, and is also connected to an external control unit 78 to be controlled by position information of an object to be photographed which is arithmetically operated by using the luminance signal output 76.

Reference numeral 80 denotes position information output for supplying the position information from the CPU 10 to the display unit 22 and the external control unit 78; 82, horizontal scanning signal lines coupled between the CPU 10 and the horizontal scanning register 72 to scan horizontal scanning lines $H_1$ to $H_3$; 84, vertical scanning signal lines connected between the CPU 10 and the vertical scanning register 74 to scan vertical scanning lines $V_1$ to $V_3$. An address designation signal XADR for the horizontal scanning signal lines 82 is supplied to the horizontal scanning register 72 to select an arbitrary horizontal scanning line. An address designation signal YADR for the vertical scanning signal lines 84 is supplied to the vertical scanning register 74 to select an arbitrary vertical scanning line 84.

In this MOS imaging device, therefore, a photoelectric conversion element 70 which is selected by the address designation signal XADR for the horizontal scanning signal line 82 and the address designation signal YADR for the vertical scanning signal line 84 outputs a luminance signal $V_{OUT}$ of a corresponding pixel.

Figure 23:
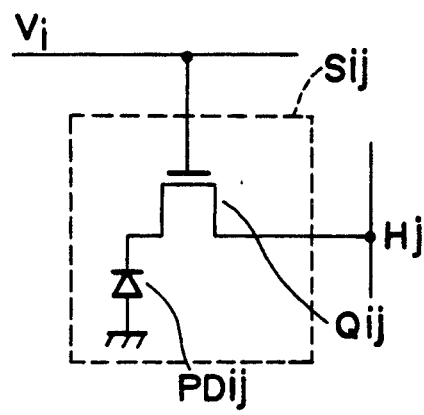
FIG. 23 is a circuit diagram showing an arrangement of a photoelectric conversion element.

FIG. 23 is a circuit diagram showing an arrangement of the photoelectric conversion element 70. Referring to FIG. 23, Hj represents a j-th horizontal scanning line of the horizontal scanning register 72; Vi, an i-th vertical scanning line of the vertical scanning register 74; Qij, a transistor having a gate connected to the vertical scanning line Vi and a drain connected to the horizontal scanning line Hj; and PDij, a photodiode having an anode connected to the source of the transistor Qij and a grounded cathode. With this arrangement, when the vertical scanning register 74 sets the level of the vertical scanning line Vi to "HIGH", the transistor Qij is turned on, and a photocurrent generated by the photodiode PDij is output to the horizontal scanning line Hj. Assume that each of the horizontal and vertical scanning registers 72 and 74 can simultaneously set a plurality of scanning lines in a selected state ("HIGH" state). For example, when the vertical scanning lines $V_1$ and $V_2$ are simultaneously selected and the horizontal scanning line $H_1$ is selected, the luminance signal output 76 has a value of a sum of a photocurrent of $PD_{11}$ and a photocurrent of $PD_{21}$.

Figure 24A:
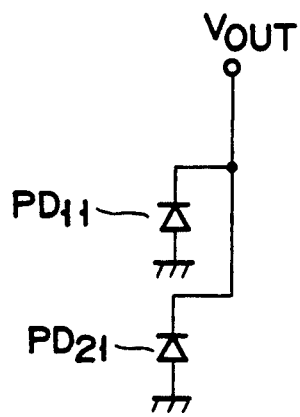
FIGS. 24A and 24B are equivalent circuit diagrams of two photoelectric conversion elements to be driven.
Figure 24B:
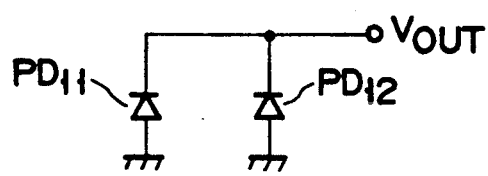

FIG. 24A is an equivalent circuit diagram showing two photoelectric conversion elements 70 to be driven in this case. Referring to FIG. 24A, $V_{OUT}$ denotes an output terminal for outputting the luminance signal output 76. Similarly, when the horizontal scanning lines $H_1$ and $H_2$ are simultaneously selected and the vertical scanning line $V_1$ is selected, the luminance signal output 76 output from the output terminal VOUT has a value of a sum of a photocurrent of $PD_{11}$ and a photocurrent of $PD_{12}$, as shown in an equivalent circuit diagram of FIG. 24B. With this arrangement, the sum of outputs from photoelectric conversion elements 70 corresponding to a photometry region can be obtained for each photoelectric conversion element array in the horizontal or vertical direction to obtain luminance distribution data of an object to be photographed.

As described above, since the MOS imaging device can read out a luminance signal of an arbitrary pixel, a circuit for reading out a luminance signal of each pixel can be realized by a very simple arrangement except when an image signal must be obtained at a high speed for photographing as in a video camera.

If the horizontal scanning lines are sequentially scanned while a plurality of vertical scanning lines are simultaneously scanned, an output (the total value $V_{OUT}$ of photocurrents) which is a sum of a plurality of luminance signals in the vertical direction can be obtained. To the contrary, if the vertical scanning lines are sequentially scanned while a plurality of horizontal lines are simultaneously scanned, an output (the total value $V_{OUT}$ of photocurrents) which is a sum of a plurality of luminance signals in the horizontal direction can be obtained.

Figure 25:
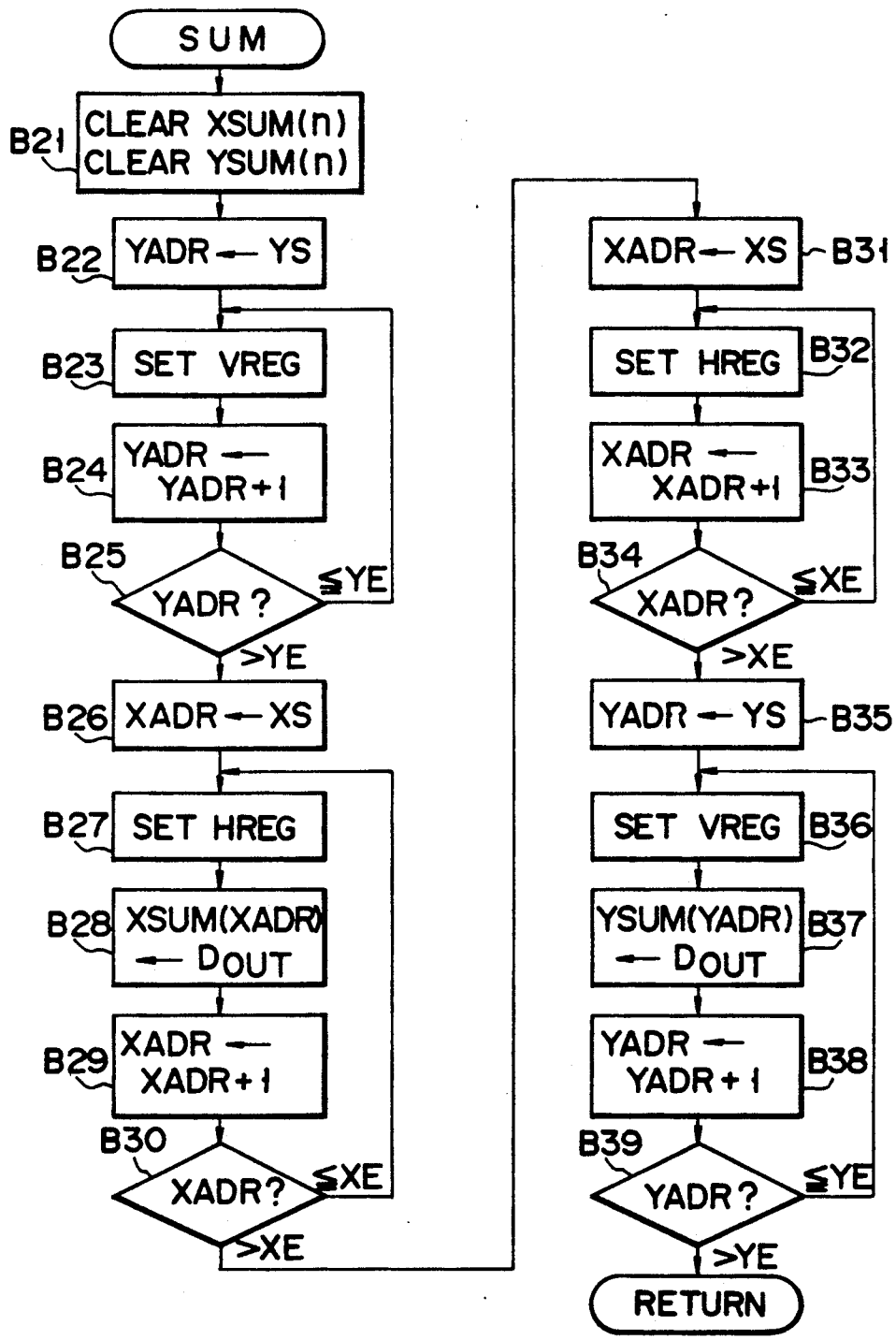
FIG. 25 is a flow chart for explaining detection of a one-dimensional sum signal.

FIG. 25 is a flow chart for obtaining a one-dimensional sum signal in the above arrangement, which is performed in place of the flow chart shown in FIG. 16.

In step B21, the registers XSUM(n) and YSUM(n) each storing a one-dimensional sum value are cleared. Note that n indicates addresses in the X- and Y-directions.

In steps B22, B23, B24, and B25, of the addresses in the vertical scanning register (VREG) 74, addresses from a read start vertical address YS to a read end vertical address YE are selected, and a plurality of vertical scanning lines Vi corresponding to an image data fetching area are simultaneously selected.

In steps B26, B27, B28, B29, and B30, of the addresses in the horizontal scanning register (HREG) 72, addresses from a read start horizontal address XS to a read end horizontal address XE are sequentially selected. In this manner, one-dimensional image data ($D_{OUT}$) which is a sum of luminance signals in the vertical direction is obtained.

In steps B31, B32, B33, and B34, of the addresses in the horizontal scanning register (HREG) 72, addresses from the read start horizontal address XS to the read end horizontal address XE are selected, and a plurality of horizontal scanning lines Hj corresponding to the image data fetching area are simultaneously selected.

In steps B35, B36, B37, B38, and B39, of the addresses in the vertical scanning register (VREG) 74, addresses from the read start vertical address YS to the read end vertical address YE are sequentially selected. In this manner, one-dimensional image data ($D_{OUT}$) which is a sum of luminance signals in the horizontal direction is obtained.

In this manner, since data need only be fetched 64 times in order to obtain a one-dimensional sum signal corresponding to an area having 32 bits in each of the X- and Y-directions while data must be fetched 1,024 times in the processing shown in FIG. 16, an arithmetic operation time can be shortened.

As described above, a moving amount of a camera can be easily determined. Therefore, when a field is narrowed by mounting a telephoto lens, even if the camera is moved from a first target to a second target present outside the picture and then it is returned to the first target, a moving amount required to return the camera to the first target can be easily recognized.

In addition, as in a panorama photograph, when a scene is photographed by several frames while a camera is moved, a moving amount required for the camera can be easily determined.

In the above embodiment, the apparatus is formed integrally with a camera. However, the present invention is not limited to the above embodiment, but the apparatus can be formed independently of a camera.

FIG. 26 is a circuit diagram showing a practical internal arrangement of the vertical scanning register 74. As shown in FIG. 26, the vertical scanning register 74 can be arranged by a synchronous shift register. Referring to FIG. 26, $P_{IV}$, $C_{PV}$, and $C_{LV}$ denote input terminals for receiving pulse signals from the vertical scanning signal lines 84. More specifically, the input terminal $P_{IV}$ receives a scanning signal to be shifted by the synchronous shift register to define the vertical scanning lines $V_1$ to $V_3$, the input terminal $C_{PV}$ receives a shift pulse signal for giving a timing for shifting the scanning signal supplied from the input terminal $P_{IV}$, and the input terminal $C_{LV}$ receives a reset pulse signal for resetting JK flip-flops 86, 88, and 90. With this arrangement, a signal state of "HIGH" or "LOW" supplied from the input terminal $P_{IV}$ can be sequentially shifted from the JK flip-flop 86 at the left side to the JK flip-flops 88 and 90 at the right side in accordance with the shift pulse signal supplied from the input terminal $C_{PV}$.

FIG. 27 is a timing chart for explaining an operation of the vertical scanning register 74. As shown in FIG. 26, when the reset pulse signal is supplied to the input terminal $C_{LV}$ to reset the JK flip-flops 86, 88, and 90 and the shift pulse signal is supplied to the input terminal $C_{PV}$ after the signal supplied from the input terminal $P_{IV}$ is set to be "HIGH", the Q output from the first JK flip-flop 86, i.e., the vertical scanning line $V_1$ goes "HIGH" (selected state). Subsequently, when the shift pulse signal is supplied to the input terminal $C_{PV}$ while the signal supplied from the input terminal $P_{IV}$ is kept "HIGH", the Q outputs from the first and second JK flip-flops 86 and 88 go "HIGH". Subsequently, when the signal supplied from the input terminal $P_{IV}$ is set to be "LOW" and then the shift pulse signal is supplied to the input terminal $C_{PV}$, the Q output from the first JK flip-flop 86 goes "HIGH", and the Q outputs from the second and third JK flip-flops 88 and 90 go "HIGH".

In this manner, by controlling the vertical scanning pulses to be supplied from the CPU 10 to the input terminals $P_{IV}$, $C_{PV}$, and $C_{LV}$, arbitrary vertical scanning lines can be simultaneously selected. In addition, by using the same arrangement as that of the vertical scanning register 74 in the horizontal scanning register 72, arbitrary horizontal scanning lines can be simultaneously selected.

Figure 28:
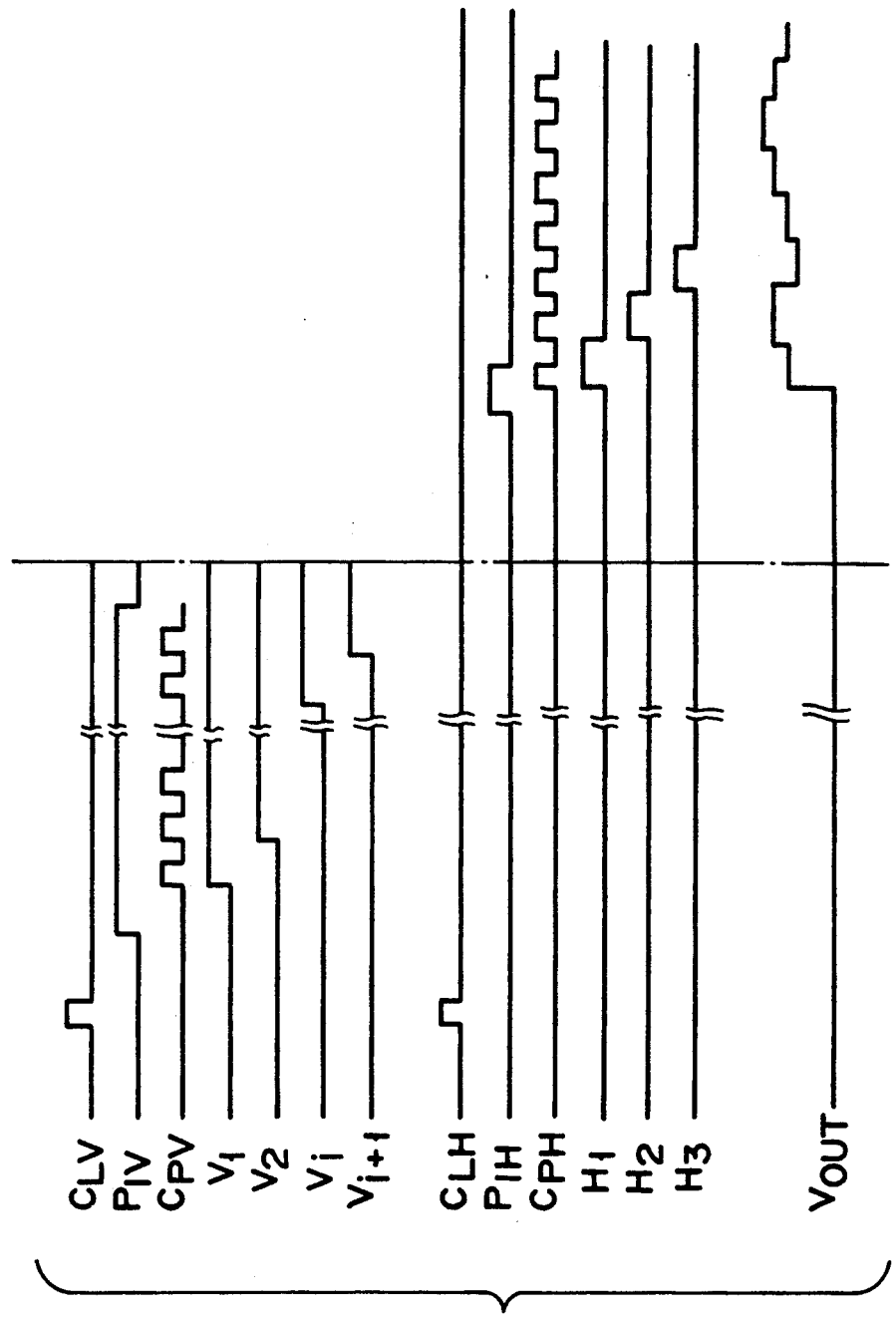
FIG. 28 is a timing chart for explaining operations of the vertical scanning resister and a horizontal scanning register performed when a plurality of vertical scanning lines are simultaneously selected and horizontal scanning lines are sequentially scanned one after another.

FIG. 28 is a timing chart for explaining operations of the horizontal and vertical scanning registers 72 and 74 performed when the horizontal scanning lines are to be sequentially scanned one after another while a plurality of vertical scanning lines are simultaneously selected. Referring to FIG. 28, $P_{IH}$, $C_{PH}$, and $C_{LH}$ represent input terminals for receiving pulse signals constituting the horizontal scanning signal lines 82. More specifically, the input terminal $P_{IH}$ receives a scanning signal to be shifted by the synchronous shift register to define the horizontal scanning lines $H_1$ to $H_3$, the input terminal $C_{PH}$ receives a shift pulse signal for giving a timing for shifting the scanning signal supplied from the input terminal $P_{IH}$, and the input terminal $C_{LH}$ receives a reset pulse signal for resetting the JK flip-flops 86, 88, and 90. In FIG. 28, a portion at the left of wave lines indicates a timing of each signal used to simultaneously select a plurality of vertical scanning lines as in FIG. 27. A portion at the right of the wave lines indicates a timing used when a signal supplied from the input terminal $P_{IH}$ is set to "HIGH" to apply one shift pulse signal to the input terminal $C_{PH}$, and a signal supplied from the input terminal $P_{IH}$ is set to "LOW" to sequentially apply shift pulses to the input terminal $C_{PH}$, thereby selecting the horizontal scanning lines one after another.

By allowing the horizontal and vertical scanning registers 72 and 74 to operate as described above, the output sums from the photoelectric conversion element arrays in the vertical direction can be sequentially output in units of arrays from the output terminal $V_{OUT}$ for the luminance signal output 76. In addition, by inverting the scanning relationship between the vertical scanning lines $V_1$ to $V_3$ and the horizontal scanning lines $H_1$ to $H_3$ (i.e., by inverting the relationships between $P_{IV}$ and $P_{IH}$, $C_{PV}$ and $C_{PH}$, and $C_{LV}$ and $C_{LH}$), the vertical scanning lines can be sequentially scanned one after another while a plurality of horizontal scanning lines are simultaneously selected. Therefore, the output sums from the photoelectric conversion element arrays in the horizontal direction can be sequentially output in units of arrays from the output terminal $V_{OUT}$ for the luminance signal output 76.

In FIGS. 27 and 28, a pulse is applied to the input terminal $P_{IV}$ so that adjacent scanning lines are simultaneously selected. As shown in FIG. 29, however, by intermittently supplying a "HIGH" signal to the input terminal $P_{IV}$, scanning lines can be selected at arbitrary pitches.

The automatic tracking apparatus shown in FIG. 22 is arranged to automatically select two types of photometry regions in accordance with the magnitude of contrast of an object to be photographed. FIG. 30 is a view for explaining a first photometry region of the two types of regions. When the first photometry region is selected, all of 128×128 pixels are set as a photometry region, and every fourth pixels are selected in each of the horizontal and vertical directions as shown in FIG. 30. In this case, the number of pixels is 32×32.

FIG. 31A shows a photometry region of an image of an object to be photographed obtained when the first photometry region is selected, in which a portion in a frame indicated by a dotted line represents the photometry region. FIG. 31B is a graph showing a projection waveform in the vertical direction. That is, as described above, the projection waveform shown in FIG. 31B is obtained by sequentially calculating output sums XSUM for the every fourth selected pixels in the X-direction. This first selection method will be called a $W_{SEL}$ mode hereinafter.

FIG. 32 is a view for explaining a second photometry region. When the second photometry region is selected, 32×32 pixels in a central portion of the picture are set as a photometry region as shown in FIG. 32, and all the pixels in this photometry region are selected. FIG. 33A shows an image of an object to be photographed and a photometry region obtained when the second photometry region is selected, in which a portion in a frame indicated by a dotted line represents the photometry region. FIG. 33B is a graph showing a projection waveform in the vertical direction. That is, as described above, the projection waveform shown in FIG. 33B is obtained by sequentially calculating output sums XSUM of all the pixels in the photometry region in the X-direction. This selection method will be called an $N_{SEL}$ mode hereinafter. In this $N_{SEL}$ mode, since the photometry region moves in accordance with the movement of an object to be photographed, this photometry region is called a "tracking field".

In this embodiment, since the total number of pixels selected in the $W_{SEL}$ mode is equal to that of pixels selected in the $N_{SEL}$ mode, common processing can be performed by the CPU 10 after a projection waveform is obtained in either selection mode. Therefore, the control can be simplified, and an electric circuit can be made compact.

FIG. 34A is a schematic perspective view showing an arrangement of the display unit 22, in which light-emitting members 92 such as LEDs are arranged on a flat plate to illuminate the position of an object to be photographed. FIG. 34B is a schematic view showing a finder field in the arrangement shown in FIG. 34A. In FIG. 34B, a portion indicated by a black dot corresponds to a light-emitting member 92 emitting light.

FIG. 35A is a schematic perspective view showing another arrangement of the display unit 22, in which light-emitting members 92 such as LEDs are arranged in a line in each of the horizontal and vertical directions, and the light-emitting members 92 emit light to indicate the coordinates of the position of an object to be photographed. FIG. 35B is a schematic view showing a finder field in the arrangement shown in FIG. 35A. In FIG. 35B, as in FIG. 34A, portions indicated by black dots correspond to light-emitting members 92 emitting light.

FIG. 36A is a schematic perspective view showing a third arrangement of the display unit 22, in which a light-emitting member 96 radiates light from behind a liquid crystal display device 94 to display a frame-like tracking field. FIG. 36B is a schematic view showing a finder field in the arrangement shown in FIG. 36A. In FIG. 36B, a portion indicated by a dotted line is the frame indicated by the liquid crystal display device 94.

Figure 37:
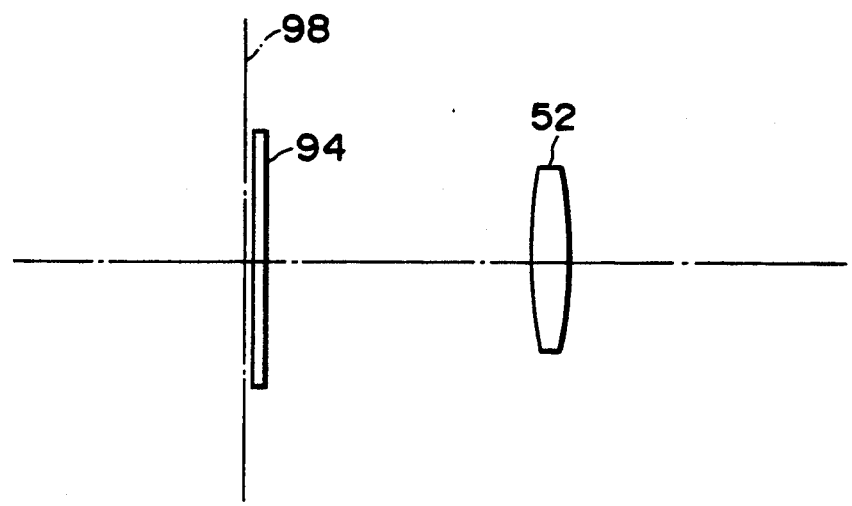
FIG. 37 is a view showing an arrangement for overlapping and displaying an object to be photographed and a tracking field without using a half mirror, in which a liquid crystal display device is formed in contact with a finder imaging plane.
Figure 38:
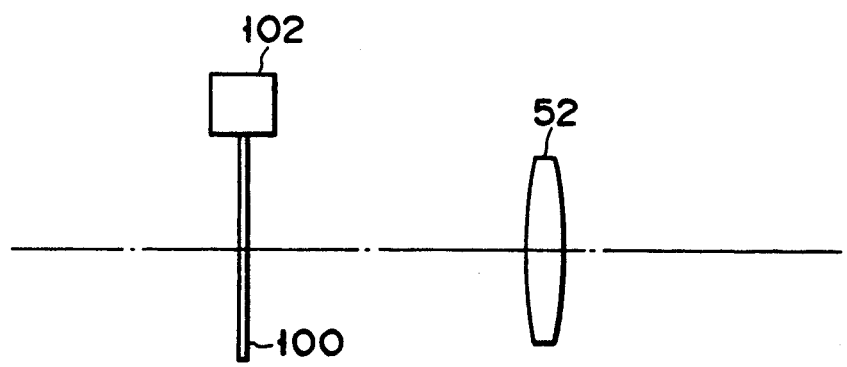
FIG. 38 is a view showing another arrangement for overlapping and displaying an object to be photographed and a tracking field, in which a mechanical display device is formed on a finder imaging plane.

FIGS. 37 and 38 are views each showing an arrangement in which an image of an object to be photographed and a tracking field is overlapped and displayed without using the display unit 22. Referring to FIG. 37, the liquid crystal display device 94 is provided in contact with a finder imaging plane 98 to display a frame-like tracking field. Referring to FIG. 38, a mechanical display unit such as a meter is arranged on the finder imaging plane 98 to display a cross pattern. In FIG. 38, reference numeral 100 denotes an indicator of the mechanical display unit; and 102, a controller for controlling the position of the indicator 100 of the mechanical display unit.

In an embodiment to be described below, an arrangement as shown in FIGS. 36A and 36B in which a frame is displayed by the liquid crystal display device 94 is adopted as the display unit 22. Note that an automatic tracking apparatus of this embodiment is arranged to move its tracking field in accordance with the movement of an object to be photographed as described above.

FIGS. 39A and 39B are schematic views showing a state in which a tracking field moves in accordance with the movement of an object to be photographed. FIG. 39A shows a finder field in an initial state, in which a portion in a frame indicated by a dotted line is a photometry region (i.e., a tracking field). When a person as an object to be photographed moves from the center of a picture to the left, the photometry region moves as described above, and the frame-like tracking field displayed by the display unit 22 moves accordingly, thereby obtaining a finder field as shown in FIG. 39B. When the $W_{SEL}$ mode is selected as a mode for measuring the luminance of an object to be photographed, the entire finder field is set as a photometry region. Therefore, the display unit 22 does not display the tracking field.

An operation sequence of the automatic tracking apparatus according to this embodiment will be described below.

FIG. 40 shows a relationship between an arrangement of pixels (photoelectric conversion elements 70) of an XY address imaging device 12. As described above, pixels of the XY address imaging device 12 are arranged in a 128 (horizontal)×128 (vertical) matrix manner. In the following description of this embodiment, the center of this matrix is determined as a reference position, and the position of an object to be photographed in the horizontal direction (X-direction) is represented with a positive sign (+) at the right of the center and represented with a negative sign (−) at the left of the center. Similarly, the position of an object to be photographed in the vertical direction (Y-direction) is represented with a positive sign (+) below the center and represented with a negative sign (−) above the center. In addition, the number of pixels to be selected to obtain the output sums XSUM and YSUM is 32 in each of the X- and Y-directions.

FIG. 41 shows the contents of a RAM (random access memory) for storing data provided in a CPU 10 for controlling an operation of the automatic tracking apparatus according to this embodiment.

Figure 42:
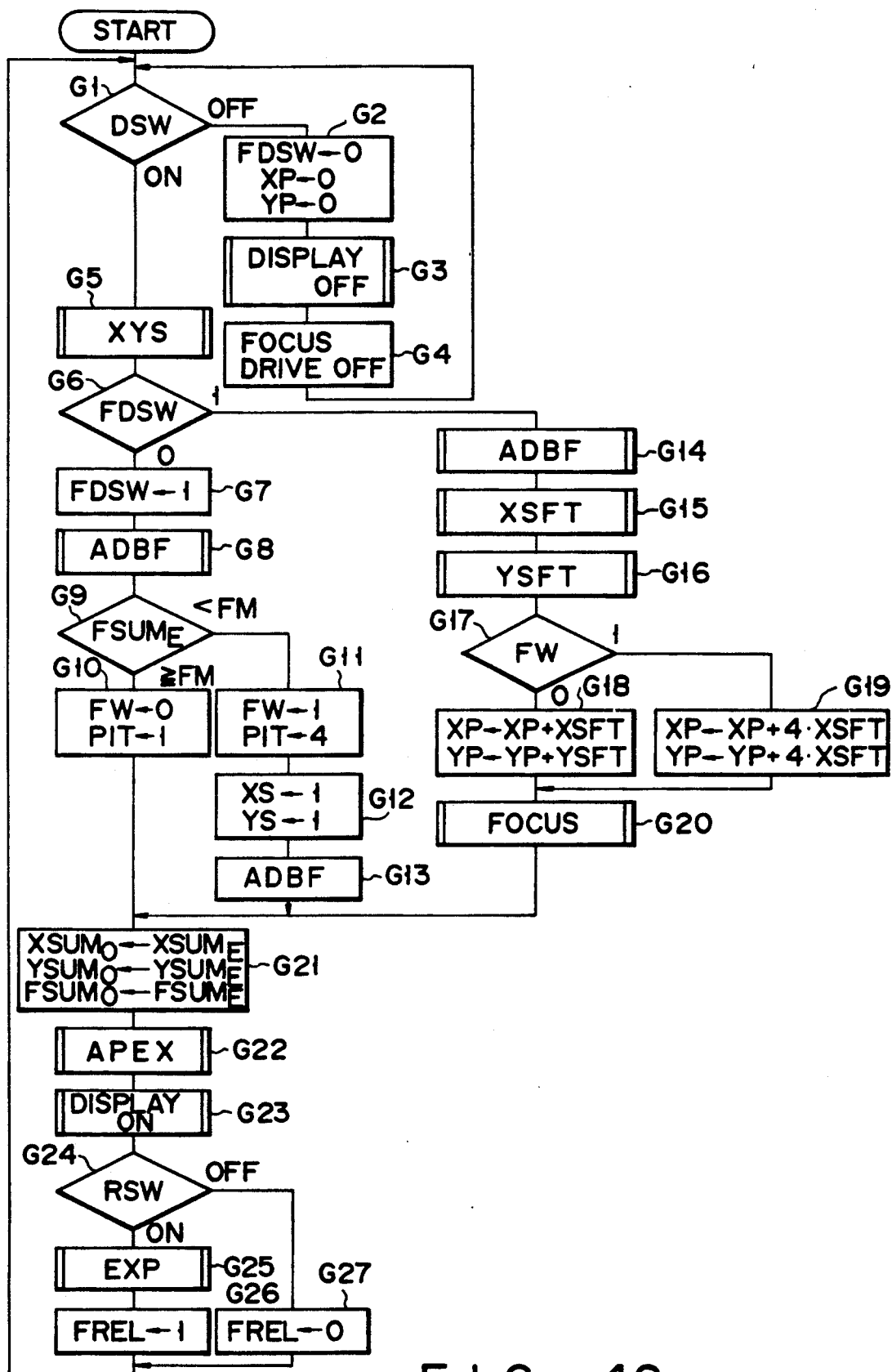
FIG. 42 is a flow chart showing processing operations of the CPU shown in FIG. 22.

FIG. 42 is a flow chart schematically showing a processing operation of the CPU 10. An operation of the CPU 10 will be described below with reference to this flow chart.

In step G1, the CPU 10 checks whether a DSW 66 as a first-stroke switch of an operating member 18 is turned on. If the DSW 66 is not turned on, the flow advances to step G2, a flag FDSW indicating ON/OFF of the DSW 66 and RAM areas XP and YP for storing the position of a pixel by its coordinates are cleared. The CPU 10 executes a DISPLAY OFF subroutine for interrupting the operation of a display unit 22 in step G3 and inhibits focus adjustment control in step G4. When processing operations in steps G2 to G4 are completed, the flow returns to step G1. Therefore, if the DSW 66 is not operated, the CPU 10 repeatedly executes steps G1 to G4. Therefore, since no superimpose (tracking field) display is provided by the display unit 22 when a photographer just holds a camera, he or she is not bothered.

If the DSW 66 is turned on in step G1, the flow advances to step G5, and the CPU 10 executes an XYS subroutine for determining a pixel to be selected upon measurement of the luminance of an object to be photographed. Subsequently, the CPU 10 checks in step G6 whether the DSW is initially turned on or is kept ON by reading out the value of the flag FSDW. If the CPU 10 determines in step G6 that the DSW 66 is initially turned on, "1" is set in the flag FDSW in step G7. The CPU 10 executes an ADBF subroutine in step G8, i.e., outputs a signal from horizontal and vertical scanning signal lines 82 and 84 to horizontal and vertical scanning registers 72 and 74 of the XY address imaging device 12 on the basis of the arithmetic operation result obtained in step G5, and sequentially reads out output sums XSUM and YSUM and stores them in the RAM shown in FIG. 41. In the ADBF subroutine, the luminance and the focusing state of an object to be photographed are arithmetically operated from the waveform of the XSUM and are stored in areas BSUM and $FSUM_E$ in the RAM as will be described below. Note the the mode selected in step G8 is the $N_{SEL}$ mode described above with reference to FIG. 32.

In step G9, the CPU 10 checks whether the arithmetic operation result of the focusing state stored in the $FSUM_E$ is larger or smaller than a predetermined value FM. If the focusing state arithmetic operation result is larger than the predetermined value FM in step G9, the flow advances to step G10. In step G10, the FW flag indicating that the $W_{SEL}$ mode is selected is set to be "0" (i.e., the $N_{SEL}$ mode is selected), and a PIT which is a RAM area for storing a pixel pitch of a pixel selected at this time is set to be "1" (minimum value). If the focusing state arithmetic operation result is smaller than the predetermined value FM in step G9, the flow advances to step G11. In step G11, the FW flag is set to be "1" to set the $W_{SEL}$ mode, and the PIT is set to be "4". In step G12, XS and YS as RAM areas for storing coordinate data representing the photometry region (tracking field) are set to be "1". In step G13, the ADBF subroutine is executed to read in the output sums XSUM and YSUM in the $W_{SEL}$ mode and to store the data in the RAM.

As described above, the CPU 10 checks in step G9 whether an object to be photographed having a high contrast is present in a central portion Of the picture when the DSW 66 is turned on. If an object to be photographed having a high contrast is present, the CPU 10 selects the $N_{SEL}$ mode in step G10. If no object to be photographed having a high contrast is present, the CPU 10 selects the $W_{SEL}$ mode in steps G11 to G13. Therefore, an optimum mode can be automatically set in accordance with an object to be photographed.

If the CPU 10 determines in step G6 that the DSW 66 is continuously turned on, the flow advances to step G14 to execute the ADBF subroutine as described above, thereby storing the output sums XSUM and YSUM in the areas $XSUM_E$ and $YSUM_E$ of the RAM. In step G15, the CPU 10 performs a correlation arithmetic operation by using this XSUM and the previously read-in XSUM, thereby executing an XSFT subroutine for calculating a moving amount of an object to be photographed in the X-direction (horizontal direction). In step G16, as in step G15, the CPU 10 performs a correlation arithmetic operation by using the YSUM and the previously read-in YSUM, thereby executing a YSFT subroutine for calculating a moving amount of an object to be photographed in the Y-direction (vertical direction).

In step G17, the CPU 10 checks whether the selected mode is the $W_{SEL}$ mode or the $N_{SEL}$ mode. If the $N_{SEL}$ mode is selected, the flow advances to step G18. In step G18, the values stored in the RAM areas XSFT and YSFT for storing a moving amount of an object to be photographed are added to the values stored in the RAM areas XP and YP for storing the position of a pixel by coordinates, and the addition results are stored in the areas XP and YP, respectively. If the $W_{SEL}$ mode is selected in step G17, the flow advances to step G19. In this case, since the moving amount calculated in step G15 or G16 is ¼ a real moving amount, values obtained by multiplying the values stored in the areas XFST and YSFT by four are added to the moving amount, and the addition results are stored in the areas XP and YP, respectively. Thereafter, the flow advances to step G20, and focus adjustment control is performed by a known method by using the focusing state value $FSUM_E$ obtained in step G14 and the immediately preceding focusing state value $FSUM_O$.

In the embodiment, since the number of pixels to be selected is the same (i.e., XSUM=32 and YSUM=32) regardless of the $W_{SEL}$ mode or the $N_{SEL}$ mode, a program for executing a correlation arithmetic operation can be commonly used. Therefore, a program capacity of the CPU 10 can be reduced.

In order to read in the next data, in step G21, the CPU 10 transfers the output sum XSUM stored in the area $XSUM_E$, the output sum YSUM stored in the area $YSUM_E$, and the focusing state value stored in the area $FSUM_E$ to the RAM areas $XSUM_O$, $YSUM_O$, and $FSUM_O$ as RAM areas for storing the immediately preceding output sums XSUM, YSUM, and focusing state value. Alternatively, the processing can be performed without executing step G21 such that the areas $XSUM_E$ and $XSUM_O$, the areas $YSUM_E$ and $YSUM_O$, and the areas $FSUM_E$ and $FSUM_O$ are alternately used as data storage areas and the sign of a moving amount is inverted each time data is read in.

Subsequently, in step G22, the CPU 10 executes an APEX subroutine for performing an exposure arithmetic operation on the basis of the output sum XSUM obtained in any of steps G8, G13, and G14. In step G23, the CPU 10 causes the display unit 22 to display the position of an object to be photographed in the finder on the basis of the output sums XSUM and YSUM. In step G24, the CPU 10 checks whether an RSW 68 as a second-stroke switch of the operating member 18 is turned on. If the RSW 68 is ON in step G24, the flow advances to step G25 to execute an EXP subroutine for performing exposure control in accordance with the exposure amount obtained in step G22. In addition, the flow advances to step G26 to set "1" in an FREL flag indicating completion of exposure. If the RSW 68 is OFF in step G24, the flow advances to step G27 to set "0" in the FREL flag.

When the processing operations up to step G26 or G27 are finished, the flow returns to step G1 to repeat the above operations.

Figure 43:
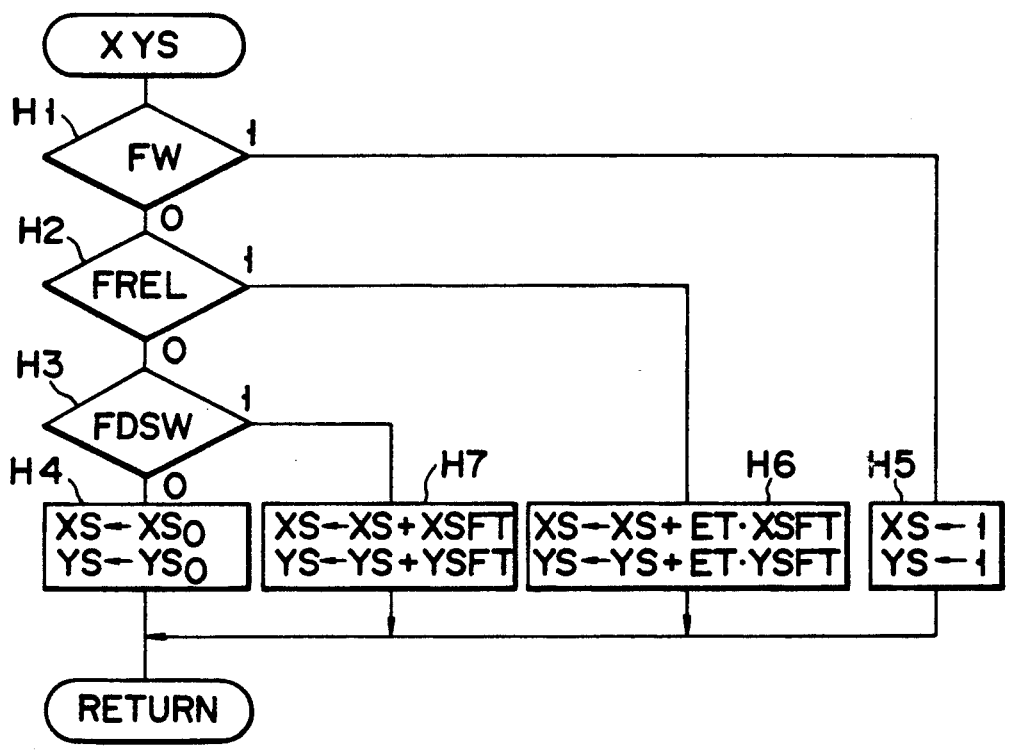
FIG. 43 is a flow chart showing an algorithm of an XYS subroutine.
Figure 44:
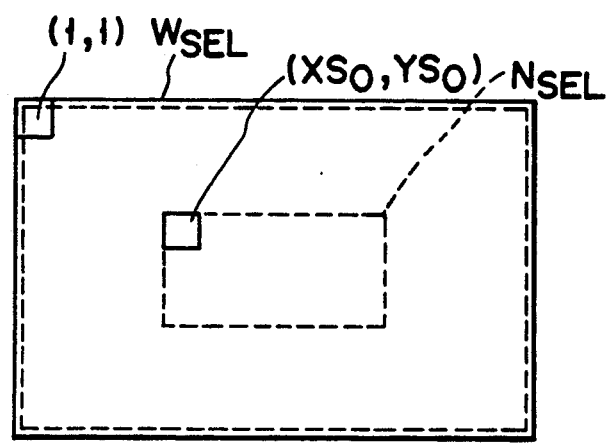
FIGS. 44 and 45 are views for explaining the XYS subroutine shown in FIG. 43.

FIG. 43 is a flow chart showing an algorithm of the XYS subroutine shown in FIG. 42. In this subroutine XYS, a selection pixel for reading out the output sum XSUM from the XY address imaging device 12 is determined. XS and YS indicate a RAM area for storing coordinate values representing a photometry region and are constantly located at the upper left position on the picture in the $W_{SEL}$ mode. As shown in FIG. 44, in the $N_{SEL}$ mode, although an initial position is indicated by predetermined values $XS_O$ and $YS_O$, it changes in accordance with the movement of an object to be photographed, and the tracking field tracks the object to be photographed accordingly.

Referring to FIG. 43, the CPU 10 checks in step H1 whether the flag FW is "0" or "1". If the flag FW is "0" in step H1, the flow advances to step H2. If the flag FW is "1", the flow advances to step H5. Processing in step H5 is to be performed in the $W_{SEL}$ mode (i.e., when the flag FW is "1"). In this case, "1"s are stored in XS and YS, respectively.

If the flag FW is "0", the CPU 10 checks in step H2 whether the flag FREL is "0" or "1". If the flag FREL is "0", the flow advances to step H3, and the CPU 10 checks whether the flag FDSW is "0" or "1". If the flag FREL is "1" in step H2, the flow advances to step H6 to perform processing to be performed immediately after exposure is finished in the $N_{SEL}$ mode (i.e., when the flag FW is "0" and the flag FREL is "1"). In this case, assuming that the moving directions of an object to be photographed are the same before and after exposure, values obtained by multiplying the moving amount immediately before exposure by an exposure time ET is added to the values stored in XS and YS, thereby setting a reading position upon exposure.

If the CPU 10 determines in step H3 that the flag FDSW is "0", the flow advances to step H4 to perform processing to be performed when the $N_{SEL}$ mode is set and the DSW 66 is initially turned on (i.e., when the flags FW, FREL, and FDSW are "0"s). In this case, $XS_O$ and $YS_O$ are stored in XS and YS. If the CPU 10 determines in step H3 that the flag FDSW is "1", the flow advances to step H7 to perform processing to be performed when the $N_{SEL}$ mode is set and the DSW 66 is continuously turned on (i.e., when the flags FW and FREL are "0"s and the flag FDSW is "1"). In this case, the values stored in XSFT and YSFT as RAM areas for storing the moving amount of an object to be photographed are added to the values stored in XS and YS.

Figure 45:
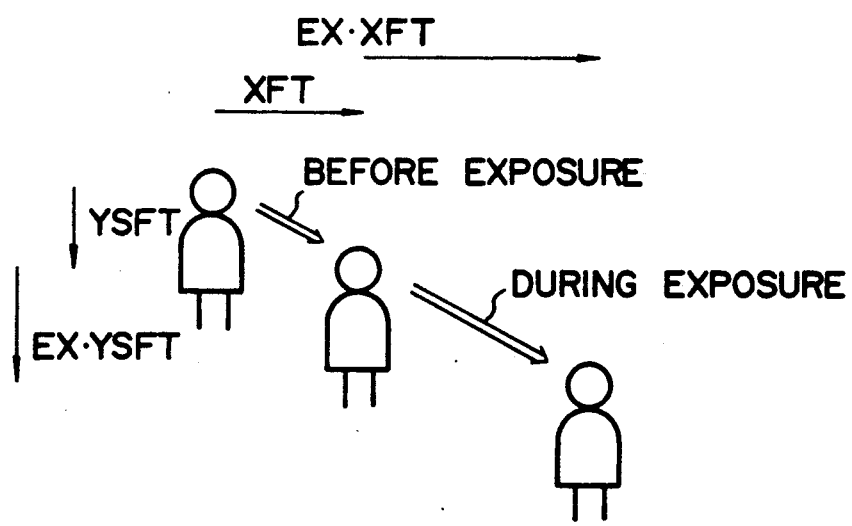

FIG. 45 shows a relationship between the position and moving amount of an object to be photographed before and after exposure. When an image of an object to be photographed is to be imaged in a finder as in a single-lens reflex camera, the object to be photographed may move while an optical path to the finder is closed during exposure. However, by using the above method of calculating the position of an object to be photographed after exposure, the tracking field can be prevented from losing the object to be photographed.

Figure 46:
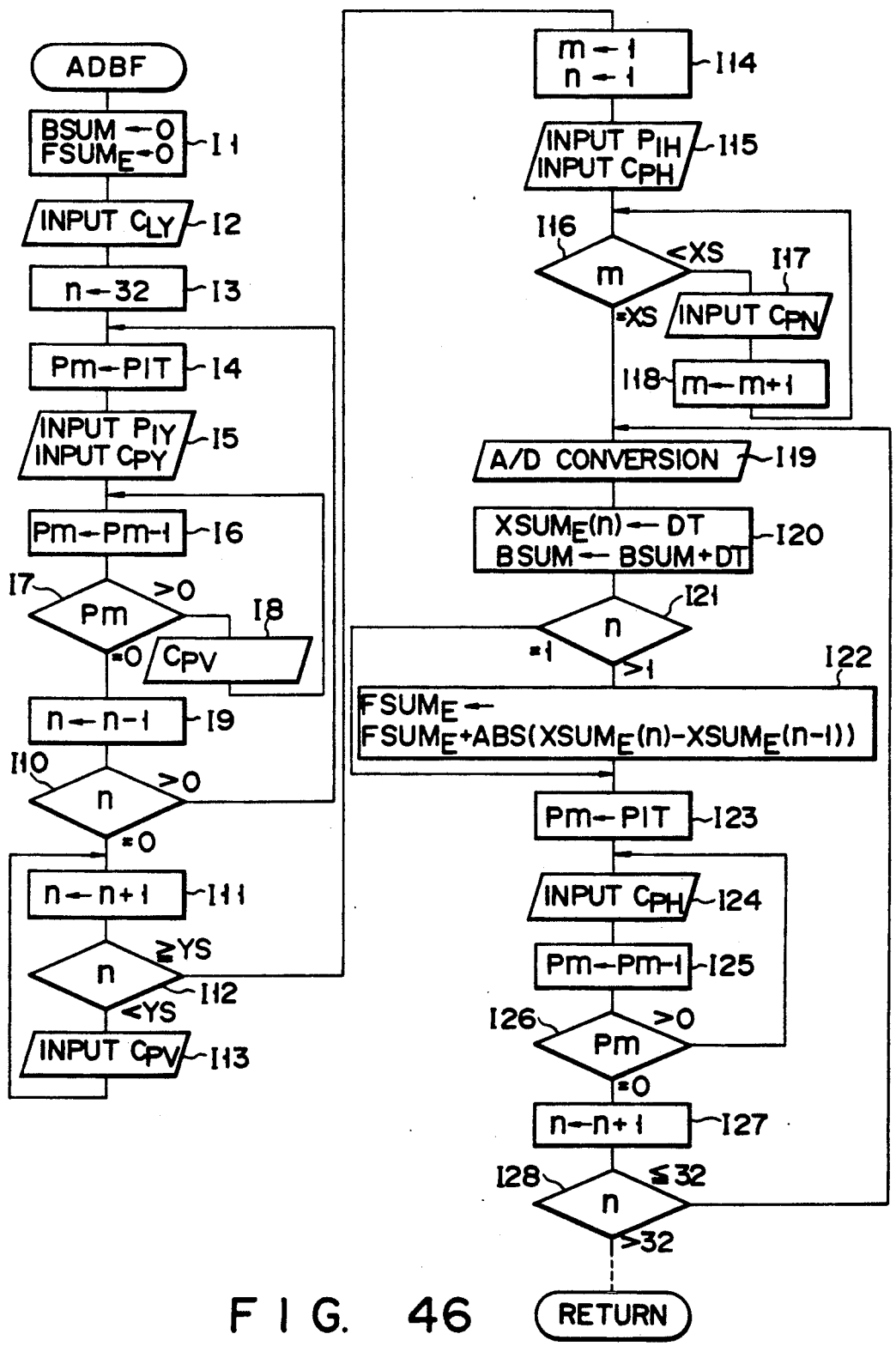
FIG. 46 is a flow chart showing an algorithm of an ADBF subroutine shown in FIG. 42.

FIG. 46 is a flow chart showing an algorithm of the ADBF subroutine shown in FIG. 42. This ADBF subroutine is a flow chart for reading in an output sum XSUM in the X-direction and an output sum YSUM in the Y-direction from the photoelectric conversion element 70. In order to simplify the description, FIG. 46 shows only processing for sequentially scanning and adding horizontal scanning lines in the X-direction while a plurality of vertical scanning lines are simultaneously selected, thereby reading in an output sum XSUM in the X-direction, but processing for reading in an output sum YSUM in the Y-direction is omitted therefrom. Note that the processing for reading in the output sum YSUM in the horizontal direction is substantially the same as the processing for reading in the output sum XSUM in the vertical direction.

In FIG. 46, steps I1 to I13 indicate processing for simultaneously selecting a plurality of vertical lines by using the method described with reference to FIGS. 27 to 29. After a luminance value and a focusing state value are cleared to be "0" in step I1, a reset pulse signal is supplied to the input terminal $C_{LV}$ of the vertical scanning register 74 in step I2, thereby resetting the vertical scanning register 74.

Steps I3 to I10 indicate processing for causing the vertical scanning register 74 to select a plurality of vertical scanning lines. That is, a pulse is supplied to the input terminal $P_{IV}$ and at the same time 32 shift pulse signals are input from the input terminal $C_{PV}$ to select 32 vertical scanning lines. That is, 32 is input in a counter n in step I3, and the value of the PIT as a RAM area for storing a pixel pitch is input in a counter Pm in step I4. In step I5, a signal value to be supplied to the input terminal $P_{IV}$ of the vertical scanning register 74 is set to be "HIGH", and a shift pulse is input from the input terminal $C_{PV}$ to set the signal value to be supplied to the input terminal $P_{IV}$ to be "LOW". The value of the counter Pm is decremented by "1" in step I6, and the CPU 10 checks in step I7 whether the value of the counter Pm is "0".

If the value of the counter Pm is not "0" in step I7, the flow advances to step I8 to input one more shift pulse signal from the input terminal $C_{PV}$ and then returns to step I6. This processing is repeated until the value of the counter Pm becomes "0" in step I7. If the value of the counter Pm is "0" in step I7, the flow advances to step I9 to decrement the value of the counter n by "1". In step I10, the CPU 10 checks whether the value of the counter n is "0". If the value of the counter n is not "0" in step I10, the processing from steps I4 to I10 is repeated until the value of n becomes "0".

Since only a shift pulse signal is applied in accordance with the value of the PIT in steps I6, I7, and I8, the pitch of selected vertical scanning lines becomes the same value as the PIT. That is, every fourth vertical scanning lines are selected in the $W_{SEL}$ mode, and adjacent vertical scanning lines are selected in the $N_{SEL}$ mode.

Processing in steps I11 to I13 is for controlling vertical scanning lines to be selected and is performed in the $N_{SEL}$ mode. That is, the Y coordinate value of the first scanning line of ON vertical scanning lines is caused to coincide with the Y coordinate value (a value stored in the YS) of the photometry region obtained in the XYS subroutine. The value of the counter n is incremented by "1" in step I11 and compared with the value stored in the YS in step I12. If the value of the counter n is smaller than the value stored in the YS in step I12, the flow advances to step I13, and a shift pulse signal is applied to the input terminal $C_{PV}$ of the vertical scanning register 74. This processing is repeated until the value of the counter n coincides with the value stored in the YS, thereby causing the Y coordinate value of the photometry region to coincide with the value stored in the flag YS.

In this embodiment, the number of vertical scanning lines to be simultaneously selected remains the same (32) regardless of the $N_{SEL}$ or the $W_{SEL}$ mode. Therefore, a range need not be changed in accordance with the type of mode, and the A/D converter 14 can be commonly used in the two modes. In addition, an arithmetic operation of the luminance of an object to be photographed is performed on the basis of the output sum XSUM in the vertical scanning line direction as will be described later, and this arithmetic operation program can also be commonly used. In this embodiment, the pitch of vertical scanning lines to be selected is four and the total number of selected lines is 32 in the $W_{SEL}$ mode. However, the pitch may be eight and the total number may be 16, i.e., different values can be arbitrarily set. Alternatively, the pitch may be changed in accordance with the arithmetic operation result of the luminance of an object to be photographed. In this case, overflow can be prevented when the luminance of an object to be photographed is high.

Steps I14 to I27 indicate a processing operation for selecting horizontal scanning lines one after another to sequentially read in the output sum XSUM.

In step I14, "1"s are set in the counters m and n. Subsequently, in step I15, a signal value to be supplied to the input terminal $P_{IH}$ of the horizontal scanning register 72 is set to be "HIGH", and a signal value to be supplied to the input terminal $P_{IH}$ to be "LOW" after a shift pulse signal is input from the input terminal $C_{PH}$. In order to read in the first output sum XSUM, shift pulse signals are applied to the input terminal $C_{PH}$ until the value stored in the counter m coincides with the X coordinate value (value stored in the XS) of the photometry region obtained in XYS subroutine described above in steps I16 to I18. That is, in step I16, the value of the counter m is compared with the X coordinate value (value stored in the XS) obtained in the XYS subroutine described above. If the value of the counter m is smaller than the value stored in the XS in step I16, the flow advances to step I17 to apply a shift pulse signal to the input terminal $C_{PH}$, and the value of the counter m is incremented by "1" in step I18. This processing is repeated until the value of the counter m coincides with the value stored in the XS.

If the value of the counter m is larger than the value stored in the XS in step I16, the flow advances to step I19, and the A/D converter 14 converts the output sum XSUM into a digital value. In step I20, the digital output sum DT is stored in the $XSUM_E(n)$, and the value stored in a luminance value BSUM is added to the sum DT. In this case, the luminance value BSUM is a RAM area for integrating the output sums XSUM obtained by sequentially scanning the horizontal scanning lines and for finally storing the total sum of outputs from 32×32 pixels. Therefore, the value of the BSUM represents a luminance value of the entire picture in the $W_{SEL}$ mode and represents that of a predetermined region in the picture in the $N_{SEL}$ mode.

In step I21, the CPU 10 checks whether the value of the counter n is larger than "1". If the value of the counter n is larger than "1" (i.e., when the loop constituted by steps I19 to I28 is performed for the first time), the flow advances to step I22, and the absolute value of the difference between a currently read-in output sum XSUM$_E$(n) and an immediately preceding read-in output sum XSUM$_E$(n−1) is added to the focusing state value FSUM$_E$. This FSUM$_E$ takes a large value as a contrast value is increased as will be described later. Therefore, the state of the contrast of an object to be photographed can be determined by the value of FSUM$_E$. Note that if the value of the counter n is "1", the processing in step I22 is not performed but processing of step I23 and subsequent steps is executed.

FIGS. 47A through 47D are views for explaining the processing performed in step I22. The processing in step I22 is performed to determine the contrast state of an object to be photographed from the waveform formed by the values of the output sums XSUM (that is, XSUM$_E$(1) to XSUM$_E$(32)), thereby obtaining the data FSUM$_E$ indicating the focusing state. When an object to be photographed is in an out-of-focus state as indicated by FL1 in FIG. 47A, a projection waveform formed by XSUM exhibits a moderate valley shape, and a differential value ΔXSUM of the waveform shown in FIG. 47C becomes small. As shown in step I22, the differential value ΔXSUM of the waveform can be obtained by calculating a difference between adjacent data XSUM$_E$(n) and XSUM$_E$(n−1). In addition, in the state indicated by FL1, the value of FSUM$_E$ which is obtained by integrating ΔXSUM is also small.

Figure 47:
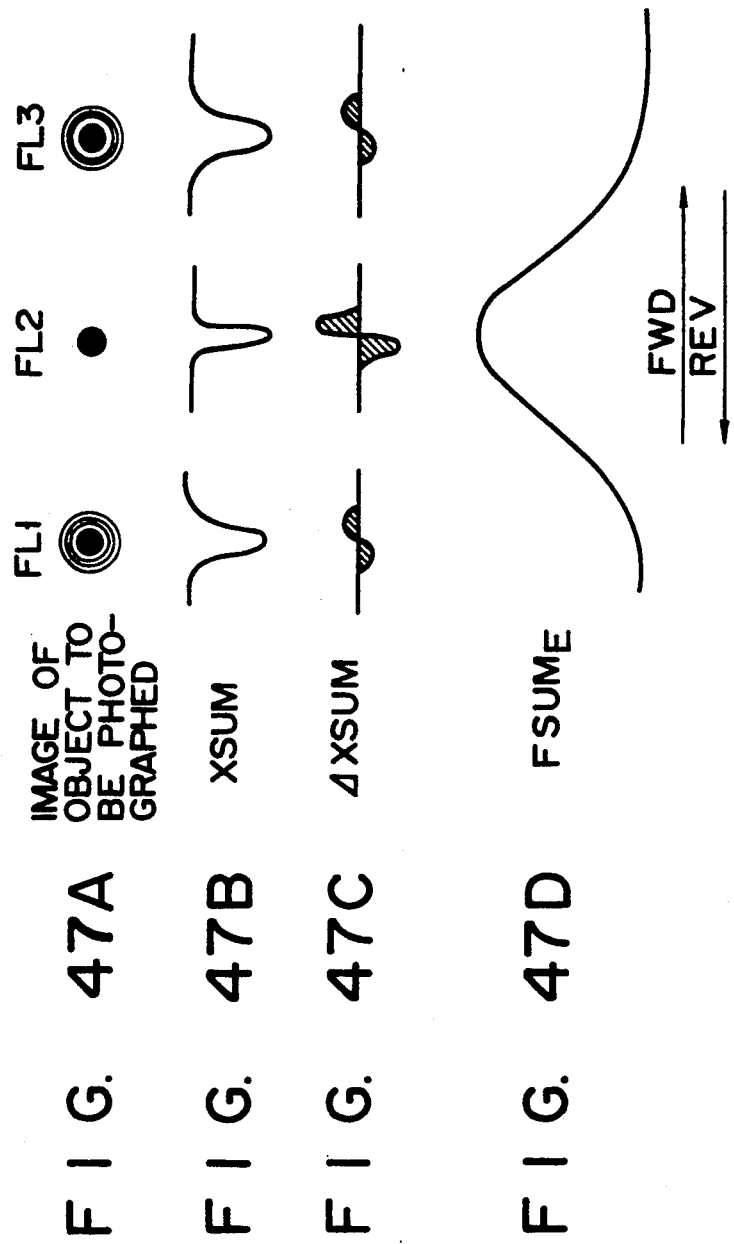
FIGS. 47A through 47D are views for explaining the ADBF subroutine shown in FIG. 46.

When a lens is extended in the direction indicated by FWD or REV in FIG. 47D to obtain an in-focus state indicated by FL2 in FIGS. 47A, 47B, and 47C, the waveform formed by XSUM becomes a sharp valley, and the differential value ΔXSUM of the waveform is increased. Therefore, the value of FSUM$_E$ is also increased. When the lens is further extended, an out-of-focus state as shown by FL3 in FIGS. 47A, 47B, and 47C is obtained, and the value of FSUM$_E$ is decreased. This method is generally called a "hill-climbing method". In step I22, an arithmetic operation of FSUM$_E$ is performed in order to obtain an in-focus point by such a method.

Processing from steps I23 to I28 is performed to shift a scanning pulse in accordance with the value of a PIT as a RAM area for storing a pixel pitch, thereby selecting the next horizontal scanning line.

In step I23, the value of the PIT is input in the counter Pm. In step I24, a shift pulse signal is applied to the input terminal C$_{PH}$ of the horizontal scanning register 72. After the value of the counter Pm is decremented by "1" in step I25, the CPU 10 checks in step I26 whether the value of the counter Pm is "0". If the value of the counter Pm is not "0", the flow returns to step I24, and the processing is repeated until the value of the counter Pm becomes "0" in step I24. If the value of the counter Pm is "0" in step I26, the flow advances to step I27 to increment the value of the counter n by "1". In step I28, the CPU 10 checks whether the value of the counter n is "32". If the value of the counter n is not "32" in step I28, the processing from steps I19 to I27 is repeated until the value of n becomes "32". In this case, since only a shift pulse signal is applied in accordance with the value of the PIT in step I24, the pitch of selected horizontal scanning lines is the same value as that of the PIT. That is, every fourth horizontal scanning lines are selected in the W$_{SEL}$ mode, and adjacent horizontal scanning lines are sequentially selected in the N$_{SEL}$ mode.

In the processing from steps I19 to I28, the output sums XSUM$_E$(1) to XSUM$_E$(32) in the X-direction, the focusing state value FSUM$_E$, and the luminance value BSUM L- are obtained. These output sums XSUM$_E$(1) to XSUM$_E$(32) form projection waveforms XS1 and XS2 as shown in FIG. 2B or FIG. 3B.

Substantially similarly to the processing of reading in the output sums XSUM in the X-direction as described above, processing of reading in the output sums YSUM in the Y-direction is performed to obtain the output sums YSUM$_E$(1) to YSUM$_E$(32) in the Y-direction. These output sums YSUM$_E$(1) to YSUM$_E$(32) form projection waveforms YS1 and YS2 as shown in FIG. 2C or 3C. Note that since the arithmetic operation of the luminance value BSUM of an object to be photographed shown in step I20 and the arithmetic operation of the focusing state value FSUM$_E$ shown in step I22 need only be performed in one direction, they need not be performed upon reading in of the output sums YSUM in the horizontal direction.

In the flow chart shown in FIG. 46, the processing in step I20 repeats the arithmetic operation of the luminance in the tracking field but does not perform so-called "AE lock" for storing the luminance upon depressing of the DSW 66. In order to perform this AE lock, therefore, processing as shown in steps I29 to I32 in FIG. 48 need only be performed in place of the processing in step I20, and processing in step G28 shown in FIG. 49 is performed instead of the processing in step G2 of the flow chart shown in FIG. 42 accordingly. Note that in the flow chart shown in FIG. 48, since processing except for steps I29 to I32 is the same as the processing of the flow chart shown in FIG. 46, only the processing in steps I29 to I32 will be described below. Similarly, in the flow chart shown in FIG. 49, since processing except for step G28 is the same as the processing in the flow chart shown in FIG. 42, only the processing in step G28 will be described below.

Figure 48:
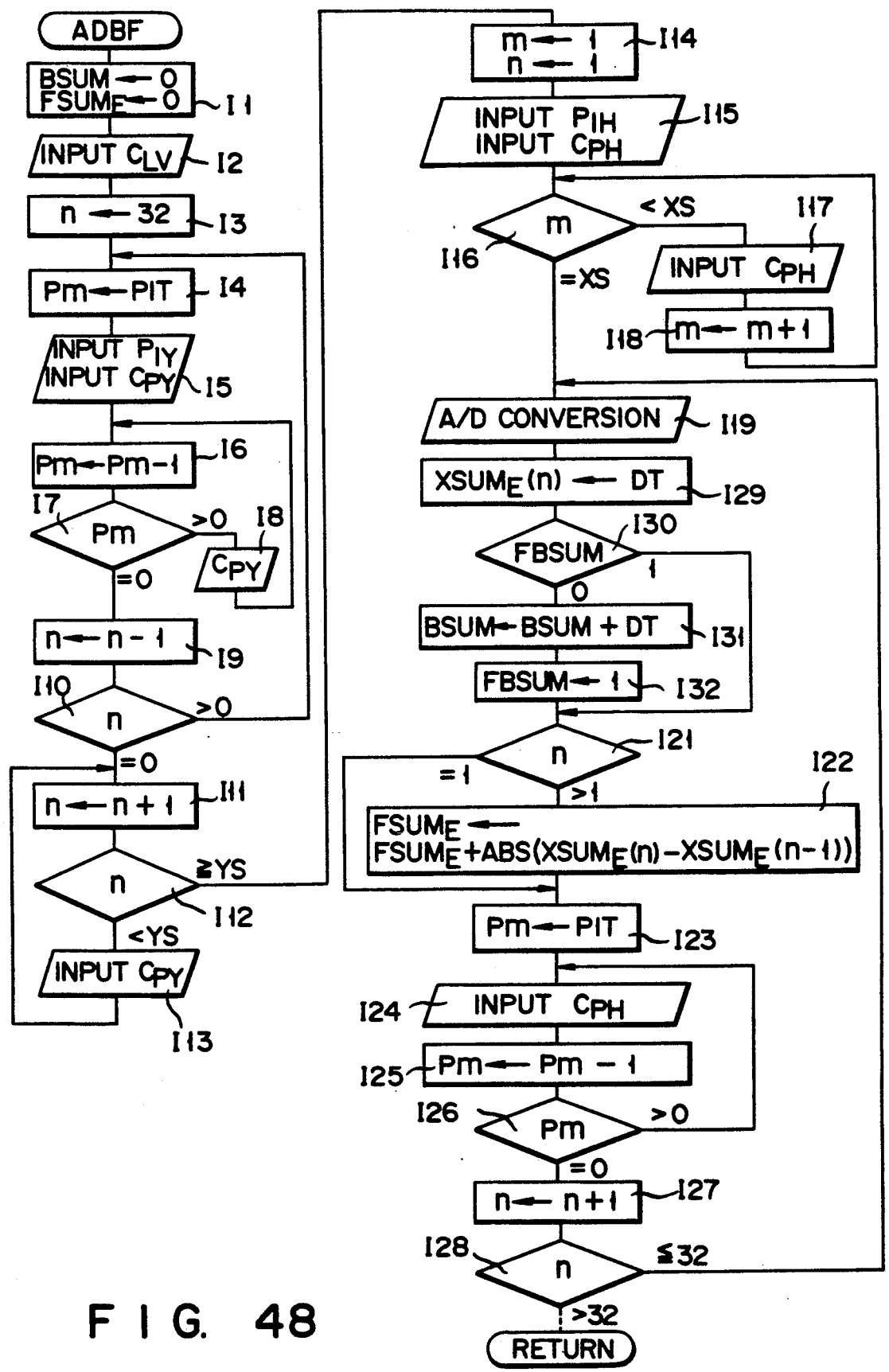
FIG. 48 is a flow chart showing another algorithm of the ADBF subroutine shown in FIG. 42.
Figure 49:
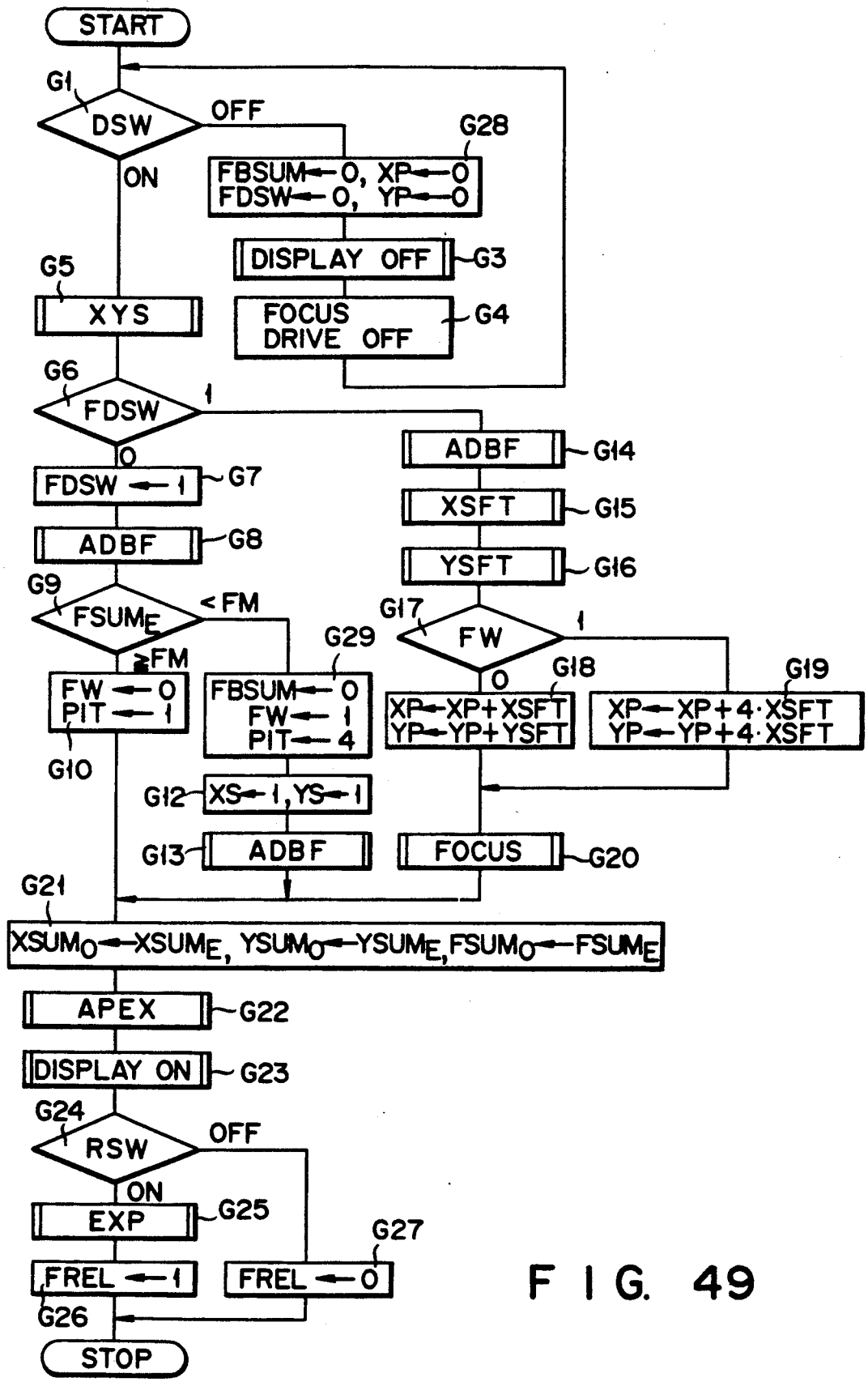
FIG. 49 is a flow chart showing processing operations of a CPU shown in FIG. 48.

In step I29 in FIG. 48, the digital output sum DT obtained in step I19 is stored in the XSUM$_E$(n). In step I30, the CPU 10 checks whether a flag FBSUM to be set when the luminance arithmetic operation is performed is "0" or "1". If the flag FBSUM is "0", the flow advances to step I31, and the output sum DT is added to the value stored in the luminance value BSUM. Thereafter, "1" is set in the flag FBSUM in step I32, and the flow advances to step I21. If the flag FBSUM is "1" in step I30, the flow directly advances to step I21 without performing steps I31 and I32.

In FIG. 49, if the CPU 10 determines in step G1 that the DSW 66 as a first-stroke switch of the operating member 18 is not turned on, the flow advances to step G28. In step G28, the flag FBSUM to be set when the luminance arithmetic operation is performed is reset to be "0", and a flag FDSW for indicating ON/OFF of the DSW 66 and XP and YP as RAM areas for storing the position of a pixel by coordinates are cleared. As a result, when the DSW 66 is released, the AE lock is released. When the DSW 66 is depressed again, the AE lock can be performed in steps I29 to I32 shown in FIG. 48.

As described above, when the luminance arithmetic operation is performed, the flag FBSUM goes to "1". When the processing from steps I29 to I32 is started again, therefore, the first luminance value is stored without performing the luminance arithmetic operation since the flag FBSUM is "1", thereby performing the AE lock.

When the processing in step G11 shown in FIG. 42 is performed similarly to the processing in step G29 shown in FIG. 49, the luminance of an object to be photographed of the entire picture can be AE-locked in the processing in step G13 for obtaining the luminance signal of the entire picture.

FIG. 50 is a flow chart showing an algorithm of the XSFT subroutine shown in FIG. 42. In this XSFT subroutine, a correlation arithmetic operation between the currently read-in output sums (XSUM$_E$(1) to WXUM$_E$(32)) and the immediately preceding read-in output sums XSUM (XSUM$_O$(1) to XSUM$_O$(32)) is performed by executing the ADBF subroutine described above, thereby calculating the moving amount of an object to be photographed in the X-direction (horizontal direction). That is, in this subroutine, as described above with reference to FIG. 5, projection waveforms formed by the immediately preceding read-in output sums XSUM$_E$(1) to XSUM$_E$(32) are slightly shifted with respect to projection waveforms formed by the immediately preceding read-in output sums XSUM$_O$(1) to XSUM$_O$(32) to obtain a total value of absolute difference between the two, and a shift amount obtained when the total value of the absolute difference is minimized is determined as the moving amount of an object to be photographed in the horizontal direction.

In step J1, "$-8$" as an initial value of the shift amount is set in the SFT, and FFFF$_H$ as an initial value is set in an arithmetic register SBS$_O$. Note that the register SBS$_O$ is for storing a minimum value of the total value of absolute differences In step J2, "1" is set in the counter n, and "0" is set in a register SBS. The register SBS is for storing the total value of absolute differences corresponding to a current shift amount. Subsequently, the flow advances to step J3, and the absolute value of the difference between XSUM$_O$(n) as an nth output sum of immediately preceding output sums XSUM in the vertical direction and XSUM$_E$(n+SFT) as an (n+SFT)th output sum of current output sums XSUM is added to the register SBS. Thereafter, the value of the counter n is incremented by "1" in step J4, and a sum of the value of the counter n and the value of the SFT is compared with "32" in step J5.

If the sum of the value of the counter n and the value of the SFT is equal to or smaller than "32" in step J5, the flow returns to step J3. If the sum is larger than "32", the flow advances to step J6, and the value of the register SBS is compared with that of the register SBS$_O$. If the value of the register SBS is smaller than that of the register SBS$_O$ in step J6, the flow advances to step J7. In step J7, the value of the register SBS is stored in the register SBS$_O$, the value (shift amount) of the SFT is stored in the XSFT$_N$, and the flow advances to step J8.

If the value of the register SBS is equal to or larger than that of the register SBS$_O$ in step J6, the flow advances to step J8, and the value of the register SFT is incremented by "1". In step J9, the CPU 10 checks whether the value of the SFT obtained after addition exceeds "8". If the value of the SFT obtained after addition does not exceed "8" in step J9, the flow returns to step J2, and processing from steps J2 to J9 is repeated until the value of the SFT after addition exceeds "8".

If the value of XSFT$_N$ obtained as described above is used as the moving amount of an object to be photographed in the X-direction to move the tracking field, the following inconvenience is caused. FIG. 51 is a view for explaining this inconvenience, in which a black dot indicates an object to be photographed, and a dotted line indicates a tracking field. In addition, each of FL1 to FL5 indicates a frame state obtained each time sum data is fetched.

Referring to FIG. 51, when an object to be photographed moves to the right by one pixel and stops (a moving amount=" +1"), i.e., when the state is changed from FL1 to FL2, the moving amount of the object to be photographed is calculated by the correlation arithmetic operation (steps J1 to J9), and the tracking field is moved by " +1" in accordance with the calculated moving amount to change the state to that indicated by FL3. However, when a correlation arithmetic operation is performed between the states indicated by FL2 and FL3, it is determined by the above correlation arithmetic operation that the object to be photographed is moved to the left by one pixel (a moving amount="$-1$"), and the tracking field is moved to the left by "$-1$" as indicated by FL4. When a correlation arithmetic operation is performed between the states indicated by FL3 and FL4, it is determined by the above correlation arithmetic operation that the object to be photographed is moved to the right by one pixel (a moving amount=" +1"), and the tracking field is moved to the left by one pixel as indicated by FL5. That is, if the value of XSFT$_N$ obtained by the above correlation arithmetic operation (steps J1 to J9) is used as the moving amount of an object to be photographed in the X-direction to move the tracking field, the tracking field oscillates to the right and left although the object to be photographed stands still.

In order to eliminate this drawback, a value XSFT obtained by adding a moving amount XSFT$_O$ of an object to be photographed calculated by an immediately preceding correlation arithmetic operation to a moving amount XSFT$_N$ of the object to be photographed calculated by a current correlation arithmetic operation can be used to set the tracking field. FIG. 52 is a view for explaining setting of the tracking field performed by using the XSFT. Note that "0" is set in the XSFT$_O$ as an initial value.

Referring to FIG. 52, assume that an object to be photographed moves to the right by one pixel and stops, i.e., the state is changed from FL1 to FL2. Since the immediately preceding moving amount XSFT$_O$ is "0" and the current moving amount XSFT$_N$ is " +1", the XSFT is " +1". Therefore, the tracking field is moved by " +1" to change the state to that indicated by FL3. When a correlation arithmetic operation is performed between the states indicated by FL2 and FL3, "0" is obtained as the XSFT since the immediately preceding moving amount XSFT$_O$ is " +1" and the current moving amount XSFT$_N$ is "$-1$". Therefore, the tracking field is not moved as indicated by FL4. When a correlation arithmetic operation is performed between the states indicated by FL3 and FL4, "0" is obtained as the XSFT since the immediately preceding moving amount XSFT$_O$ is "0" and the current moving amount XFST$_N$ is "0". Therefore, the tracking field is not moved as indicated by FL5. In this manner, oscillation of the tracking field can be prevented. Steps J10 and J11 shown in the flow chart of FIG. 50 are provided to perform this processing.

The XSFT subroutine for arithmetically operating a moving amount in the X-direction has been described above. The YSFT subroutine for arithmetically operating a moving amount in the Y-direction is the same as the above subroutine and a detailed description thereof will be omitted.

FIG. 53 is a flow chart showing an algorithm of the FOCUS subroutine shown in FIG. 42. In the FOCUS subroutine, the focusing state value $FSUM_E$ described above with reference to FIGS. 47A through 47D is used to perform focus adjustment control.

In step K1, the CPU 10 checks whether the extending direction of a lens is an FWD direction or an REV direction shown in FIG. 47D. If the extending direction is the FWD direction, the flow advances to step K2, and a magnitude relationship between the $FSUM_E$ and immediately preceding detected focusing state value $FSUM_O$ is checked. If $FSUM_E > FSUM_O$ in step K2, the flow advances to step K3, and the lens extending direction is set to be FWD. If $FSUM_E \leq FSUM_O$ in step K2, the flow advances to step K5 to set the lens extending direction to be REV.

If the lens extending direction is the REV direction shown in FIG. 47D in step K1, the flow advances to step K4, and a magnitude relationship between the $FSUM_E$ and the immediately preceding detected focusing state value $FSUM_O$ is checked. If $FSUM_E \leq FSUM_O$, the flow advances to step K3 to set the lens extending direction to be FWD. If $FSUM_E > FSUM_O$ in step K4, the flow advances to step K5 to set the lens extending direction to be REV.

Thereafter, regardless of whether the flow advances to step K3 or K5, the lens is extended in a direction for obtaining an in-focus point in step K6.

Note that the focus adjustment control method of this embodiment described above with reference to FIGS. 47D and 53 uses a single imaging device to perform focus adjustment in accordance with the contrast. However, another method can be used in the present invention.

FIG. 54 is a schematic sectional view showing another focus adjustment control method, in which a photographic lens 40, a condenser lens 104, and separate lenses 106 and 108 are arranged between an object to be photographed and two imaging devices $12_1$ and $12_2$. With this arrangement, an exit pupil is divided into the right and left parts by the separate lenses 106 and 108, and an object to be photographed is imaged by the two imaging devices $12_1$ and $12_2$. Therefore, a distance to the object to be photographed can be detected by a shift amount between the images.

Figures 55A, 55B, 55C:
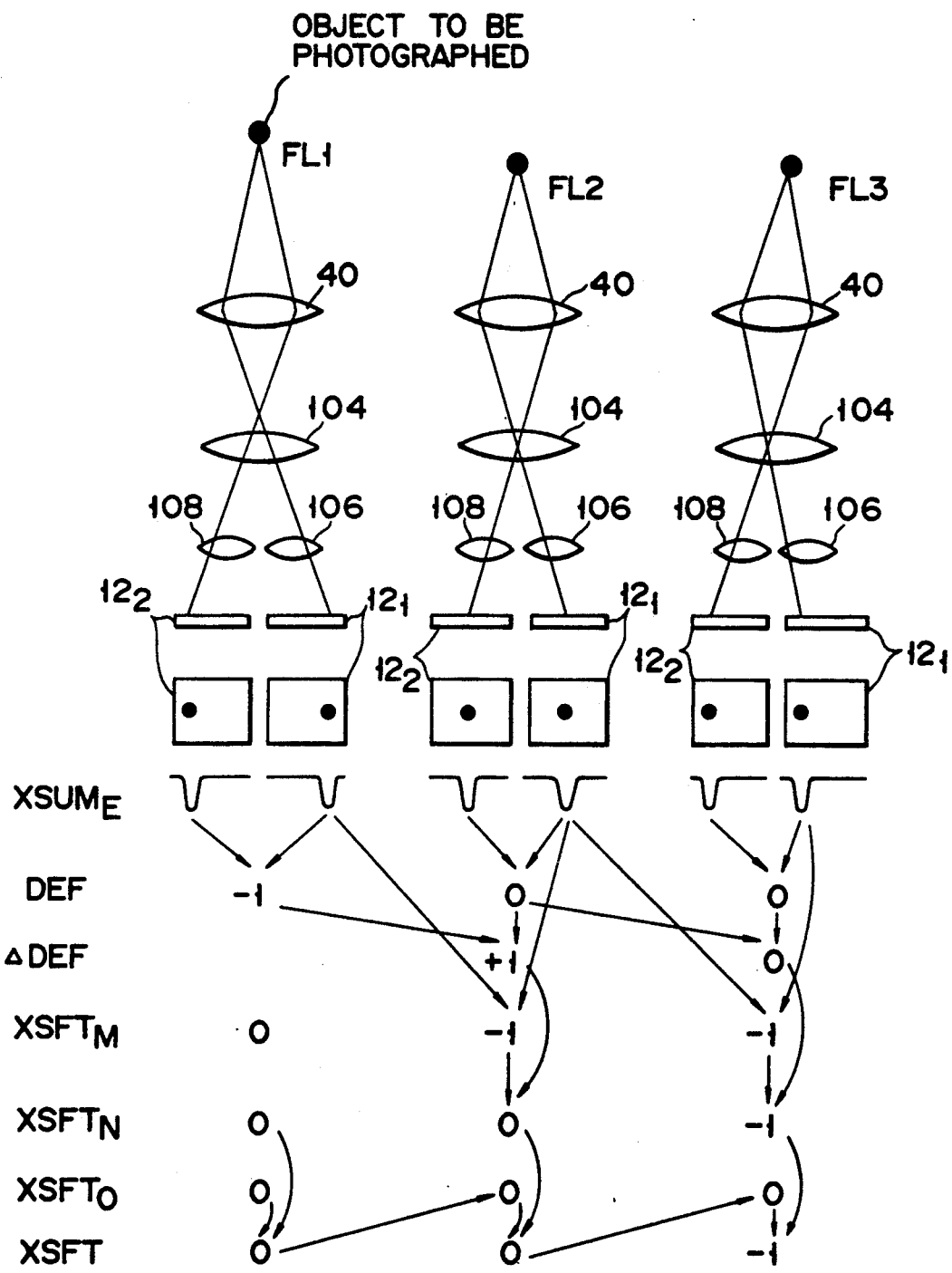
FIGS. 55A through 55C are views for explaining a method of detecting a moving amount of an object to be photographed performed when the focus adjustment control method shown in FIG. 54 is used.

FIGS. 55A through 55C are views for explaining a method of detecting the moving amount of an object to be photographed performed when the focus adjustment control method shown in FIG. 54 is used. Referring to FIG. 55A, FL1 indicates an initial state which is an out-of-focus state. FL2 shown in FIG. 55B indicates an in-focus state obtained when an object to be photographed approaches the camera. FL3 shown in FIG. 55C indicates a state in which the object to be photographed moves in the X-direction by "−1" while maintaining its in-focus state.

Firstly, a correlation arithmetic operation is performed for values $XSUM_E$ obtained from the two imaging devices $12_1$ and $12_2$ in the state indicated by FL1 in FIG. 55A to obtain a shift amount DEF between the two images. In this case, assume that the shift amount DEF obtained in the state indicated by FL1 is "−1". A correlation arithmetic operation is similarly performed for the state indicated by FL2 in FIG. 55B to obtain a shift amount DEF. Since FL2 indicates the in-focus state, the shift amount DEF is "0". That is, the shift amount DEF takes different values although the object to be photographed does not move horizontally. For this reason, when a correlation arithmetic operation is performed between an output sum XSUME obtained from the imaging devices $12_1$ and $12_2$ in the state indicated by FL1 shown in FIG. 55A and an output sum $XSUM_E$ obtained from the imaging devices $12_1$ and $12_2$ in the state indicated by FL2 shown in FIG. 55B to obtain a moving amount $XSFT_M$ of the object to be photographed in the X-direction, $XSFT_M = -1$ is obtained, i.e., an erroneous value is obtained as $XSFT_M$ although the object to be photographed actually does not move horizontally.

In order to eliminate the above inconvenience, a difference $\Delta DEF$ between the current DEF and the immediately preceding DEF is calculated, and a value $XSFT_N$ obtained by adding this $\Delta DEF$ to the above $XSFT_M$ is used as a real moving amount XSFT. When the $XSFT_N$ is used as the moving amount, "0" is obtained as the moving amount in the state indicated by FL2 shown in FIG. 55. That is, as shown in FIGS. 55A through 55C, since the difference $\Delta DEF$ between the current DEF and the immediately preceding DEF is "+1" and the $XSFT_M$ is "−1", the $XSFT_N$, i.e., the real moving amount XSFT is "0". In addition, since the $\Delta DEF$ is "0" and the $XSFT_M$ is "−1" in the state indicated by FL3 shown in FIG. 55C, the real moving amount XSFT is "−1".

In this embodiment, the calculated moving amount of an object to be photographed is used to set the tracking field. However, this moving amount information may be output to the external control unit 78 of the camera.

FIGS. 56, 57, 58A, 58B, and 59 are views for explaining an operation for outputting the moving amount information outside the camera, in which an electric pivot table is driven by the output moving amount information to constantly direct the camera toward an object to be photographed.

FIG. 56 shows a circuit arrangement for driving the electric pivot table. Referring to FIG. 56, reference numeral 110 denotes an electric pivot table in which signal lines $XPO_1$, $XPO_2$, $YPO_1$, and $YPO_2$ for transmitting the moving amount information from the camera main body 36 to the electric pivot table 110 and a ground line GND are connected to an encoder 112. A motor driver 114 is connected to the encoder 112, a first motor 116 for rotating the electric pivot table 110 in the horizontal direction, and a second motor 118 for rotating the table 110 in the vertical direction.

FIG. 57 is a schematic perspective view showing a mechanism of the electric pivot table 110, in which a fixing table 120 is driven by the first and second motors 116 and 118 for horizontally and vertically rotating the electric pivot table 110 and pivots the camera main body 36 fixed to the fixing table 120 in a direction indicated by arrows.

FIGS. 58A and 58B are views showing decoded states of signals supplied via the signal lines $XPO_1$ and $XPO_2$ and the signal lines $YPO_1$ and $YPO_2$, respectively. When an object to be photographed is located at the center on the X axis, i.e., when XP is "0" as shown in FIG. 58A, "0"s are output from the signal lines $XPO_1$ and $XPO_2$. When the object to be photographed is located at the right side on the X axis, i.e., when XP is "+", "1" is output from the signal line $XPO_1$, and "0" is output from the signal line $XPO_2$. When the object to be photographed is located at the left side on the X axis, i.e., when XP is "—", "1"s are output from the signal lines $XPO_1$ and $XPO_2$.

When the object to be photographed is located at the center on the Y axis, i.e., when YP is "0" as shown in FIG. 58B, "0"s are output from the signal lines $YPO_1$ and $YPO_2$. When the object to be photographed is located at the lower side on the Y axis, i.e., when YP is "+", "1" is output from the signal line $YPO_1$, and "0" is output from the signal line $YPO_2$. When the object to be photographed is located at the upper side on the Y axis, i.e., when YP is "—", "1"s are output from the signal lines $YPO_1$ and $YPO_2$. The encoder 112 receives these signals and outputs encoded signals to the motor driver 114. The motor driver 114 drives the first and second motors 116 and 118 in accordance with the signals from the encoder 112. The position of the fixing table 120 is changed upon driving of the motors 116 and 118 to constantly direct the camera toward the object to be photographed.

FIG. 59 is a block diagram for explaining another operation of outputting the moving amount information outside the camera, in which the direction of illumination light from a strobe or the like is changed by the output moving amount information so that the illumination light is constantly directed toward an object to be photographed. Referring to FIG. 59, reference numeral 122 denotes a strobe constituted by an encoder 124, a motor driver 126, an actuator 128 for rotating an internal illuminating unit 132 in the X-direction, an actuator 130 for rotating the internal illuminating unit 132 in the Y-direction, and the internal illuminating unit 132 of the strobe 122. The encoder 124 receives a position information output 80 from the camera main body 36 and outputs an encoded signal to the motor driver 126. The motor driver 126 drives the actuators 128 and 130 in accordance with the signal from the encoder 124. The position of the illuminating unit 132 is changed upon driving of the actuators 128 and 130 to constantly direct the illumination light from the strobe 122 toward the object to be photographed.

Figure 60:
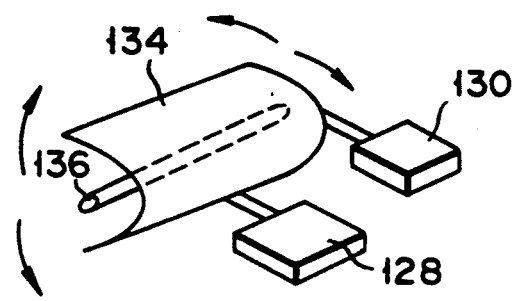
FIG. 60 is a schematic perspective view showing a practical arrangement of a mechanical portion shown in FIG. 59.

FIG. 60 is a schematic perspective view showing a mechanism in which a reflecting member located behind a xenon tube is driven in the X- and Y-directions by actuators such as piezoelectric elements to constantly direct illumination light toward an object to be photographed. Referring to FIG. 60, the position of a reflecting member 134 is changed upon driving of actuators 128 and 130 to constantly direct illumination light from a xenon tube 136 toward an object to be photographed.

Figure 61:
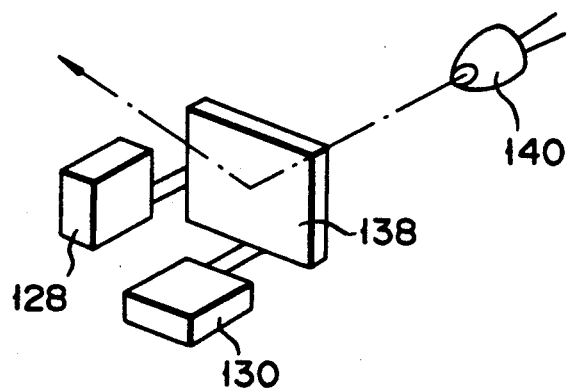
FIG. 61 is a schematic perspective view showing another arrangement of the mechanical portion shown in FIG. 59.

FIG. 61 is a schematic perspective view showing a mechanism in which a mirror for reflecting auxiliary light such as a light-emitting diode (LED) is driven in the X- and Y-directions by actuators to constantly direct illumination light toward an object to be photographed. Referring to FIG. 61, the position of a mirror 138 for reflecting auxiliary light is changed upon driving of actuators 128 and 130 to constantly direct illumination light from an LED 140 as an auxiliary light source toward an object to be photographed.

In this manner, since illumination light is caused to track and be constantly directed toward an object to be photographed, an image of an object to be photographed can be obtained even when the object to be photographed is dark under natural light and a light amount sufficient for photographing cannot be obtained.

Figure 62:
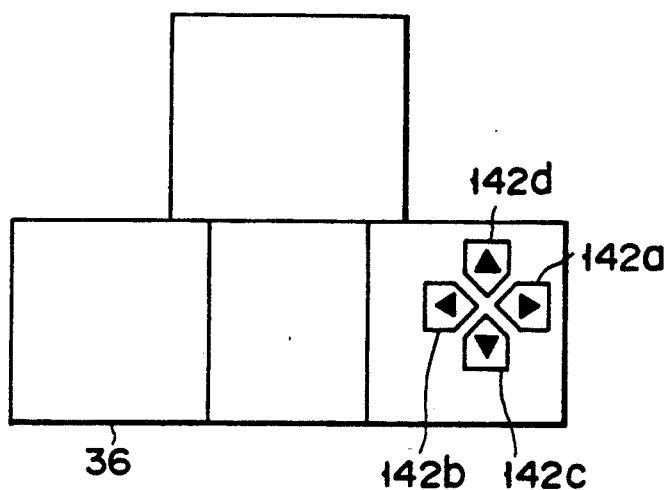
FIG. 62 is a schematic view of a camera for explaining a second method of setting a tracking field.

In the above embodiment, a portion located at the center of a picture in an initial state is set as an object to be photographed. However, a portion located at a position except for the center of a picture can be arbitrarily set as an object to be photographed by a user of a camera. For example, in FIG. 62, reference numerals 142a, 142b, 142c, and 142d denote initial position setting switches for setting a portion as an object to be photographed on a picture.

Figure 63:
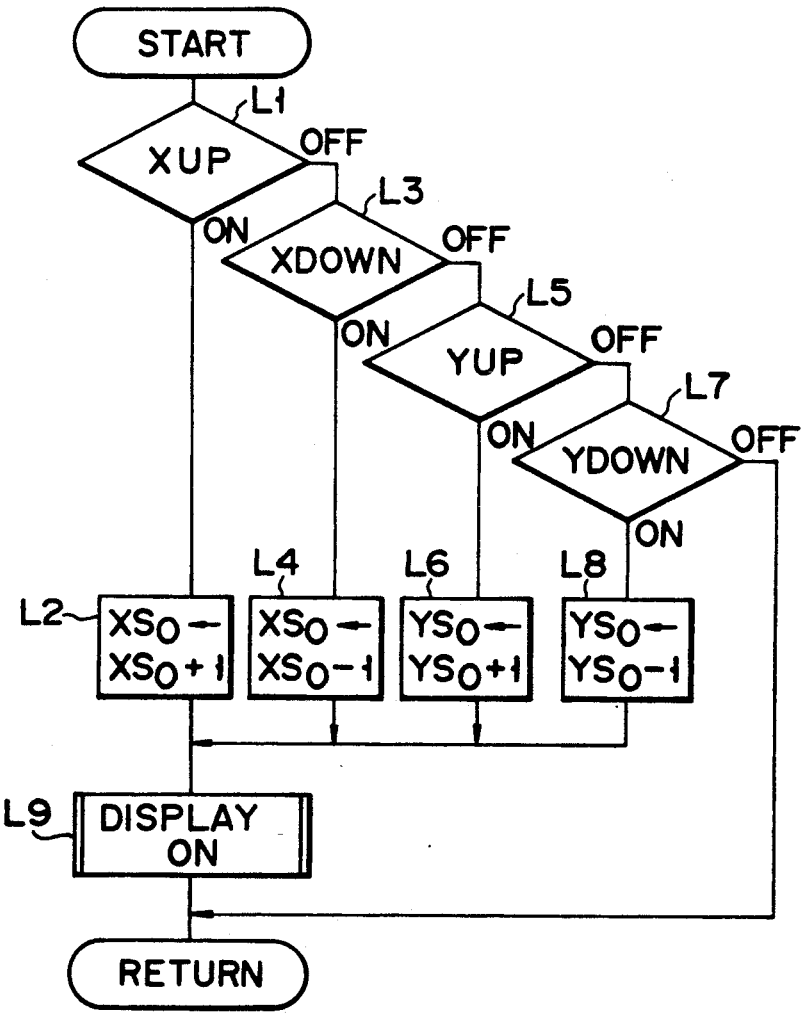
FIG. 63 is a flow chart showing processing operations of a CPU performed when an initial position set switch is depressed, for explaining the second method of setting a tracking field.

FIG. 63 is a flow chart for explaining processing performed by the CPU 10 when the initial position setting switches 142a to 142d are operated.

If the switch 142a is depressed in step L1, the flow advances to step L2 to increment an initial position $X_{SO}$ of a tracking field in the X-direction by "1". If the switch 142b is depressed in step L3, the flow advances to step L4 to decrement the initial position $XS_O$ of the tracking field in the X-direction by "1". Similarly, if the switch 142c is depressed in step L5, the flow advances to step L6 to increment an initial position YSO of the tracking field in the Y-direction by "1". If the switch 142d is depressed in step L7, the flow advances to step L8 to decrement the initial position $YS_O$ of the tracking field in the Y-direction by "1". After processing is performed in steps L2, L4, L6, and L8, the flow advances to step L9 to display a picture. In this manner, an object to be photographed can be arbitrarily set by moving the tracking field on the picture by using the initial position setting switches 142a to 142d.

In addition, in this embodiment, the XY address imaging device 12 is incorporated in the camera main body 36. If a finder portion is arranged to be separated from a camera main body as in a single-lens reflex camera, however, a finder unit incorporating the XY address imaging device 12, the CPU 10, the display unit 22, and the like may be detachably mounted on the camera main body 36.

FIG. 64 is a schematic perspective view showing a single-lens reflex camera having the above arrangement, in which a finder unit 144 incorporating, e.g., the XY address imaging device 12 and the display unit 22 can be detachably mounted on the camera main body 36. In this arrangement, since the CPU 10 inside the finder unit 144 performs a focus adjustment control or exposure arithmetic operation as described above, output terminals 146 for focusing control and exposure control are provided at a connection portion between the camera main body 36 and the finder unit 144. Alternatively, the CPU 10 may be arranged inside the camera main body 36 to perform the focus adjustment control or exposure arithmetic operation inside the main body 36.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A display apparatus of a camera, comprising:
    two-dimensional sensor means for repeatedly imaging an object to be photographed and for generating two-dimensional luminance signals;
    pattern signal generating means for repeatedly generating one-dimensional pattern signals from the two-dimensional luminance signals;

memory means for storing an immediately preceding pattern signal each time said pattern signal generating means generates a new pattern signal;

moving amount detecting means for performing, after said memory means stores an immediately preceding pattern signal, a correlation arithmetic operation between a new pattern signal and the immediately preceding pattern signal stored in said memory means to detect a moving amount of the object to be photographed during a repetition time interval, and for performing the correlation arithmetic operation each time said memory means stores an immediately preceding pattern signal; and display means for displaying a moving amount of the object by using a width of a photographing picture as a basic unit even if an image of the object is outside the range of the photographing picture.

2. An apparatus according to claim 1, wherein said display means includes means for integrating the moving amounts each time a moving amount is calculated and storing the integrated value, setting means for setting the integrated value to be predetermined initial value, and a display portion for displaying the integrated value.

3. A display apparatus of a camera having a light-receiving element for receiving light from an object to be photographed, at a predetermined position in a photographing picture, and means for displaying, as the object to be photographed, the light from said object that is received at the predetermined position, and a position in the photographing picture to which the object to be photographed moves, comprising:

operating means;

a light-receiving element for receiving light from the object to be photographed at a predetermined position in the photographing picture and for generating a photoelectric signal;

memory means for storing the photoelectric signal when said operating means is operated;

two-dimensional sensor means for repeatedly imaging the object to be photographed and for generating two-dimensional luminance signals;

pattern signal generating means for repeatedly generating one-dimensional pattern signals from the two-dimensional luminance signals;

memory means for storing an immediately preceding pattern signal each time said pattern signal generating means generates a new pattern signal;

moving amount detecting means for performing, after said memory means stores an immediately preceding pattern signal, a correlation arithmetic operation between a new pattern signal and the immediately preceding pattern signal stored in said memory means to detect a moving amount of the object to be photographed during a repetition time interval, and for performing the correlation arithmetic operation each time said memory means stores an immediately preceding pattern signal;

monitoring means for monitoring the photographing picture; and mark display means for displaying a movable mark in the picture monitored by said monitoring means on a peripheral portion of the monitored picture.

4. An apparatus according to claim 3, wherein said light-receiving element comprises a light-receiving element for spot photometry.

5. An apparatus according to claim 3, wherein said light-receiving element is constituted by a light-receiving element for focus detection.

6. An apparatus according to claim 3, wherein said operating means comprises operating a release button.

7. An apparatus according to claim 3, wherein said operating means comprises operating a spot photometry button.

8. An apparatus according to claim 3, wherein said two-dimensional sensor means comprises a plurality of first scanning lines in a predetermined direction, a plurality of second scanning lines in a direction perpendicular to the predetermined direction, and a plurality of photoelectric conversion elements, arranged at intersections between said plurality of first scanning lines and said plurality of second scanning lines, for generating a photoelectric output in accordance with a selection state of said scanning lines, and said pattern signal generating means sequentially selects some of said plurality of second scanning lines while simultaneously selecting some of said plurality of first scanning lines, thereby generating one-dimensional pattern signals of the object to be photographed.

9. An apparatus according to claim 3, wherein said pattern signal generating means is arranged outside said two-dimensional sensor means and includes a frame memory for storing a luminance signal from said two-dimensional sensor means as a two-dimensional pixel pattern, arithmetic operating means for arithmetically operating a sum of pixels of one array of said frame memory, and means for sequentially generating the sum of each array obtained by said arithmetic operating means.

10. An object moving amount detecting apparatus of a camera, having two-dimensional sensor means, for detecting a moving amount of an object to be photographed, comprising:

two-dimensional sensor means including a plurality of first pixel selection lines arranged in a predetermined direction, a plurality of second pixel selection lines arranged in a direction perpendicular to the predetermined direction, and a plurality of photoelectric conversion elements, arranged at intersections between said plurality of first pixel selection lines and said plurality of second pixel selection lines, for generating a photoelectric output in accordance with a selection state of said pixel selection lines;

imaging means for imaging an object to be photographed on said two-dimensional sensor means;

control means for sequentially selecting some of said plurality of second pixel selection lines while simultaneously selecting some of said plurality of first pixel selection lines, thereby causing said two-dimensional sensor means to repeatedly output pattern signals of the image of the object to be photographed;

memory means for storing an immediately preceding pattern signal each time said control means outputs a new pattern signal; and moving amount detecting means for performing, after said memory means stores an immediately preceding pattern signal, a correlation arithmetic operation between a new pattern signal and the immediately preceding pattern signal stored in said memory means to detect a moving amount of the object to be photographed during the repetition time interval, and for performing the correlation arithmetic operation each time said memory means stores an immediately preceding pattern signal.

11. An apparatus according to claim 10, wherein said plurality of first pixel selection lines comprise vertical pixel selection lines, and said plurality of second pixel selection lines comprise horizontal pixel selection lines.

12. An apparatus according to claim 10, wherein said plurality of first pixel selection lines comprise horizontal pixel selection lines, and said plurality of second pixel selection lines comprise vertical pixel selection lines.

13. An apparatus according to claim 10, further comprising means for arithmetically operating a luminance of the object to be photographed on the basis of at least one of a new pattern signal and an immediately preceding pattern signal stored in said memory means.

14. An apparatus according to claim 10, further comprising means for detecting a focusing state of the image of the object to be photographed on the basis of at least one of a new pattern signal and an immediately preceding pattern signal stored in said memory means.

15. An apparatus according to claim 10, wherein said control means has shift register means and pulse generating means for generating a predetermined pulse to said shift register means.

16. An object position detecting apparatus of a camera, having two-dimensional sensor means, for tracking movement of an initially registered object to be photographed to detect a position thereof, comprising:
  position information memory means for storing position information;
  initializing means for initializing the position information;
  two-dimensional sensor means including a plurality of first scanning lines arranged in a predetermined direction, a plurality of second scanning lines arranged in a direction perpendicular to the predetermined direction, and a plurality of photoelectric conversion elements, arranged at intersections between said plurality of first scanning lines and said plurality of second scanning lines, for generating a photoelectric output in accordance with a selection state of said scanning lines;
  imaging means for imaging an object to be photographed on said two-dimensional sensor means;
  control means for sequentially selecting some of said plurality of second scanning lines while simultaneously selecting some of said plurality of first scanning lines, thereby causing said two-dimensional sensor means to repeatedly output pattern signals of the image of the object to be photographed;
  memory means for storing an immediately preceding pattern signal each time said control means outputs a new pattern signal;
  moving amount detecting means for performing, after said memory means stores an immediately preceding pattern signal, a correlation arithmetic operation between a new pattern signal and the immediately preceding pattern signal stored in said memory means to detect a moving amount of the object to be photographed during the repetition time interval, and for performing the correlation arithmetic operation each time said memory means stores an immediately preceding pattern signal; and
  position detecting means for adding, after said moving amount detecting means detects the moving amount, the detected moving amount to the position information to detect a position of the object to be photographed, and for performing the addition each time said moving amount detecting means detects the moving amount.

17. An apparatus according to claim 16, wherein said control means has means for simultaneously selecting some of said plurality of first scanning lines extending close to a position on said two-dimensional sensor means corresponding to the position information and for sequentially selecting some of said plurality of second scanning lines extending close to the position on said two-dimensional sensor means corresponding to the position information.

18. An apparatus according to claim 16, further comprising display means for displaying the position information.

19. An apparatus according to claim 17, wherein said display means has means for displaying the position information with reference to the length of a photographing picture.

20. An apparatus according to claim 16, further comprising means for outputting the position information outside said camera.

21. A moving amount detecting apparatus of a camera for detecting an object to be photographed in a photographing picture, comprising:
  moving amount detection region setting means for setting a size of a moving amount detection region in the photographing picture, said moving amount detection region setting means varying the moving amount detection region in association with at least one of a luminance measurement and a distance measurement;
  two-dimensional sensor means for repeatedly imaging an object to be photographed and generating two-dimensional luminance signals;
  pattern signal generating means for repeatedly generating one-dimensional pattern signals from the two-dimensional luminance signals for at least one of inside and outside said two-dimensional sensor means;
  memory means for storing an immediately preceding pattern signal each time said pattern signal generating means generates a new pattern signal; and
  moving amount detecting means for performing, after said memory means stores an immediately preceding pattern signal, a correlation arithmetic operation between a new pattern signal and the immediately preceding pattern signal stored in said memory means to detect a moving amount of the object to be photographed during the repetition time interval, and for performing the correlation arithmetic operation each time said memory means stores immediately preceding pattern signal.

22. An apparatus according to claim 21, further comprising photometry means having a plurality of photometry regions, photometry region setting means for setting said photometry regions, and association setting means for performing setting of one of said moving amount detection region setting means and said photometry region setting means in association with setting of the other.

23. An apparatus according to claim 21, further comprising focus detecting means having a plurality of focus detection regions, focus detection region setting means for setting said focus detection regions, and association setting means for performing setting of one of said moving amount detection region setting means and said focus detection region setting means in association with setting of the other.

24. An apparatus according to claim 21, further comprising photometry operating means, partial photometry means for partially measuring a luminance of an object to be photographed at a predetermined position in the photographing picture when said photometry operating means is operated, measuring means for measuring the number of operation times of said photometry operating means, and means for performing setting of said moving amount detection region setting means in association with the number of operation times.

25. An apparatus according to claim 21, wherein said moving amount detection region setting means checks in accordance with a waveform of the one-dimensional pattern signal whether moving amount detection can be performed, and sets a moving amount detection region in accordance with the check result.

26. A camera apparatus having an area display device, comprising:
   two-dimensional image sensor means for imaging an object to be photographed;
   sum output means for outputting, from image information output from said two-dimensional image sensor means, a sum of image signals of pixels of one array in a direction perpendicular to a predetermined direction;
   pattern signal output means for sequentially calculating a plurality of sums of image signals of pixels in the predetermined direction and for outputting pattern signals;
   memory means for storing a first pattern signal output from said pattern signal output means;
   moving amount arithmetic operation means for arithmetically determining, after the first pattern signal is stored, a moving amount of the object to be photographed in the predetermined direction on the basis of a correlation between a second pattern signal output from said pattern signal output means and the first pattern signal stored in said memory means with respect to an image of the object to be photographed;
   integrating means for updating, after the moving amount is arithmetically determined, the second pattern signal as a stored value of said memory means instead of the first pattern signal; and
   display means for displaying the integration result obtained by said integrating means as a moving amount of a photographing picture from an initial position.

27. An apparatus according to claim 26, further comprising an operating member for resetting the integrated value obtained by said integrating means.

28. An apparatus according to claim 27, further comprising means for causing said display means to display an alarm when a moving amount exceeding the length of an imaging limit in the predetermined direction of said two-dimensional image sensor means is detected in accordance with the integration performed by said integrating means.

29. An apparatus according to claim 27, wherein said display means displays, when return of the image of the object to be photographed to the initial picture is detected in accordance with the arithmetic operation performed by said integrating means, information indicating the return.

30. An apparatus according to claim 26, wherein said two-dimensional image sensor means sequentially reads out pixel signals by sequentially scanning horizontal and vertical scanning lines, and said sum output means A/D-converts the readout pixel signals and obtains, from the A/D-converted digital values, a sum of image signals of pixels of one array in a direction perpendicular to the predetermined direction by a digital arithmetic operation.

31. An apparatus according to claim 26, wherein said two-dimensional image sensor means has a horizontal scanning register capable of simultaneously selecting a plurality of horizontal scanning lines and a vertical scanning register capable of simultaneously selecting a plurality of vertical scanning lines and selects a pixel by selecting the horizontal and vertical scanning lines, thereby outputting a pixel signal, said sum output means causes one of said horizontal and vertical scanning registers to simultaneously select a plurality of scanning lines corresponding to the one resister, thereby calculating a sum of image signals of pixels of one array in an analog manner, and said pattern signal output means obtains a pattern signal by selecting scanning lines corresponding to the other register in the above selection state.

32. A camera apparatus having an area display device, comprising:
   operating means for entering a command for commanding one of a selective luminance measurement and a distance measurement with respect to a specific narrow angle portion in a picture;
   two-dimensional image sensor means for imaging an object to be photographed;
   sum output means for outputting, from image information output from said two-dimensional image sensor means, a sum of image signals of pixels of one array in a direction perpendicular to a predetermined direction;
   pattern signal output means for sequentially calculating the sums in the predetermined direction to output pattern signals;
   memory means for storing a first pattern signal output from said pattern signal output means;
   moving amount arithmetic operating means for arithmetically operating, after the first pattern signal is stored, a moving amount of the object to be photographed in the predetermined direction on the basis of a correlation between a second pattern signal output from said pattern signal output means and the first pattern signal stored in said memory means with respect to an image of the object to be photographed;
   repeating means for causing, after the moving amount if arithmetically operated, said memory means to store the second pattern signal as the first pattern signal, thereby repeating the moving amount arithmetic operations; and
   display means for displaying the moving amount arithmetic operation result obtained by said repeating means as a moving amount of the selected narrow angle portion from an operation timing of said operating means.

33. An apparatus according to claim 32, wherein said moving amount arithmetic operating means sets a rectangular region in correspondence with the narrow angle portion and performs an arithmetic operation for the rectangular region when said operating means is operated.

34. An apparatus according to claim 33, wherein said moving amount arithmetic operating means performs an arithmetic operation for the entire picture when said operating means is operated a plurality of times.

35. An apparatus according to claim 34, wherein said display means assigns a number to a position each time said operating means is operated and displays the number so that the number overlaps the image of the object to be photographed.

36. An apparatus according to claim 32, wherein said two-dimensional image sensor means sequentially reads out pixel signals by sequentially scanning horizontal and vertical scanning lines, and said sum output means A/D-converts the readout pixel signals and obtains, from the A/D-converted digital values, a sum of image signals of pixels of one array in a direction perpendicular to the predetermined direction by a digital arithmetic operation.

37. An apparatus according to claim 32, wherein said two-dimensional image sensor means has a horizontal scanning register capable of simultaneously selecting a plurality of horizontal scanning lines and a vertical scanning register capable of simultaneously selecting a plurality of vertical scanning lines and selects a pixel by selecting the horizontal and vertical scanning lines, thereby outputting a pixel signal, said sum output means causes one of said horizontal and vertical scanning registers to simultaneously select a plurality of scanning lines corresponding to the one register, thereby calculating a sum of image signals of pixels of one array in an analog manner, and said pattern signal output means obtains a pattern signal by selecting scanning lines corresponding to the other register in the above selection state.

38. A camera apparatus having two-dimensional image sensor means for imaging an object to be photographed and a moving amount detecting device for detecting a moving amount of the object to be photographed in a photographing picture on the basis of a change over time of a pattern signal of an image signal output from said two-dimensional image sensor means, comprising:

said two-dimensional image sensor means, having a horizontal scanning register capable of simultaneously selecting a plurality of horizontal scanning lines and a vertical scanning register capable of simultaneously selecting a plurality of vertical scanning lines, for outputting a pixel signal of a pixel selected by said horizontal and vertical scanning lines;

sum output means for causing one of said horizontal and vertical scanning registers to simultaneously select a plurality of scanning lines corresponding to the one register, thereby calculating, from image information output from said two-dimensional image sensor means, a sum of image signals of pixels of one array in a direction perpendicular to a predetermined direction in an analog manner; and pattern signal output means for sequentially calculating the sums in the predetermined direction by selecting scanning lines corresponding to the other register in the above selection state, thereby outputting a pattern signal.

39. An apparatus according to claim 38, further comprising integrating means for integrating the sums output from said sum output means in units of arrays in the predetermined direction, object luminance arithmetic operating means for arithmetically operating a luminance of the object to be photographed on the basis of the value integrated by said integrating means, exposure value arithmetic operating means for arithmetically operating an exposure value on the basis of the luminance of the object to be photographed, and exposure control means for controlling an exposure amount on the basis of the exposure value.

40. An apparatus according to claim 38, further comprising operating means for commanding distance measurement, focusing state detecting means for setting a specific region in a picture and detecting a focusing state on the basis of an image of the object to be photographed in the set specific region when said operating means is operated, and moving means for moving the set specific region in accordance with an output from said moving amount detecting device as the image of the object to be photographed moves.

41. An apparatus according to claim 38, further comprising exposure control means for performing exposure control in response to closing of a release button, time lag information output means for outputting time lag information required for exposure control, and arithmetic operating means for arithmetically operating a predicted moving amount during a period required for exposure control which disables detection of a moving amount by said moving amount detecting device on the basis of the time lag information.

42. An apparatus according to claim 38, further comprising operating means to be operated by a photographer, first selecting means for selecting a specific number of pixel arrays at intervals of a first predetermined number of arrays from all the pixel arrays of said two-dimensional image sensor means and causing said sum output means to calculate sums of the selected pixel arrays, and second selecting means for selecting pixel arrays in a number equal to the specific number at intervals of a second predetermined number of arrays from a specific range of all the pixel arrays of said two-dimensional image sensor means and causing said sum output means to calculate sums of the selected pixel arrays.

43. A camera apparatus having an object moving amount detecting device, comprising:

an optical system for imaging an object to be photographed;

two-dimensional image sensor means for photo-electrically converting the image of the object to be photographed obtained by said optical system;

first sum output means for outputting a sum of pixels of one array in a direction perpendicular to a predetermined direction of said two-dimensional image sensor means;

pattern signal output means for sequentially outputting a plurality of sums of image signals of pixels in units of arrays in the predetermined direction as pattern signals;

memory means for storing a first pattern signal output from said pattern signal output means;

moving amount arithmetic operating means for arithmetically determining, after the first pattern signal is stored, a moving amount of the object to be photographed in the predetermined direction in accordance with a correlation between a second pattern signal output from said pattern signal output means and the first pattern signal stored in said memory means with respect to the image of the object to be photographed;

operating means for commanding a distance measurement;

focusing state detecting means for setting a specific region in a picture and for detecting a focusing state on the basis of an image of the object to be photographed in the set specific region when said moving amount arithmetic operating means determines a moving amount; and moving means for moving the set specific region in accordance with an output from said moving amount detecting device as the image of the object to be photographed moves.

44. An apparatus according to claim 43, further comprising image display means for displaying the image of the object to be photographed, operating means, object position calculating means for calculating a position of said image display means in a predetermined direction on the basis of the image of the object to be photographed output from said two-dimensional image sensor means when said operating means is operated on the basis of the moving amount calculated by said moving amount arithmetic operating means, and display control means for causing said image display means to display a moved position of the image of the object to be photographed in the predetermined direction on the basis of the position calculated by said object position calculating means.

45. An apparatus according to claim 43, further comprising image display means for displaying the image of the object to be photographed, operating means for selecting a specific portion, second sum output means for selecting and adding pixels corresponding to the specific portion from all pixels of said two-dimensional image sensor means after said operating means is operated, photometry portion calculating means for calculating, on the basis of an output from said second sum output means, a moved position of the specific portion on the basis of a position of the specific portion obtained when said operating means is operated, and portion display means for displaying the moved position calculated by said photometry portion calculating means together with the image of the object to be photographed.

46. An apparatus according to claim 43, wherein said two-dimensional image sensor means has a horizontal scanning register capable of simultaneously selecting a plurality of horizontal scanning lines and a vertical scanning register capable of simultaneously selecting a plurality of vertical scanning lines and outputs pixel information of a pixel selected by selecting the horizontal and vertical scanning lines, said sum output means causes one of said horizontal and vertical scanning registers to simultaneously select a plurality of scanning lines corresponding to the one register and selects scanning lines corresponding to the other register in this selection state to output a sum of pixels of an array in one direction of said two-dimensional image sensor means, and said pattern signal output means sequentially selects the scanning lines corresponding to the other register while a plurality of scanning lines corresponding to the one register are selected, thereby obtaining pattern signals.

47. An apparatus according to claim 43, further comprising operating means to be operated by a photographer, first selecting means for causing a horizontal scanning register and a vertical scanning register to select a specific number of pixel arrays at intervals of a first predetermined number of arrays from all the pixels of said two-dimensional image sensor means and causing said sum output means to calculate sums of the selected pixel arrays until said operating means is operated, and second selecting means for causing said horizontal and vertical scanning registers to select a specific number of pixel arrays at intervals of a second predetermined number of arrays from all the pixel arrays of said two-dimensional image sensor means and causing said sum output means to calculate sums of the selected pixel arrays after said operating means is operated.

48. An apparatus according to claim 43, further comprising integrating means for integrating the sum outputs in units of arrays from said sum output means, and object luminance arithmetic operating means for arithmetically operating a luminance of the object to be photographed on the basis of an output from said integrating means.

49. An apparatus according to claim 43, further comprising exposure control means for performing exposure control in response to closing of a release button, time lag information output means for outputting time lag information required for exposure control, and arithmetic operating means for arithmetically operating a predicted moving amount during a period required for exposure control which disables detection of a moving amount by said moving amount detecting device on the basis of the time lag information.

50. An apparatus according to claim 43, further comprising an external output terminal for externally outputting the moving amount arithmetically operated by said moving amount detecting device.

51. A photographing picture moving amount display apparatus of a camera, comprising:

imaging means for repeatedly outputting an image signal corresponding to an object to be photographed;

moving amount detecting means for detecting a moving amount of the photographing picture on the basis of a change in output signal from said imaging means; and display means capable of displaying a moving distance obtained by integrating the moving amount detected by said moving amount detecting means even when an image of the object is outside a range of the photographing picture.

52. An apparatus according to claim 51, wherein said moving amount detecting means has pattern signal detecting means for detecting a one-dimensional pattern signal from a two-dimensional pattern signal output from said imaging means, memory means for storing the one-dimensional pattern signal, and arithmetic operating means for arithmetically operating the moving amount in accordance with a correlation between a signal stored in said memory means and a one-dimensional pattern signal output again from said pattern signal detecting means after the signal is stored.

53. An apparatus according to claim 51, further comprising second display means for displaying, when the value obtained by integrating the moving amounts detected by said moving amount detecting means reaches a predetermined amount, information indicating this state;

54. An imaging area display apparatus comprising:
two-dimensional image sensor means for outputting a luminance signal corresponding to an image of an object to be photographed;

area designating means for designating an area of the image of the object to be photographed;

area display means for displaying a position of the designated area of the image of the object to be photographed;

image signal output means for repeatedly outputting an image signal corresponding to the designated area of an output from said two-dimensional image sensor means;

moving amount detecting means for comparing a latest image signal and an immediately preceding image signal output from said image signal output means to detect a moving amount of the designated area; and correcting means for correcting an area display position of said area display means on the basis of the moving amount detected by said moving amount detecting means.

55. An apparatus according to claim 54, wherein said image signal output means detects a one-dimensional signal from the two-dimensional luminance signal from said two-dimensional image sensor means and outputs the detected signal as the image signal.

56. An imaging area display apparatus comprising:
two-dimensional image sensor means for outputting a luminance signal corresponding to an image of an object to be photographed;
image signal output means for repeatedly outputting an image signal from the luminance signal output from said two-dimensional image sensor means;
moving amount detecting means for detecting a moving amount of a photographing picture on the basis of a change in image signal;
designating means for designating a plurality of areas of the image of the object to be photographed;
display means for displaying positions of a plurality of designated areas of the image of the object to be photographed; and
correcting means for correcting a display position of said display means on the basis of the moving amount detected by said moving amount detecting means.

57. An apparatus according to claim 56, wherein said image signal output means detects a one-dimensional pattern signal from the two-dimensional luminance signal from said two-dimensional image sensor means and outputs the detected signal as the image signal.

58. A photometry apparatus of a camera, comprising:
imaging means for repeatedly outputting an image signal corresponding to an image of an object to be photographed;
designating means for designating a portion of the image of the object to be photographed as a photometry region;
memory means for repeatedly storing an output signal corresponding to the designated photometry region from the output signal from said imaging means;
moving amount detecting means for detecting a moving amount of the photometry region on the basis of the output signal stored in said memory means and the output signal corresponding to the photometry region obtained from said imaging means after the output signal is stored in said memory means;
correcting means for correcting a position of the photometry region in accordance with the moving amount detected by said moving amount detecting means; and
arithmetic operating means for arithmetically operating a luminance value of the photometry region in accordance with one of the output signal stored in said memory means and the output signal corresponding to the photometry region obtained from said imaging means after the output signal is stored in said memory means.

59. A photometry apparatus of a camera, comprising:
imaging means for repeatedly outputting an image signal corresponding to an image of an object to be photographed;
designating means for designating a portion of the image of the object to be photographed as a photometry region;
arithmetic operating means for arithmetically operating a luminance value of the photometry region in accordance with an output signal corresponding to the designated photometry region of the output signal from said imaging means;
memory means for repeatedly storing the output signal corresponding to the designated photometry region of the output signal from said imaging means;
moving amount detecting means for detecting a moving amount of the photometry region in accordance with the output signal stored in said memory means and the output signal corresponding to the photometry region obtained from said imaging means after the output signal is stored in said memory means; and
correcting means for correcting a position of the photometry region in accordance with the moving amount detected by said moving amount detecting means.

60. A focus detecting apparatus of a camera, comprising:
imaging means for repeatedly outputting an image signal corresponding to an image of an object to be photographed;
designating means for designating a portion of the image of the object to be photographed as a photometry region;
memory means for repeatedly storing the output signal corresponding to the designated photometry region of the output signal from said imaging means;
moving amount detecting means for detecting a moving amount of the photometry region in accordance with the output signal stored in said memory means and the output signal corresponding to the photometry region obtained from said imaging means after the output signal is stored in said memory means; and
correcting means for correcting a position of the photometry region in accordance with the moving amount detected by said moving amount detecting means; and
in-focus state detecting means for detecting an in-focus state in accordance with one of the output signal stored in said memory means and the output signal corresponding to the photometry region obtained from said imaging means after the output signal is stored in said memory means.

61. A tracking apparatus for an object to be photographed in a picture, comprising:
imaging means for repeatedly outputting an image signal corresponding to an image of an object to be photographed;
designating means for designating a portion of the image of the object to be photographed as a tracking region;
moving amount detecting means for detecting a moving amount of the tracking region for every predetermined time in accordance with the output from said imaging means;

correcting means for correcting a position of the tracking region in accordance with the moving amount detecting by said moving amount detecting means;

detecting means for detecting timings when said moving amount detecting means cannot perform detection; and means for obtaining a position of the tracking region immediately after detection by said moving amount detection means is enabled again in accordance with a moving amount of the tracking region, a position of the tracking region and the predetermined tim immediately before the timings detected by said detecting means.

62. An apparatus according to claim 61, further comprising:

display means for displaying the designated tracking region of the image of the object to be photographed;

said correcting means obtaining a position of the tracking region immediately after the detection of the timings by the detecting means in accordance with the detected moving amount of the tracking region detected by the moving amount detection means in the predetermined time immediately before the timings detected by the detection means, thereby correcting a display position of said display means.

63. A tracking apparatus for an object to be photographed in a picture comprising:

imaging means constituted by a plurality of two-dimensionally arranged photoelectric conversion elements;

designating means for designating a portion of said imaging means as a tracking region; and moving amount detecting means for adding the outputs from said photoelectric conversion elements corresponding to the tracking region in a predetermined direction to obtain a sum signal, and detecting a moving amount of the tracking region in accordance with a change in sum signal, said tracking apparatus moving the tracking region on the basis of the moving amount detected by said moving amount detecting means, wherein said moving amount detecting means includes setting means for setting an addition pitch of the outputs from said photoelectric conversion elements in accordance with a size of the tracking region designated by said designating means.

* * * * *